SYNCHRONIZING MECHANISM ADAPTED FOR FRICTION CLUTCH USE

Filed Sept. 21, 1962 14 Sheets-Sheet 1

Inventor

Inventor

Inventor

Inventor

Sept. 13, 1966 G. T. RANDOL 3,272,028

SYNCHRONIZING MECHANISM ADAPTED FOR FRICTION CLUTCH USE

Filed Sept. 21, 1962 14 Sheets-Sheet 5

Inventor

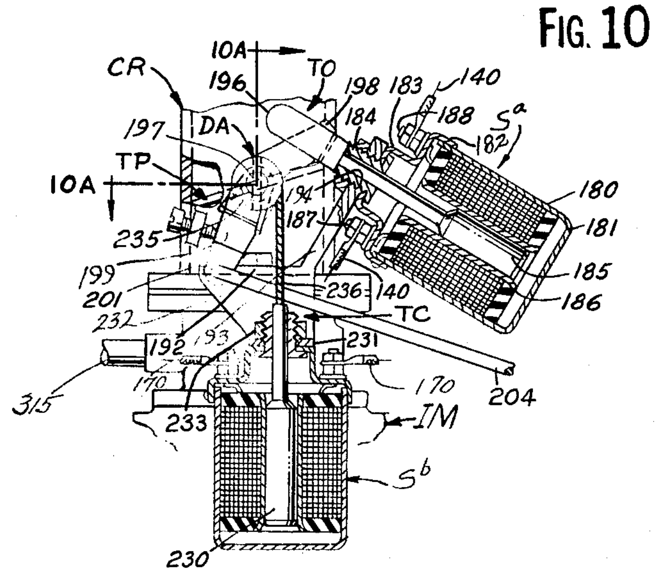
FIG. 10
FIG. 10A
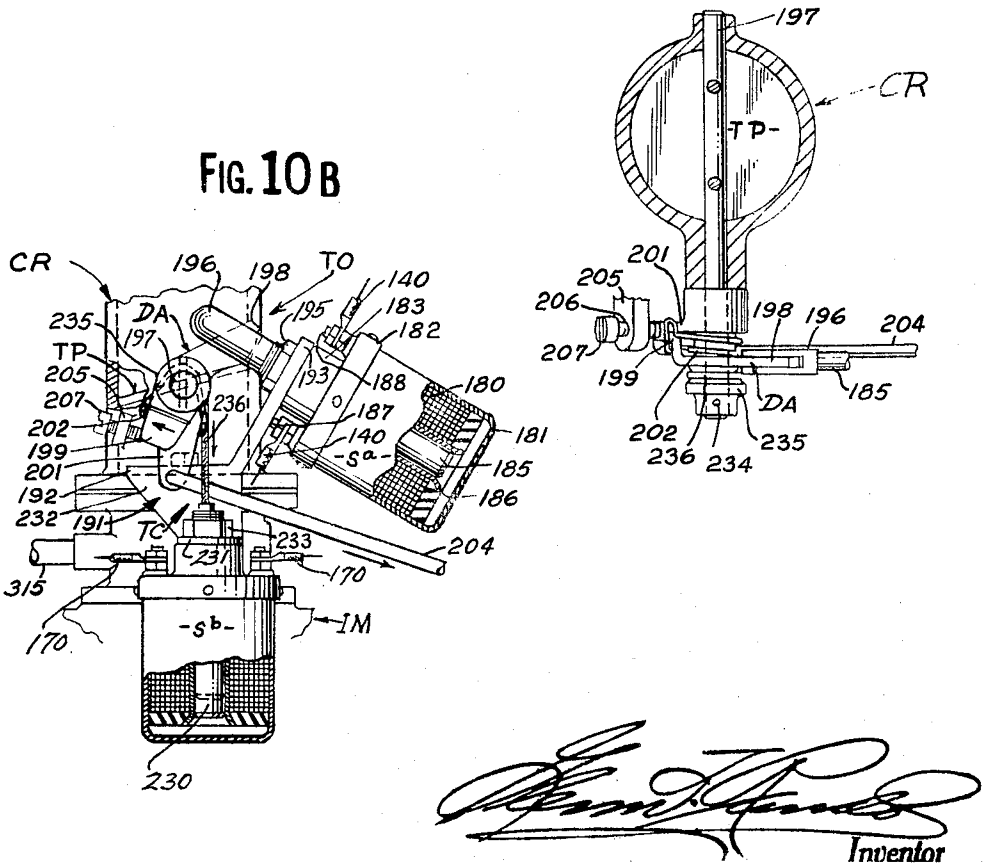
FIG. 10A, FIG. 10B
Inventor

Sept. 13, 1966 G. T. RANDOL 3,272,028

SYNCHRONIZING MECHANISM ADAPTED FOR FRICTION CLUTCH USE

Filed Sept. 21, 1962 14 Sheets-Sheet 7

Inventor

Inventor

Inventor

Inventor

Inventor

Sept. 13, 1966 G. T. RANDOL 3,272,028

SYNCHRONIZING MECHANISM ADAPTED FOR FRICTION CLUTCH USE

Filed Sept. 21, 1962 14 Sheets-Sheet 12

Inventor

Inventor

Inventor

United States Patent Office 3,272,028

Patented Sept. 13, 1966

3,272,028

SYNCHRONIZING MECHANISM ADAPTED FOR FRICTION CLUTCH USE

Glenn T. Randol, 3 E. 2nd Ave., Loch Lynn, Mountain Lake Park, Md.

Filed Sept. 21, 1962, Ser. No. 225,426
17 Claims. (Cl. 74—472)

My invention relates generally to synchronizing mechanisms for establishing substantially synchronous speeds between two frictionally engageable elements relatively rotatable when disengaged, and more particularly to novel and improved synchronizing mechanism adapted to induce synchronism of the driving and driven members of a frictionally engageable clutch interposed in the drive line of automotive vehicles and the like, by adjusting the speed of the engine connected to the driving member to that of the driven member prior to lock-up for transmission of engine torque to effect propulsion of the vehicle thereby.

The primary object of my invention resides in the provision of novel synchronizing mechanism operatively incorporated between the said driving and driven members of such a clutch in coaxial relationship thereto, and which responds to relative (asynchronous) rotation of said members to selectively activate throttle opening and closing means opposed by a spring load reacting on the accelerator linkage, to modulate engine speed automatically with respect to its existent speed established by operator-actuation of the accelerator free of said spring load, from normal engine-idling position thereof.

An object importantly related to the above primary object, is to utilize said asynchronous rotational movements of said clutch members in a novel manner to activate said throttle controlling means by means of a pair of energizable actuators, such as solenoids, one of which being energizable in response to said synchronizing mechanism operating in one of its two operating positions of control, to open the throttle-valve to increase engine speed therefore speed of the driving member rotatable as a unit therewith, to substantially the same speed as the driven member prior to lock-up of both of said clutch members; the other operating position of control being effective in part to opertaively energize the other solenoid to close said throttle-valve to decrease engine speed therefore speed of the co-rotatable driving member to substantially that of the driven member prior to lock-up of both of said clutch members.

An object related to the object next above, is the provision of optional means for reducing engine speed automatically in the form of an energizable actuator such as, a solenoid operatively associated with the needle valve of the carburetor to axially move the same from its manually set engine-operating position with respect to the main jet passage controlled thereby, to momentarily block said passage to throttle the engine without disturbing the existent open position of the throttle-valve under operator-actuation, therefore decreasing engine speed to substantially that of the clutch driven member prior to lock-up of both clutch members, and wherein spring means including a normally compressed spring are effective to oppose solenoid-actuation of said needle valve, to return the latter to normal carbureting position aforesaid upon de-energization of said solenoid.

Therefore, a broad objective of my invention is to provide novel engine-idling means operable automatically with a high degree of sensitivity to reduce engine speed below any existent speed other than idling speed establishable by operator-actuation of the throttle-valve, and wherein special advantages are provided over the aforementioned throttle-closing means, by utilizing said new and novel carburetion interrupter energizable to negate fuel supply to the main jet passage of the conventional carburetor, for sensitizing engine speed control so that reduction thereof occurs more rapidly therefore with less time delay than throttle-plate actuation provides, to within substantial synchronism with that of the gearbox input shaft without the necessity for returning the throttle-valve or its operation otherwise to engine-idling position as a function of operator-actuation of the accelerator pedal and connected linkage during upshifting of the gearbox.

Another object is to incorporate said novel carbureting interrupter in the conventional carburetor in such manner that the main jet passage is momentarily disabled by operating the needle valve control therefor to a blocking position during a selected upshift, and upon completion of the latter the interrupter is de-energized automatically to release the needle valve under influence of a normally compressed spring to reset the same to its normally adjusted position for resumption of engine operation, said needle valve being manually adjustable in the conventional manner and for the same purpose as provided in conventional carburetors without such adjustment affecting the capability of said interrupter when energized to disable the normal fuel-supply control of said needle valve to said main jet passage by momentarily blocking the flow of fuel from the carburetor bowl.

In a more specific sense, my invention is intended for operative association with the conventional spring-engageable friction clutch interposed in said drive line between the engine and an associated change-speed gearbox (transmission) when said clutch is open (disengaged) to accommodate a speed change in said gearbox whereby, any relative movement between the engine flywheel (clutch driving member) and that portion of the drive line which projects into said gearbex is effective to induce the synchronizing mechanism to take up a position which closes a switch, for example, interposed in an electric circuit for energizing said throttle-opening means (actuator) to thus speed up the engine if engine speed is less that of the driven member during a downshifting speed-change; but if engine speed is greater than that of the driven member, then the synchronizing mechanism would take up an opposite relative position corresponding to different switch closed position to thus energize said throttle-closing actuator, to decrease engine speed substantially to that of the driven member during an upshift speed-change.

Accordingly, the present invention provides novel friction clutch synchronizing mechanism responsive to modulating engine speed in accordance with its relative overspeed or underspeed rotational relationship with respect to the speed of a portion of the drive line after a new speed has been established in the gearbox. Therefore, if an upshift or a downshift is effected the synchronizing mechanism relays to the throttle-closing or opening means as the case may be, the relative overspeed or underspeed, respectively, obtaining between the engine and input shaft to the gearbox. If the input shaft speed is less than that of the engine, then speed of the latter is reduced to substantial synchronism with that of the input shaft; but if the speed of the input shaft is greater than that of the engine, then the speed of the latter is increased to substantially match the speed of the input shaft, such modulation of engine speed taking place prior to re-engagement of the clutch to produce smooth lock-up of the clutch between speed-changes without any tendency of the engine to race when the clutch is disengaged to facilitate such speed-changes.

The two relative operating positions of the three principal elements comprising said synchronizing mechanism are effected by relative rotation between the engine flywheel and the clutch output shaft on which the clutch driven member is slidably splined for co-rotation therewith, the first of said elements being co-rotational with the flywheel with the second element juxtaposed with respect to the first element and adapted to have limited relative rotational and axial movements with respect to said first elements, and the third element is frictionally mounted on the hub portion of the clutch driven member and mechanically connected to the second element to rotate as a unit therewith. Incorporated between the first and second elements is a plurality of camming portions cooperable to convert relative rotational movement between the first and second elements into axial movement of the second element, the latter movement being relayed, for example, to a switch device to selectively operate the same to two closed contact positions. Upon the synchronizing elements taking up either of their two relative operating positions of control, the frictionally mounted element functions to impart limited rotation to the second element relatively to the first element to establish the synchronizing mechanism in operating position of control to induce speed-up of the engine when the speed of the driven member exceeds that of the engine as in the case of a downshifting of the gearbox, and to thereafter accommodate slipping engagement with respect to the driven member to prevent interrupting the existent operating position until substantial synchronism occurs prior to lock-up of the clutch friction members, said friction element being spring-loaded to define the frictional coefficient required to rotate the second element to said operating position. In the case when engine speeds exceed that of the driven member as, for example, when upshifting the gearbox, the synchronizing mechanism is operated to its other operating position of control to reduce engine speed to that of the driven shaft as by idling or lowering the speed of the engine, in response to limited opposite rotation of the first element relative to the second element as a function of the frictional braking effect of the friction element to momentarily hold the second element thereby establishing the other operating position, whereupon the friction element and connected second element rotate as a unit with the first element as a function of slipping engagement between the friction element and clutch driven member until substantial synchronism occurs prior to lock-up of the clutch friction members.

A further object of the invention is to produce novel and improved engine-speed regulating means which may be located remotely with respect to the control switch actuated thereby, and wherein angular velocities of the rotating parts are minimal, and therefore, eliminate high velocity collector rings which subject cooperating brushes to excessive wear, and possible short-circuiting of the associated electric control circuit.

Another salient feature of my invention resides in the utilization of novel operating mechanism in the engine-speed synchronizer, and which is coaxial with the engine flywheel and torque-transmitting clutch mounted in part on said flywheel, and which further provides an extremely compact arrangement of parts constituting the synchronizer for long service life free of frequent adjustments.

The engine-speed synchronizer of the present invention contemplates that the control device may be incorporated as a unitary part of the synchronizer proper, and that such control device may take the form of either a switch as illustrated herein or a valve, and wherein the automatically operated main jet needle valve of the carburetor is instantly and sensitively effective to block the flow of fuel into the main jet passage to momentarily disable engine operation thus reducing the speed thereof to thereby prevent engine racing between transmission shifts when the main clutch is open, and cooperates with the synchronizing mechanism in response to relative overspeed of the engine with respect to the clutch driven member, to bring about substantial synchronous speeds therebetween prior to lock-up drive of said clutch friction members, said automatic needle valve operation eliminating complicated spring-loaded mechanical linkage for returning the throttle-plate of the carburetor to engine-idling position in opposition to said spring load reacting on the accelerator when the latter is in engine-accelerating position and attendant delayed idling of the engine with consequent "raking" of the gears and possible damage thereto due to incompletion of the synchronizing phase between the clutch friction members where rapid upshifting sequence is involved.

Another important object of the invention is the provision of a novel electro-vacuum control system which includes said engine-speed controlling devices responsive to operation of said synchronizing mechanism as a function of relative overspeed or underspeed of the clutch driven member with respect to the speed of the engine to bring such speeds into synchronism, and wherein additional control devices are incorporated to have novel interaction and cooperation with said synchronizing mechanism to automatically disengage the said clutch members and accommodate their re-engagement to enable said synchronizing mechanism to function in accordance with the speed differential between said engine and clutch driven member during the interval of clutch disengagement, certain of said added control devices being responsive to personally-operable means, such as the transmission shift-lever and engine accelerator, to control clutch disengagement and re-engagement while another added control device responds to change of speed of rotation of an element such as the tailshaft of the associated change-speed transmission, to reduce the driving operations of a vehicle to the shift-lever and accelerator between which operator coordination is entirely eliminated with resultant smooth re-engagement of the clutch automatically following a speed change with racing of the engine between such speed changes prohibited in response to automatic operation of the synchronizing mechanism.

An object related to the object next above is to utilize the control device operated by the accelerator in the form of a switch which is characterized by operating to closed and open positions of control at a plurality of closely spaced stations along the full operating stroke of the accelerator pedal to enable regulating the clutch members into engagement for starting the vehicle in a manner simulating foot-control of a pedal engageable clutch under supervision of a skilled driver, and wherein said clutch is spring-engageable, and automatically recoverable to disengaged condition in response to slight relaxation of the accelerator pedal from its existent engine-accelerating position of control, to prevent stalling of the engine, whereupon clutch re-engagement may be reinaugurated by slight pressure on the accelerator pedal while in its aforesaid relaxed status. Full release of the accelerator pedal with attendant delay in idling the engine is not required to recover the clutch members to separated condition for release of the engine when overloaded at any given open throttle position, to prevent stalling.

With these and other objects and advantages in view, the invention consists of the new and novel combinations, constructions, and arrangements of the parts as hereinafter more fully described, set forth in the claims appended hereto, and disclosed in the accompanying drawings forming a part hereof, wherein:

FIGURE 1 is a longitudinal-vertical section of a spring-engageable friction clutch of conventional construction and operation in which my invention is embodied, the parts being shown in normal operating positions corresponding to fully engaged condition of the clutch with the associated synchronizer therefor adjusted to induce reduction of engine speed as in the case of an upshift, the disengaged status of the clutch being indicated in dashed lines;

Figure 1:
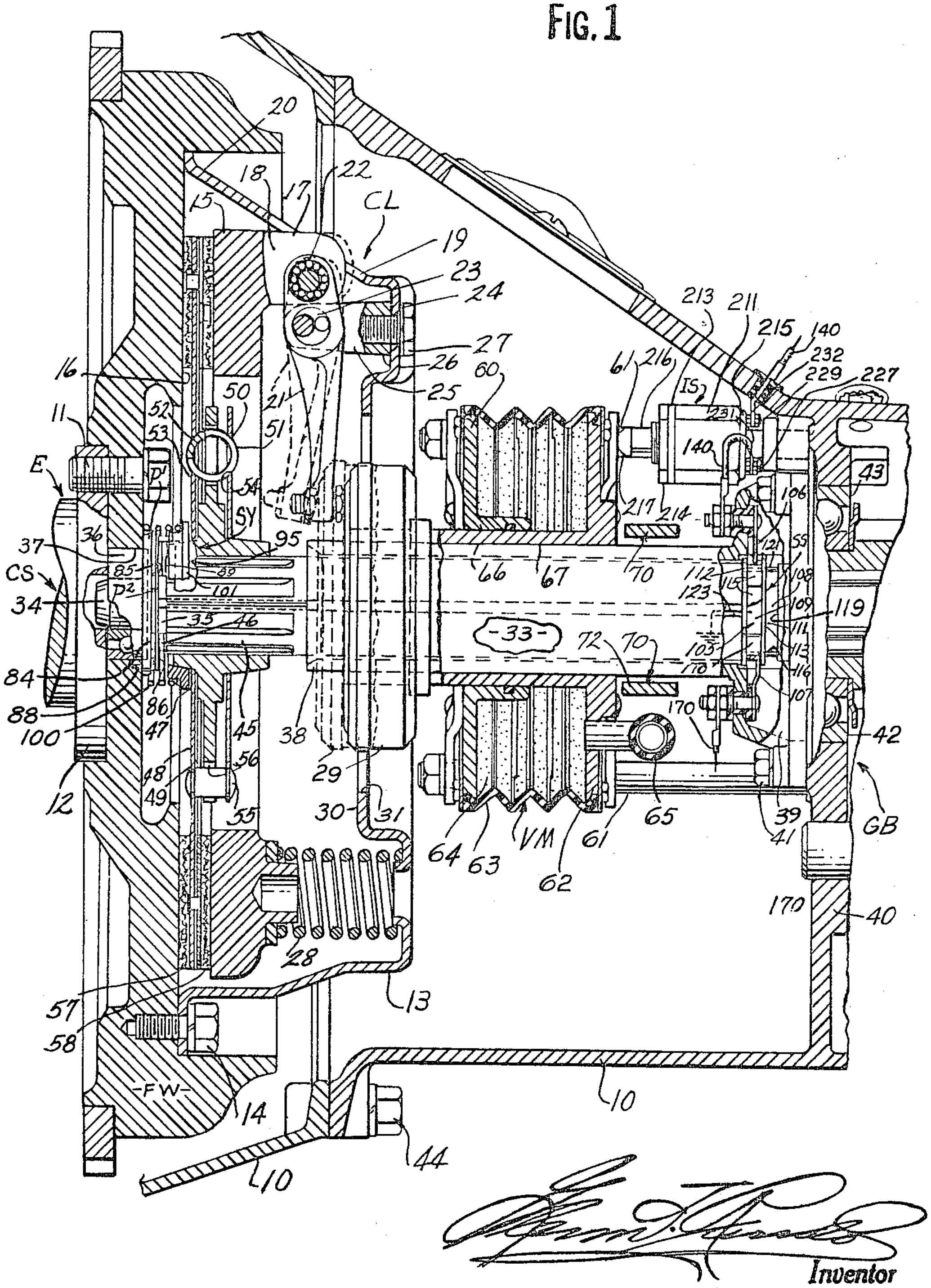
FIGURE 1A is a fragmentary enlargement of FIGURE 1 to clarify the details of the synchronizing switch associated with the clutch output shaft.
FIGURE 1B is another fragmentary enlargement of FIGURE 1 to clarify the details of the synchronizing mechanism operatively disposed between the engine flywheel and piloted end portion of the clutch output shaft.
Figures 1A, 1B:
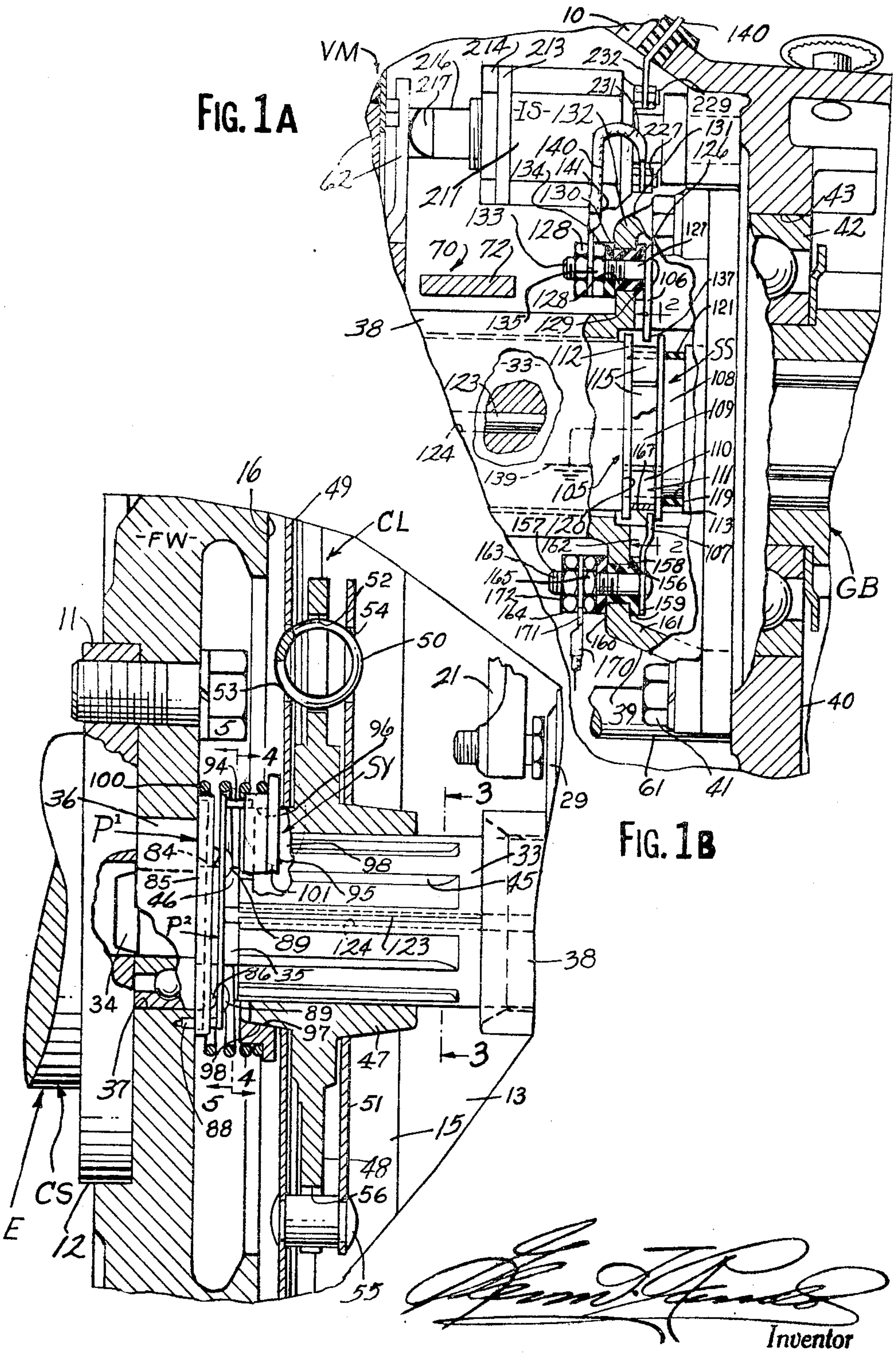
Figures 5, 6, 7:
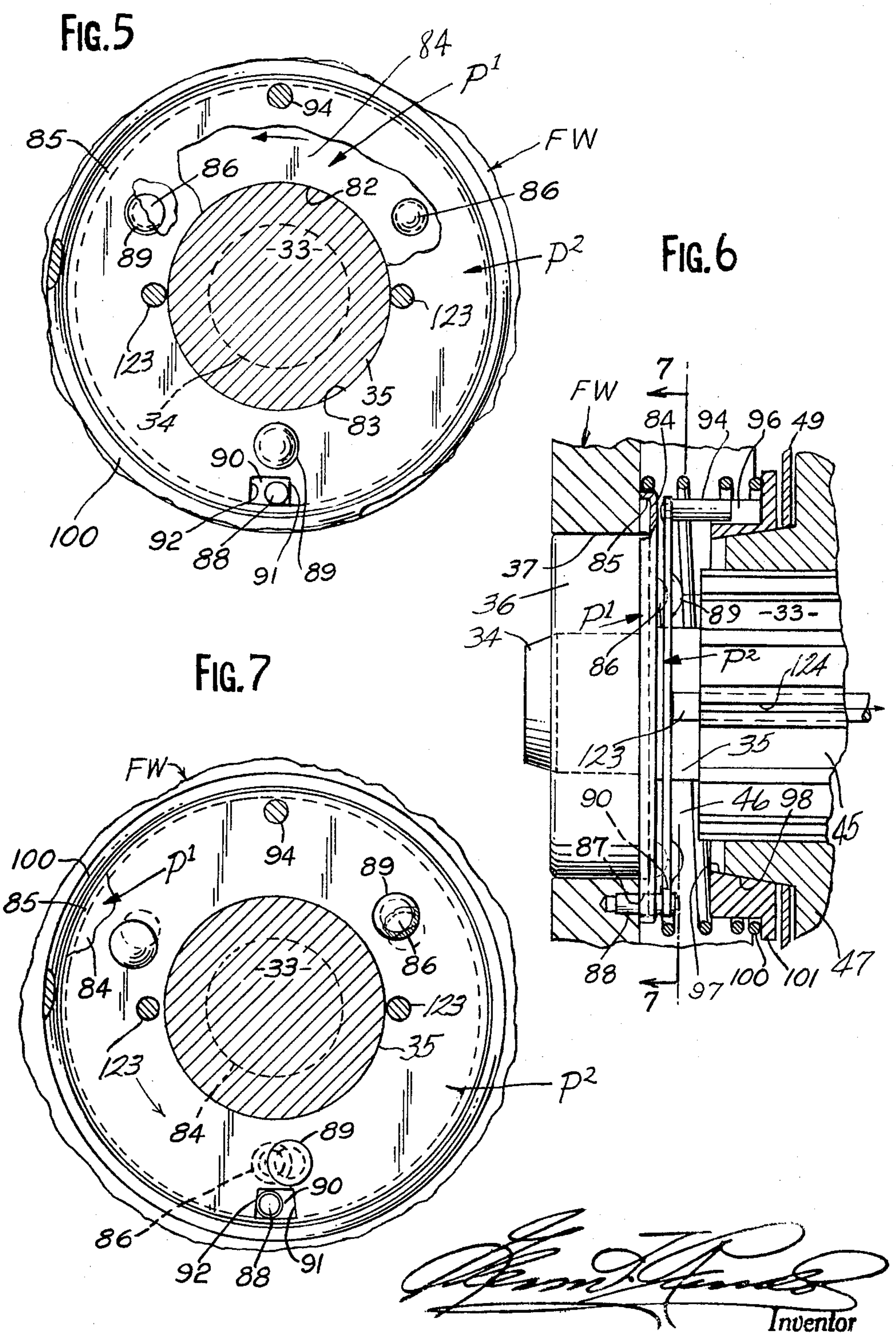
Figure 8:
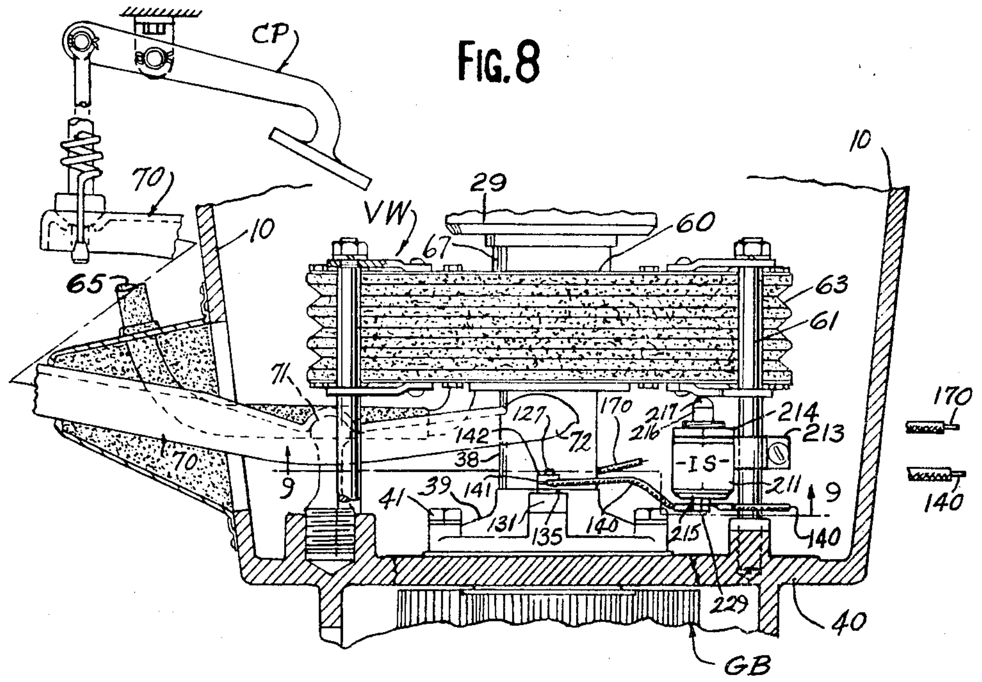
Figure 9:
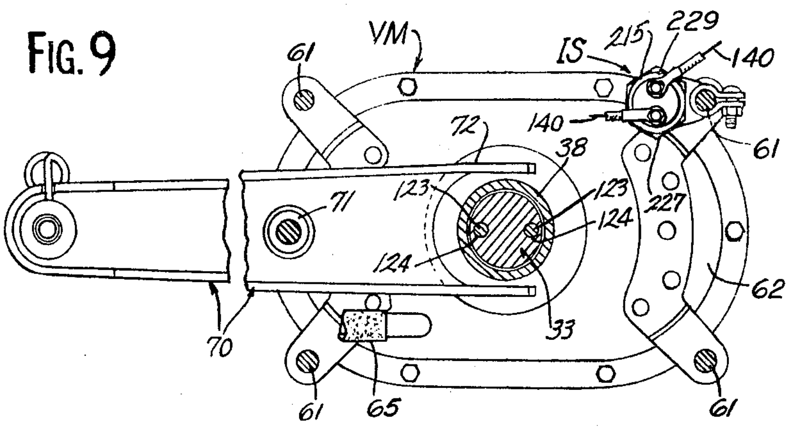
Figures 11, 12A, 15:
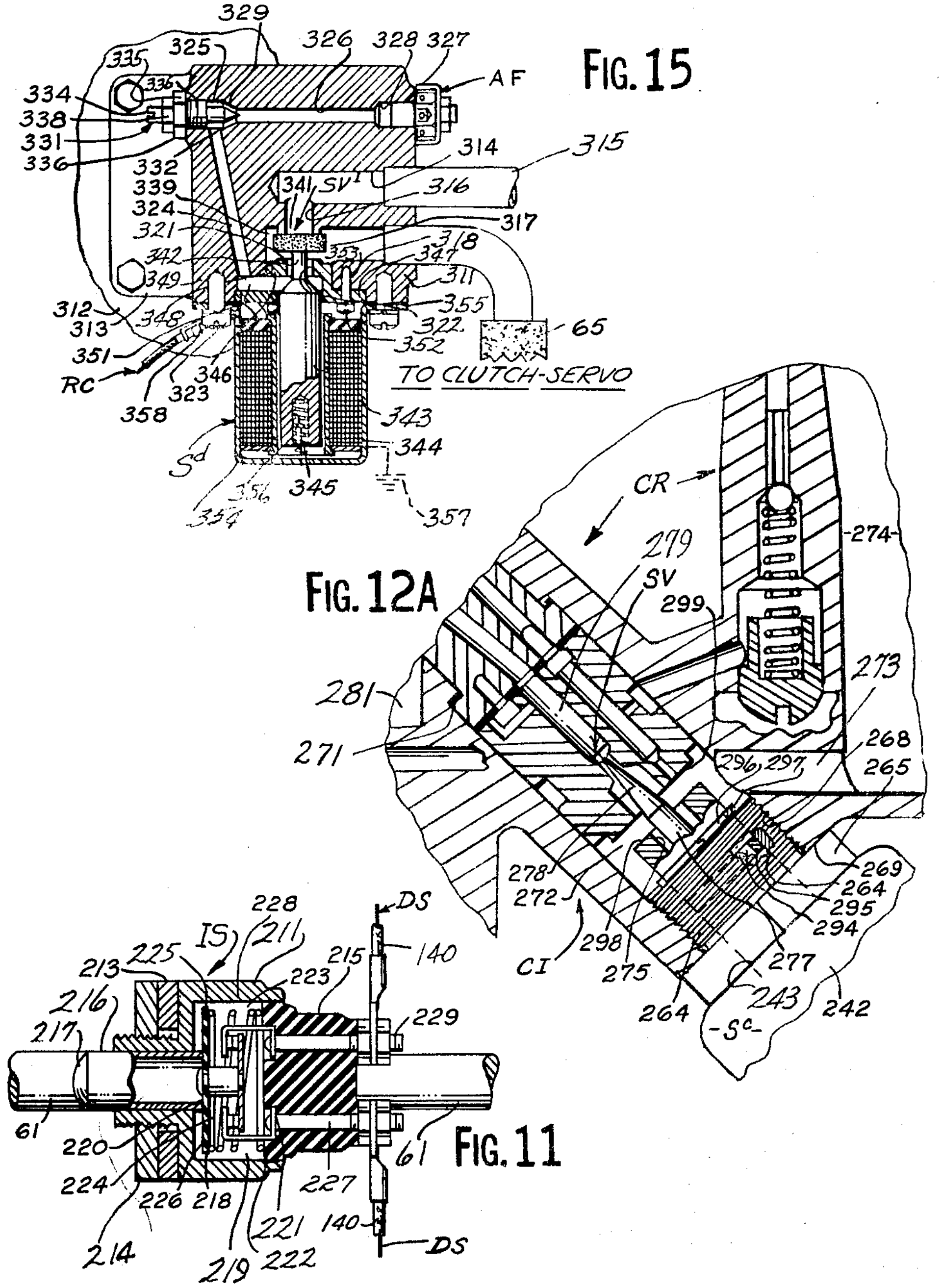
Figure 12:
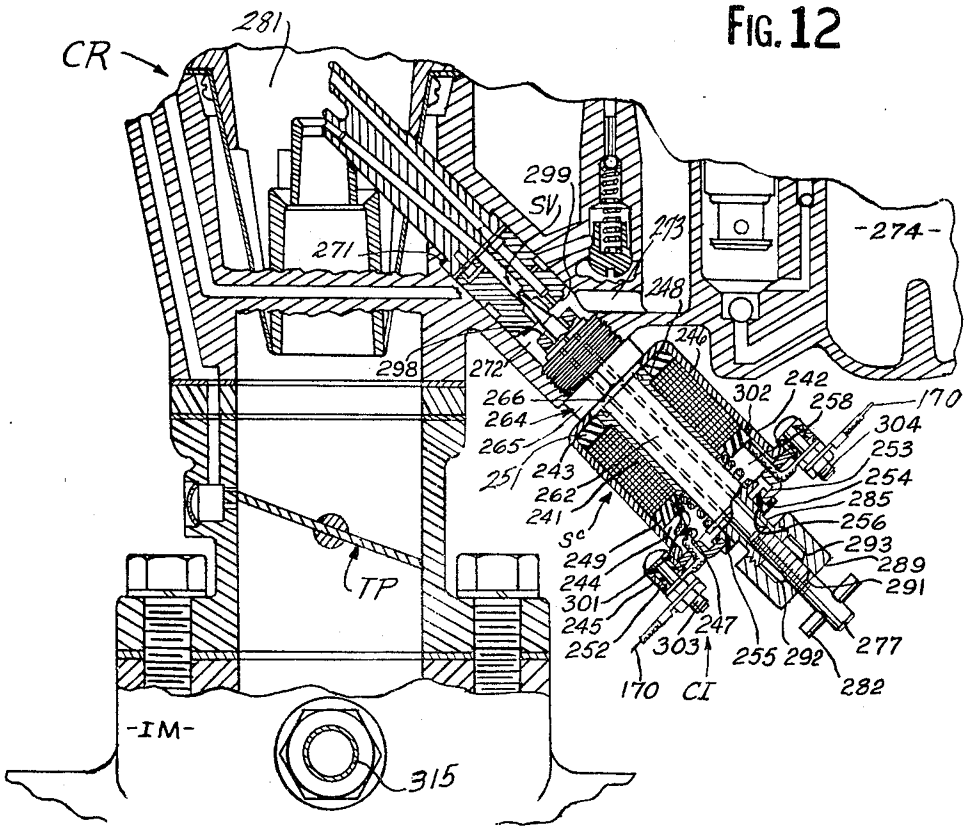
Figure 13:
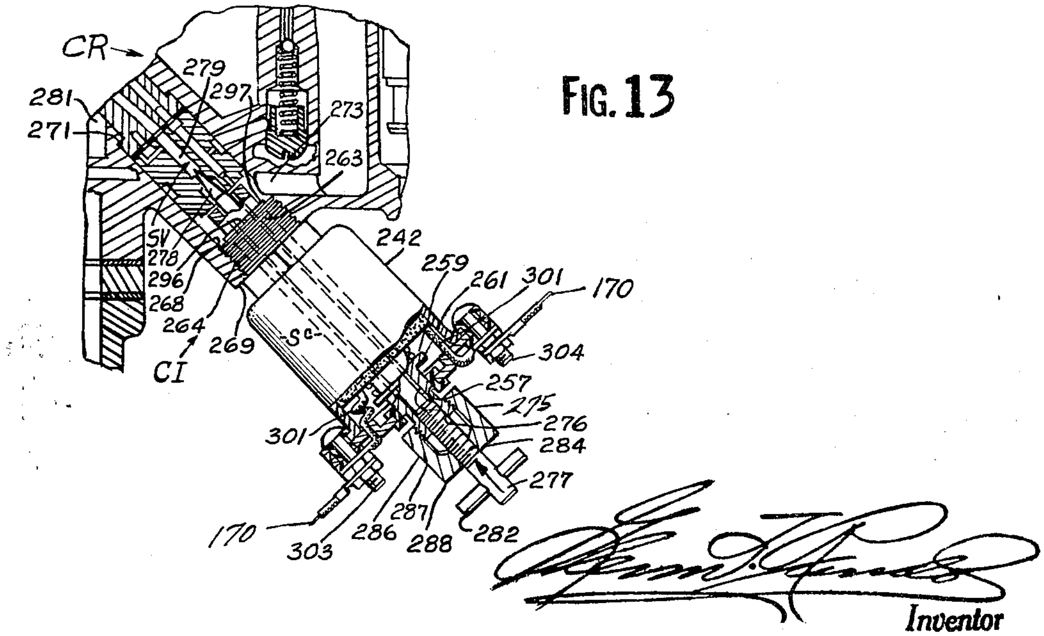
Figure 14:
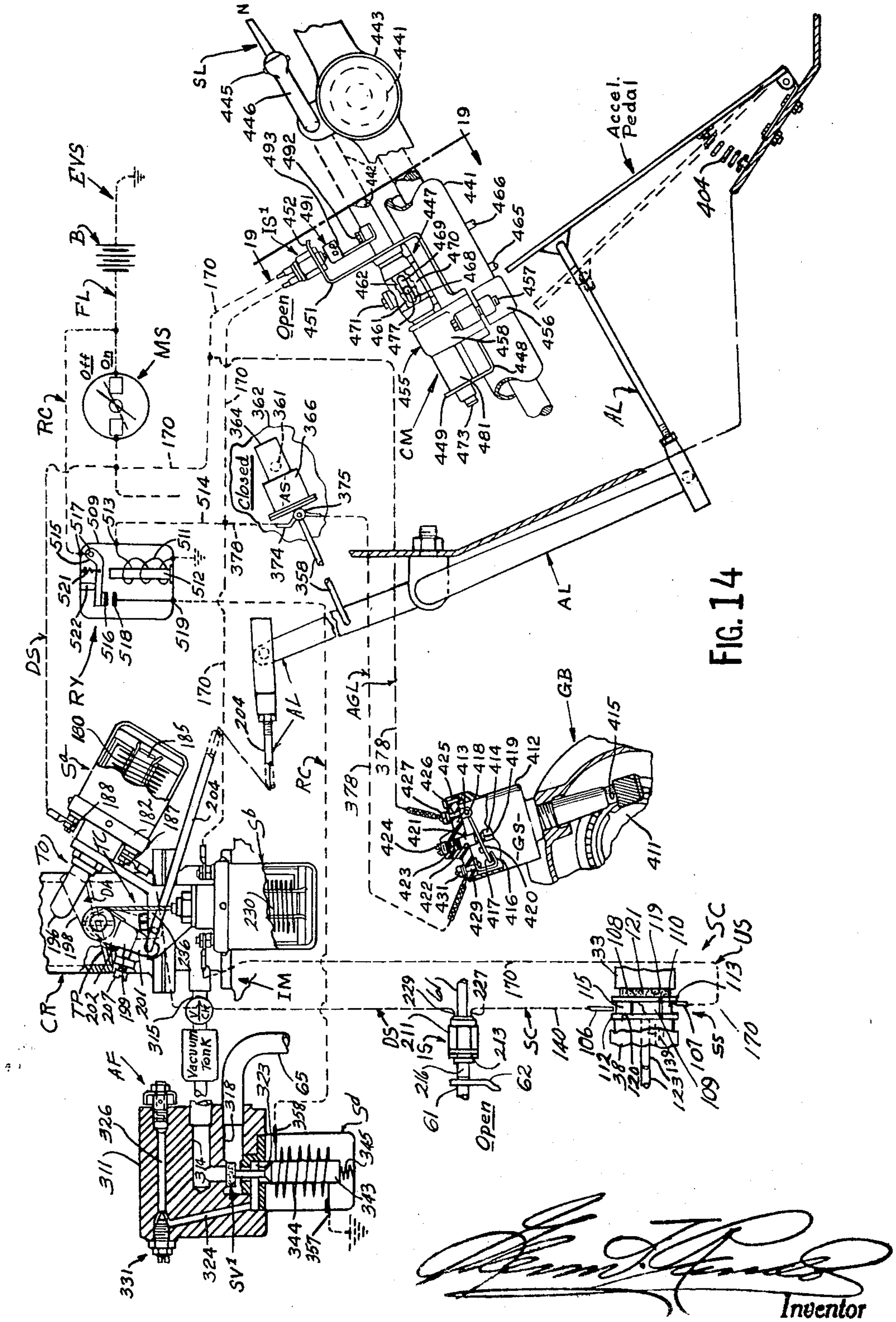
Figure 14A:
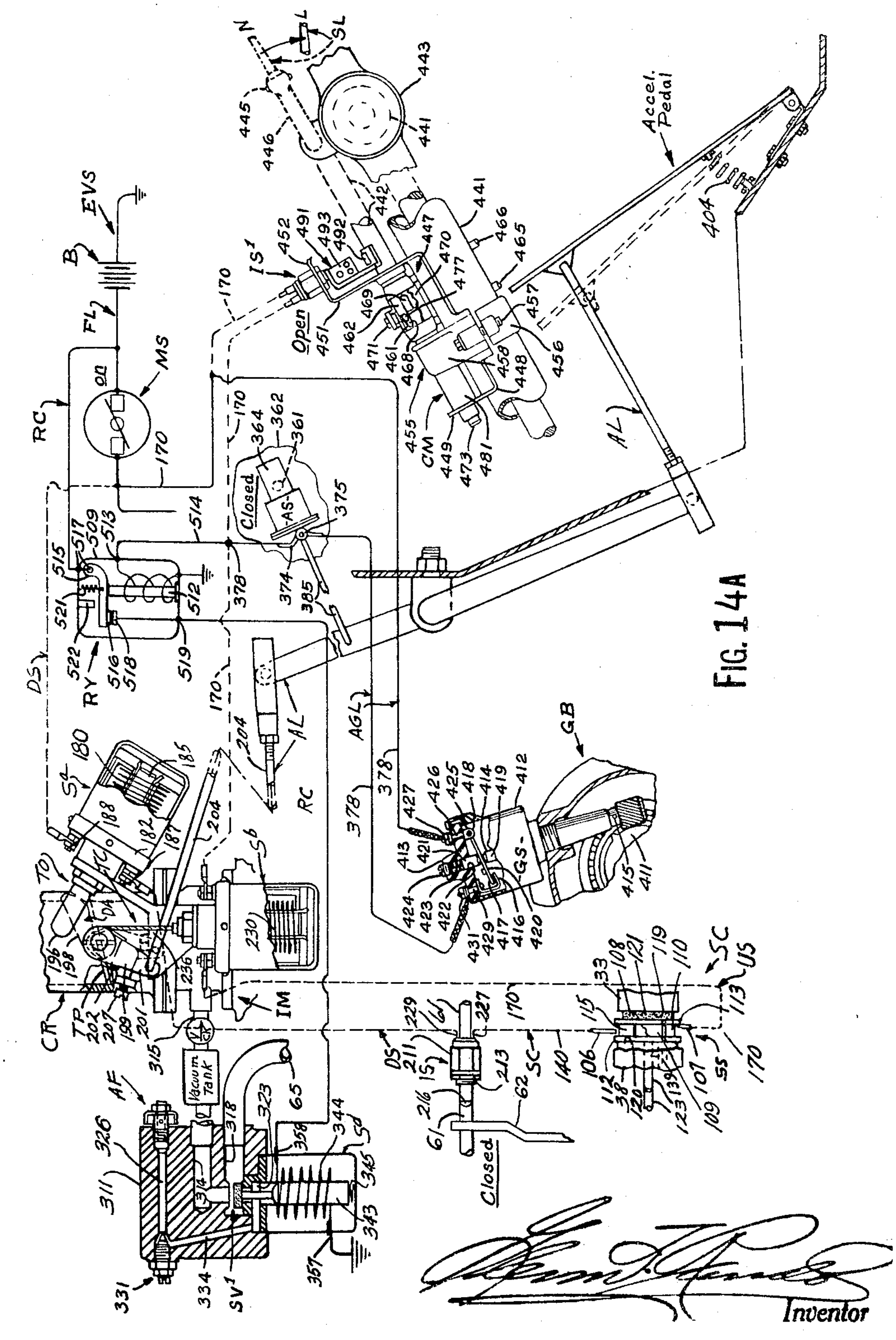
Figure 14B:
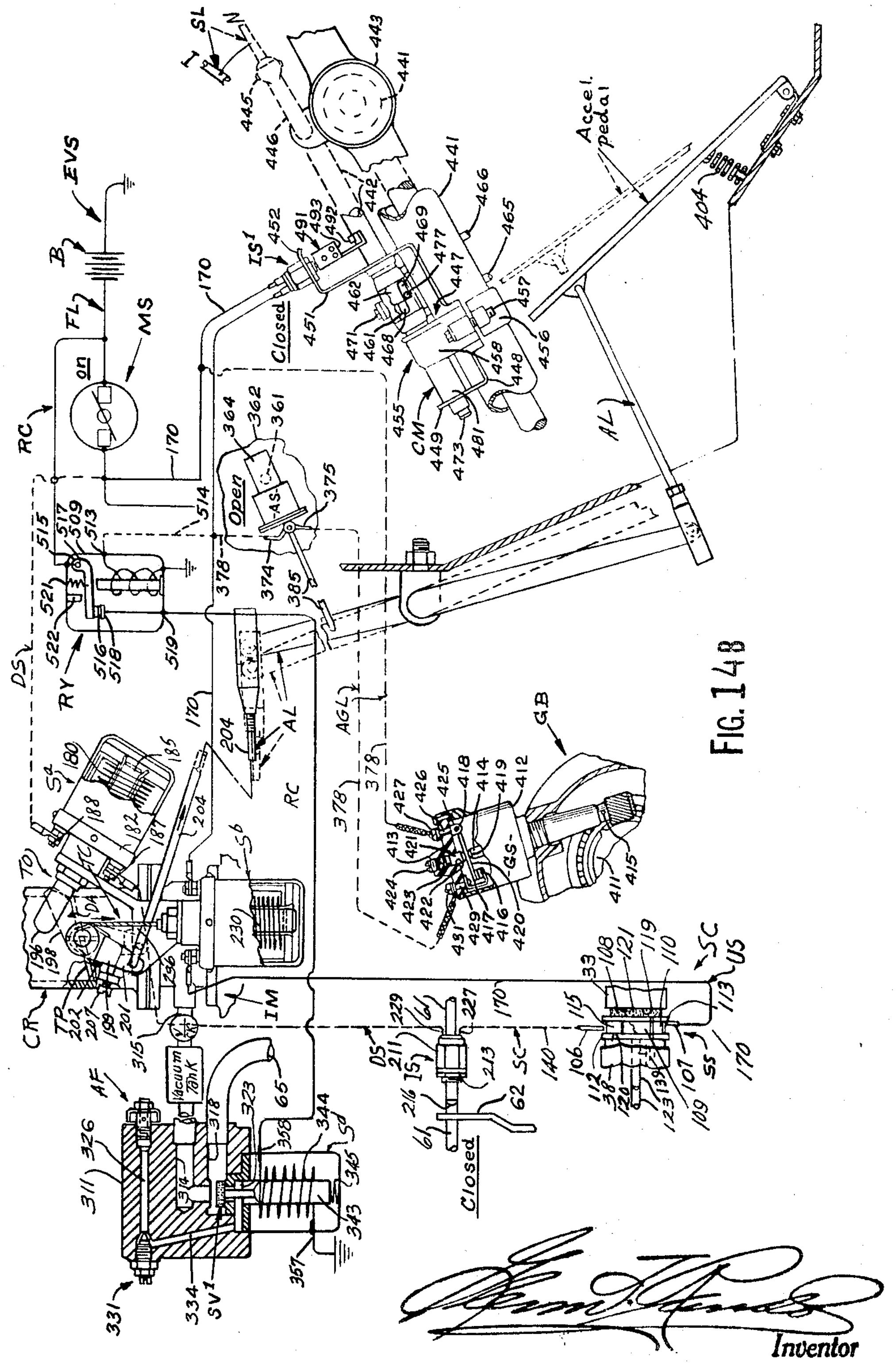
Figure 14C:
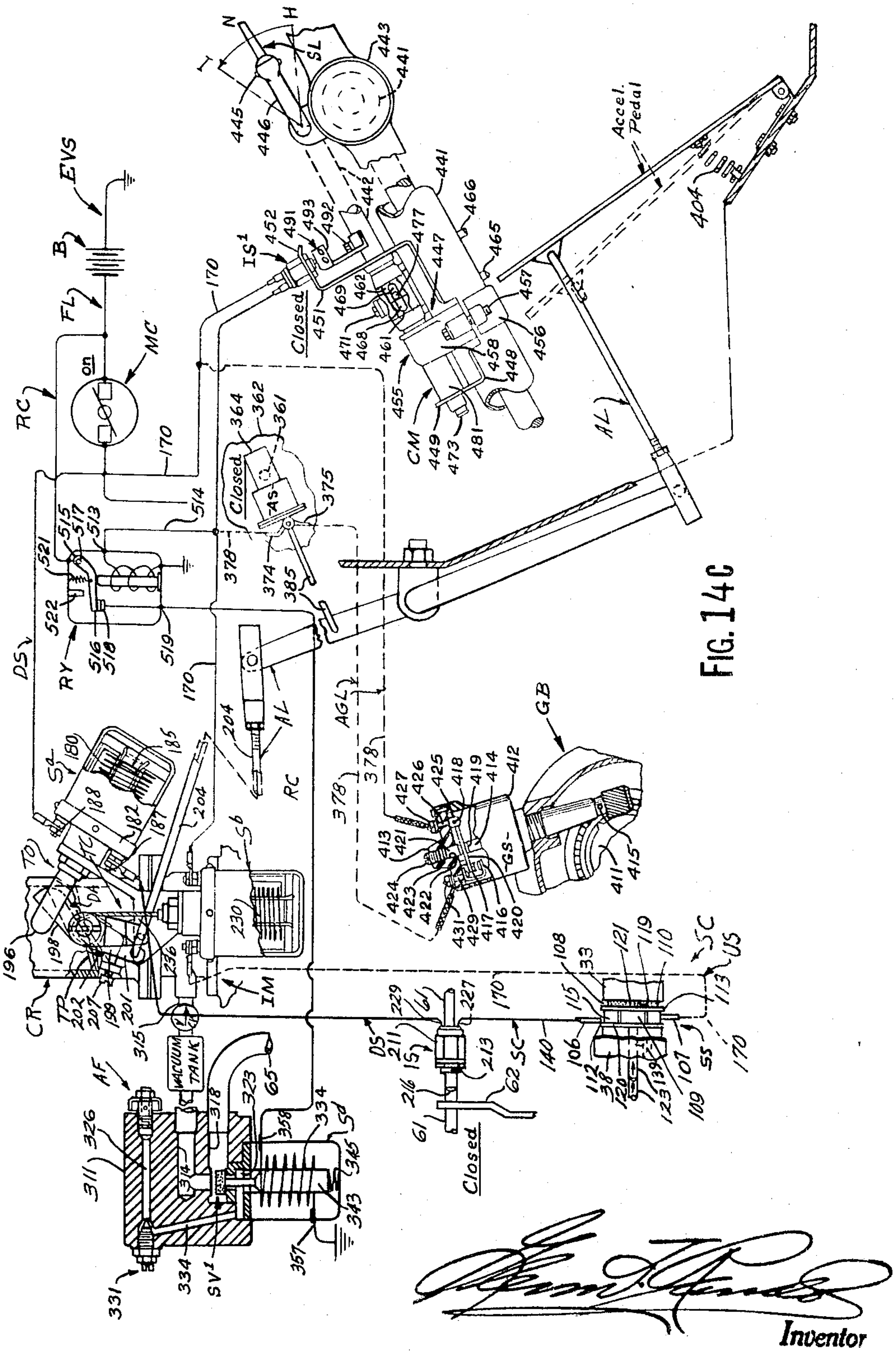
Figure 16:
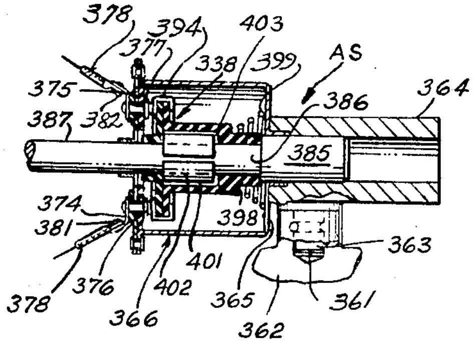
Figure 17:
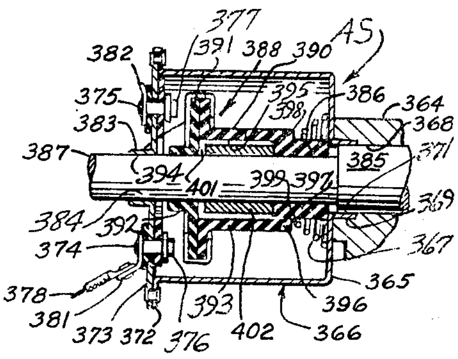
Figure 18:
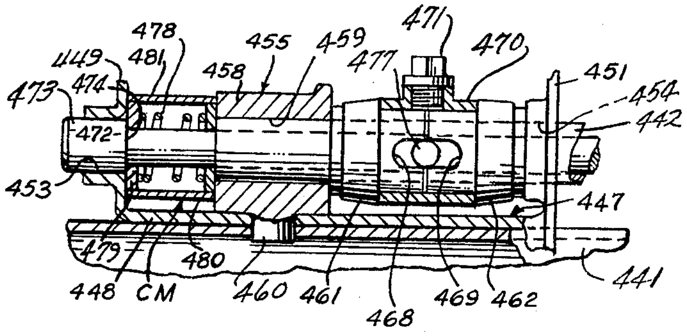
Figure 19:
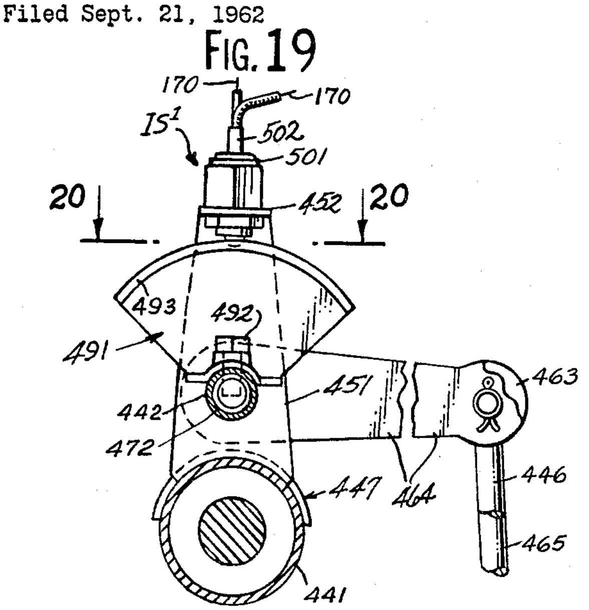
Figure 20:
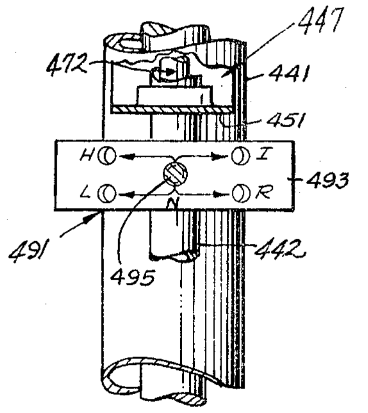
Figure 21:
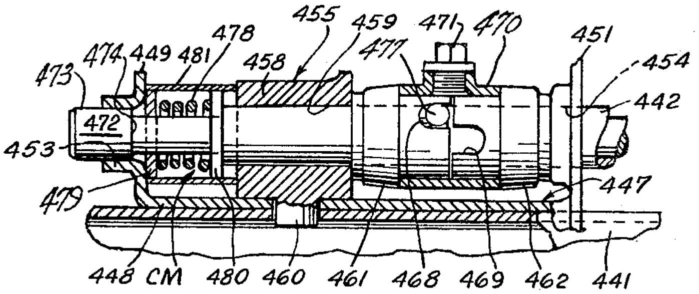
Figure 22:
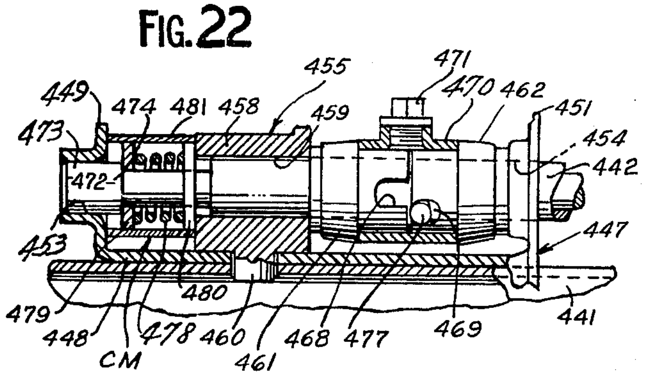
Figure 19A:
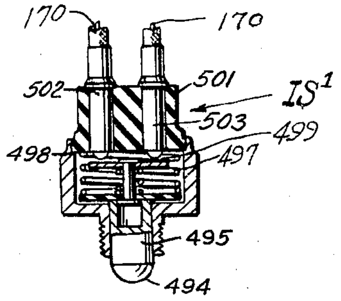

FIGURE 5 is another transverse section taken along the line 5—5 of FIGURE 1B showing the two actuating (drive) plates positioned between the flywheel and friction drive (brake) element, with one of said plates being adapted to rotate as a unit with said friction brake element, and the other plate being rotatable as a unit with the engine flywheel, said plates being characterized by limited relative rotational movement simultaneously converted into axial movement of the plate connected to the friction brake element in response to cooperative camming means operably effective between said plates;

FIGURE 6 is another sectional view similar to FIGURE 1B showing the clutch synchronizer operated to close the switch contacts corresponding to increasing engine speed;

FIGURE 7 is a transverse section taken along the line 7—7 of FIGURE 6 to clarify the relative rotational disposition assumed by the two cooperating plates to induce axial movement of one of the plates;

FIGURE 8 is a plan view of the synchronizer switch housing and associated clutch control servo (motor), with portions of the clutch housing shown in horizontal section;

FIGURE 9 is a transverse section taken on the line 9—9 of FIGURE 8, to clarify the relative locations of the switch operating rods carried by the clutch output shaft;

FIGURE 10 illustrates substantially conventional throttle-opening and -closing means operably associated with the carburetor throttle (butterfly) valve to automatically open and close the same to increase and decrease, respectively, engine speed with respect to that defined by the effective accelerator pedal position away from normal engine-idling position thereof;

FIGURE 10A is a plan view of the composite lever assembly for actuating said throttle-valve as viewed from the line 10A—10A of FIGURE 10, and showing the connections of said lever assembly with a pair of electric solenoids energizable to open and close, respectively, said throttle-valve;

FIGURE 10B is a view similar to FIGURE 10 but showing the relative positions of the parts corresponding to the accelerator operated to increase engine speed, and the throttle-closing solenoid energized to overrule the existent accelerator position thus idling the engine;

FIGURE 11 is a section through the interrupter switch interposed in the downshifting branch of the synchronizer switch circuit shown in normal open position with the clutch fully engaged;

FIGURE 12 illustrates optional carburetion interrupting means adapted to decrease engine speed automatically irrespective of the engine-accelerating position of the accelerator pedal, the parts being shown in normal positions for engine operation;

FIGURE 12A is a fragmentary enlargement of FIGURE 12 to clarify the details of the optional engine-idling means;

FIGURE 13 is an operated depiction of the engine-idling means shown in FIGURE 12, effective to negate the fuel-mixing function of the carburetor to thereby reduce engine speed below that defined by the existent position of the accelerator pedal in an engine-accelerating direction of control;

FIGURE 14 schematically represents a novel electro-vacuum control system for the clutch disengaging servo (motor) and said novel synchronizing mechanism embodied in the clutch assembly, the different control devices interposed in the included vacuum and electric circuits being shown in operating positions corresponding to full engagement of the clutch assembly with the engine stopped as shown in FIGURE 1, the associated change-speed gearbox in neutral, the vehicle standing, and wherein the electric circuits are indicated by dashed lines when de-energized and by solid lines when energized;

FIGURE 14A is a view similar to FIGURE 14 but showing certain portions of the electric circuits energized to condition the clutch-servo to disengage the clutch (see dashed line position in FIGURE 1), with a selected starting gear engaged preparatory to starting the vehicle;

FIGURE 14B is another view similar to FIGURE 14 but showing an operating status corresponding to energization of the upshifting synchronizing circuit to effect throttle closing to idle the engine into synchronism with the clutch driven member (output shaft) prior to lock-up of the clutch members following completion of a selected upshift at vehicular speeds of 5–7 m.p.h. or above;

FIGURE 14C is another view similar to FIGURE 14 but showing a different operating status corresponding to energization of the downshifting circuit to effect throttle opening to speed up the engine into synchronism with the existent speed of the clutch driven member (output shaft) prior to lock-up of the clutch members following completion of a selected downshift 5–7 m.p.h. or above;

FIGURE 15 is a vertical section of the solenoid-operated control valve shown in FIGURE 14, the solenoid being energized with the valve element displaced into open position for motor energization to disengage the clutch;

FIGURE 16 is a longitudinal horizontal section taken along the line 16—16 of my patented accelerator-operated switch mechanism forming part of FIGURE 14, and which is adapted to control the solenoid-operated valve for the clutch motor;

FIGURE 17 is a fragmentary view of FIGURE 16 on an enlarged scale showing the parts in operating positions corresponding to open-contact status in response to operating the accelerator in an engine-accelerating direction;

FIGURE 18 is a fragmentary sectional view showing on an enlarged scale the yieldable centralizing mechanism forming part of the shift-lever controlled structure depicted in FIGURE 14, and which is adapted to position the steering column mounted parts actuated by the shift-lever in their respective normal neutral positions, and to accommodate selective operation of an interrupter switch operably associated therewith to its open and closed positions, said switch being interposed in the upshifting branch of the electric control circuit to complete in part energization of the throttle-closing means or carburetion interrupter to idle the engine or lower its speed during upshifting operations;

FIGURE 19 is a transverse section taken along the line 19—19 of FIGURE 18 to clarify the operating structure for the interrupter switch;

FIGURE 19A is a sectional view on an enlarged scale of the interrupter switch shown in FIGURE 19 wherein the switch contacts are open;

FIGURE 20 is a plan view taken from the line 20—20 of FIGURE 19 to show the H-pattern of control recesses in the actuating plate for closing the interrupter switch and accommodating open status thereof in response to selective movements of the shift-lever;

FIGURE 21 is a view similar to FIGURE 18 but showing the yieldable centralizing mechanism in operating position corresponding to the shift-lever in its upper plane of movement; and FIGURE 22 is a view similar to FIGURE 18 showing the yieldable centralizing mechanism in a different operating position corresponding to the shift-lever in its lower plane of movement.

Referring now to the drawing, and particularly to FIGURE 1, there is disclosed an automotive internal-combustion engine "E" indicated by a portion of its crankshaft "CS" and connected flywheel "FW." The flywheel incorporates a spring-engageable friction clutch generally designated "CL" of conventional construction and operation and adapted when engaged to connect the engine to the change-speed gearbox indicated generally by the reference character "GB" applied to fragmentary portions of its housing and gear train contained therein, and through which the road wheels of the vehicle are driven at different gear ratios as is well known in the art.

As best shown in FIGURE 1, the engine driven clutch CL is operatively incorporated on the flywheel FW, and enclosed by a transmission adapter housing 10 which also encloses the flywheel, the latter being fixed as by bolts 11, or otherwise, to the rear flange 12 of the crankshaft CS for co-rotation. The rear face of the flywheel carries a cup-shaped backing or cover plate 13 attached thereto as by cap screws 14 or otherwise, said plate having mounted thereon a movable pressure plate 15 adapted to have relative axial movement only toward and away from a frictional working surface 16 defining the peripheral confronting face portion of the flywheel as shown. The pressure plate 15 is provided at its periphery with a plurality of integral bosses 17 radially slotted at 18 and equally spaced circumferentially normal to the plane of the pressure plate. These bosses are adapted to project rearwardly through suitable openings 19 in the peripheral marginal end wall 20 of the cover plate 13 whereby the pressure plate and cover rotate as a unit with the aforesaid relative axial movement therebetween accommodated. The pressure plate 15 is actuatable by the usual clutch releasing levers 21 (usually three in number), equally spaced circumferentially, and which have their outer ends pivotally engaging the slots 18 in the bosses 17 at 22. Intermediate the aforesaid pivotal connection of the levers and their inner free ends, the levers 21 are pivotally connected at 23 to the backing plate 13 as by horizontal supports (struts) 24 having their free ends slotted at 25 and the other ends thereof fixed to the inner peripheral face of the plate end wall 20 as by cap screws 27 or otherwise, whereby, pressure applied to the free ends of the levers 21 is effective to withdraw the pressure plate 15 from the friction surface 16 to disengage the clutch CL as is understood.

Positioned between the backing plate 13 and the pressure plate 15, is a plurality of normally compressed clutch-engaging springs 28 (usually nine in number), and which serve to urge the pressure plate 15 toward the flywheel in opposition to reaction from the clutch releasing (disengaging) levers 21, the inner ends of said levers being acted on by a clutch throw-out bearing 29 actuatable by a clutch actuator such as the conventional clutch pedal "CP," or by an energizable clutch-servo disclosed herein as a pressure differential operated motor of the bellows-type, said motor being generally designated by the reference character "VM," and which is adapted to separate the pressure plate 15 from the friction surface 16 on the flywheel and thereby disengage the clutch CL. The end wall 20 of the backing plate 13 is formed with an inturned annular flange 30 inwardly offset from the wall proper, said flange defining a central circular opening 31 adapted to accommodate free movement of said throw-out bearing in engagement with the inner ends of the clutch releasing levers 21 to actuate the same in opposition to the springs 28, to disengage (open) the clutch CL.

The clutch assembly CL additionally includes a driven or output shaft 33 having its forward exposed end portion formed with two stepped smooth reduced diameter portions 34, 35 with the terminating smaller portion 34 piloted in a bearing 36 mounted in a circular aperture 37 centrally disposed in the flywheel FW as shown in FIGURE 1. The driven shaft 33 projects rearward through the clutch assembly CL and passes freely through a tubular support member or extension 38, the rear end of the latter terminating in a hollow bearing and oil retaining flange 39 mounted on the forward face of the gearbox end wall 40 as by cap screws 41 or otherwise, to stabilize a ball bearing 42 mounted in a circular opening 43 through said latter end wall, said latter bearing being adapted to support the rear end of the driven shaft 33, and the said housing 10 radiates in bell-shaped fashion from said end wall for attachment to the engine block, as commercially practiced, by a plurality of cap screws 44 which secure mating flanges on the engine block and housing to produce a rigid assembly thereof as shown. The driven shaft 33 is provided with an exposed externally splined portion 45 which merges with the larger reduced portion 35, the latter portion being adapted to abut the side of the bearing 36 and thereby providing an annular space 46 between said bearing and forward end of said splined portion 45. The aforesaid space will be importantly referred to in the course of the description to follow. A hub 47 provided with a medially disposed outstanding circular flange 48, is slidably splined on the splined portion 45 for co-rotation therewith. A clutch disc 49 is carried on the hub 47 to one side of the flange aforesaid, and secured thereto by means of a plurality of coil-type compression springs 50 (usually six in number), said springs being equally spaced circumferentially and serve to cushion sorque impact between the hub flange and clutch disc as shown. A balance ring 51 is disposed on the other side of the hub flange. The cushioning springs are normally compressed, and more particularly carried by the hub flange in a corresponding number of radially offset slots 52 provided in the peripheral marginal portion thereof and normally registering openings 53, 54 in the disc 49 and balance ring 51, respectively. The clutch disc 49 and balance ring 51 form a unitary assembly by means of rivets 55 provided with spaced shoulders formed by diminishing opposite end portions thereof, and which extend through aligned holes in the disc and balance ring, and peened at opposite ends, with their normal (intermediate) body portions spanning the space between the disc and ring and projecting through medial portions of elongated cutouts 56 in the periphery of the hub flange which also occupies the space between the said disc and ring as shown. Thus, it is seen that the disc 49 and balance ring 51 provide a housing for the said hub flange, and the elongated cutouts cooperate with the normal body portions of the rivets to provide limited two-directional relative rotational movement between the hub flange, and disc and ring assembly in opposition to the centralizing action of the cushioning springs 50 to yieldably stabilize the rivet bodies in the center of their respective cutouts in spaced relationship with respect to opposite ends thereof when the disc 49 is free.

Opposing outer peripheral marginal faces on the clutch disc 49 are provided with composition friction linings 57, 58, respectively. The interposition of these linings with respect to the flywheel and pressure plate serves to frictionally clamp the disc 49 between the frictional surface 16 and plate 15 when the latter is activated by the clutch-engaging springs 28 to engage the clutch CL. Accordingly, the clutch disc 49 serves to couple the flywheel FW to the clutch driven shaft 33 for transmission of drive torque from the engine E to the associated gearbox GB, said disc assembly may therefore be termed the "clutch driven member" while the pressure plate 15 and connected flywheel may be termed the "clutch driving member" for flexibility in terminology.

Retraction of the pressure plate 15 from the flywheel FW releases the disc 49 to disengage the clutch friction members while actuation of the pressure plate 15 toward the flywheel FW under influence of the clutch-engaging springs 28 frictionally locks the disc 49 and flywheel to rotate as a unit corresponding to lock-up condition.

The motor VM and clutch pedal CP are illustrative examples of means for controlling the clutch CL, and therefore form no part of the present invention. However, the following brief description is believed apropos to clarify the environmental nature of the present invention in which its advantages are achieved. The motor VM is arranged concentrically with respect to the clutch driven shaft 33 within the housing 10 as shown in FIGURES 1, 8 and 9, to produce a compact power assembly for operating the clutch, said motor being preferably the bellows-type to avoid lubricating problems and comprises: a stationary head 60 attached to the forward ends of support rods 61 projecting forwardly from the end wall 40 of the gearbox GB, and a movable head 62 slidable on said rods, said heads being interconnected by an accordion-type bellows 63 as shown to provide interiorly thereof a variable power chamber 64 in communication with a conduit 65 connected to the movable head as shown, said conduit leading to a source of pressure different from atmosphere, such as the vacuum (negative pressure) produced within the intake-manifold "IM" of the engine E. When air is evacuated from said power chamber, pressure differential reacts on the movable head 62 to move the same forwardly toward the stationary head 60, the latter head having a central tubular extension 66 telescopically receiving a tubular work-performing element 67 integral with the movable head 62, said work element being slidably supported on the tubular support member 38 aforesaid in cooperation with said support rods to maintain the movable head 62 in a straight path of movement. The mating surfaces between said extension 38 and work element are suitably sealed as shown against leakage of the power chamber, and the work element projects beyond the forward face of the stationary head 60 into operative engagement with the aforesaid throw-out bearing 29 whereby the clutch-releasing levers 21 are actuated to disengage and control re-engagement of the friction members of the clutch CL in a well known manner, relative sliding movement of the movable head 62 with respect to the stationary head 60 from the position of FIGURE 1 to the dashed line position shown in this figure, being effective to actuate the throw-out bearing 29 and therefore the releasing levers 21 to withdraw the pressure plate 15 from the friction surface 16 on the flywheel FW to disengage the clutch CL.

The clutch pedal CP is connected to a horizontal clutch-controlling arm 70 intermediately pivoted at 71 on the forward side of the gearbox end wall 40 by means of a strut as shown in FIGURE 8. The inner end 72 of said arm straddle mounts the aforesaid tubular extension 38 through which the driven shaft 33 passes, and which is adapted to engage the outer side of the movable wall 62 to move the same, while the outer end portion 73 of the arm projects through a side opening 74 in the housing 10 and a flexible cover 75 anchored to the marginal portion 76 of said opening, the extremity of said outer portion being connected by a link 77 to the clutch pedal as shown. A pedal-arm return spring 78 serves to retract the pedal and connected arm 70 to its normal position wherein the inner end of said arm is spaced from the movable head 62 as shown in FIGURES 1 and 8. It is thus seen that the clutch CL can be disengaged by merely depressing the clutch pedal CP which acts via said arm 70 against the movable wall 62 and connected work element 67 to actuate the throw-out bearing 29 and thereby effecting clutch disengagement by operator force alone in the event of power failure, or in the case where power is not employed as the actuating force for said clutch.

*Synchronizing mechanism for clutch members*

Operatively incorporated between the driving and driven members of the clutch CL is synchronizing mechanism of novel and improved construction and operation, and which will hereinafter be designated generally by the reference character "SY." This synchronizing unit comprises: first and second drive elements disclosed herein as a pair of juxtaposed circular plates generally designated $P^1$ and $P^2$, respectively, having coaxial circular openings 82, 83, respectively, through which a forward portion of the reduced diameter portion 35 of the driven shaft passes, to thereby serve as a support for said pair of plates in juxtaposition with respect to the rear side of the bearing 37. Accordingly, the pair of plates is operatively positioned on the shaft portion 35 in the annular space 44 previously referred to at the forward side of the latter best demonstrated in FIGURE 6. The first plate $P^1$ is formed cup-shaped by a vertical wall 84 and an out-turned circular flange 85 defining the periphery of said wall, the forward edge of said flange abutting the confronting face portion on the flywheel FW is effective to stabilize said plate in parallel relationship to said flywheel. A plurality of embossments 86 is extruded from said vertical wall 84 in a direction opposite to said flange. These embossments are equally spaced circumferentially in radially offset relation with respect to the axis of the driven shaft 33. A circular aperture 87 is provided through the peripheral portion of said wall adjacent the inner side of said flange, and through which a pin 88 passes from the flywheel FW to lock the latter to said plate $P^1$ to rotate as a unit as shown in FIGURE 1. Juxtaposed on the right side of plate $P^1$ is the second plate $P^2$ which is provided with a like number of circular recesses 89 of smaller diameter than the embossments in the first plate, and which are adapted to receive the major portion of the full outer contours of said embossments 86 as shown when the plates $P^1$ and $P^2$ are in normal positions corresponding to reduction of engine speed. The cooperative interaction of the embossments 86 and recesses 89 produces what may be termed a "camming action" effective between the first and second plates to axially separate them in response to limited relative rotational movement induced by relative underspeed of the driven member 49 with respect to the speed of the engine to thereby convert such rotational movement into limited axial movement of the second plate $P^2$. The second plate $P^2$ is also provided with a cutout 90 having spaced radial shoulders 91, 92 in its periphery through which pin 88 passes, said cutout being wider than the diameter of said pin to accommodate normal medial disposition thereof and thereby enabling opposite relative rotation in both directions of said plates as a function of limited relative rotation of said plates according to which of the clutch friction members of the clutch CL is rotating faster than the other. Accordingly, when the second plate $P^2$ takes up the position shown in FIGURES 1 and 5 induced by the camming action of the embossments and recesses 86, 89, respectively, in response to relative underspeed of the second plate with respect to the first plate, the cutout shoulder 91 abuts the pin 88 as shown. This last-mentioned position enables reduction of engine speed to match substantially the speed of the driven clutch member 49 as in the case of upshifting the gearbox GB, while in the case of performing a downshift, the gearbox GB requires increase in engine speed to match that of the driven member 49 to actuate the second plate $P^2$ to take up its other axial position of control shown in FIGURES 6 and 7 wherein the shoulder 92 of the cutout 90 abuts the opposite side of the pin 88, and, due to the relative rotation of the plates prior to synchronism being established between the driving and driven clutch members of the clutch CL, the camming action effected by the embossments 86 and cooperating recesses 89 has partially disengaged them and thereby forced the second plate rearward relatively to the first plate to the position of FIGURE 6 to axially displace the second plate to the operating position shown. It should be importantly noted that when the two plates $P^1$ and $P^2$ are in normal disposition as shown in FIGURES 1 and 5, the embossments 86 and recesses 89 are restored to partially engaged coaxial disposition wherein said plates are slightly spaced due to the difference in diameters of the embossments and recesses which prevents the embossments from fully entering said recesses. Moreover, in the operated disposition of the two plates as demonstrated by FIGURES 6 and 7, the cooperating embossments 86 and recesses 89 in the plates $P^1$ and $P^2$, respectively, never fully disengage thereby preventing the summits of the embossments from coming into contact with the face proper of the second plate $P^2$, the purpose of which being to prevent negating camming action between said plates when in the relative actuating disposition of FIGURES 6 and 7 so that the plates are continuously biased in part toward normal relationship by such camming action as shown in FIGURE 1. A pin 94 projects from the peripheral face of the second plate toward the right of said plate to serve as a drive connection to an annular brake and drive element 95 which is frictionally mounted on the forward conical exterior surface on the hub 47. This drive element has a cutout 96 in its normal periphery which receives the free end of pin 94 to lock the second plate $P^2$ to rotate as a unit with said latter element, and also accommodates relative axial movement between the second plate and drive element, said latter element being preferably made of a synthetic material such as Nylon to minimize wear and maintain a substantially uniform frictional coefficient with its mating surface on the hub 47. A tapered frictional surface 97 defines the inner face of the drive element 95, and which frictionally cooperates continuously with a complementally tapered surface 98 on the forward exterior of the hub 47. The frictional coefficient obtaining between said surfaces 97, 98 as defined by a normally compressed spring 100 reacting between the flywheel proper and an outstanding circular flange 101 integral with the rear end of said brake and drive element and which also defines the right end face of the latter element, is of such magnitude so as to rotate the drive element 95 by the driven member 49 of the clutch CL to establish the second plate $P^2$ in one or the other of its relative operating positions of control, and to thereafter accommodate slipping engagement therebetween without disturbing the existent operating position thereof prior to lockup of the clutch CL, such frictional drive of the element 95 being converted into a braking action to momentarily hold the second plate from slipping relative to the clutch hub 47 to induce relative rotation between said plates and thereby establishing the second plate in its other operating position of control, whereupon slipping engagement occurs between the driven member hub 47 and drive element 95 to prevent interruption of the existent other operating position so that synchronism can be completed between the clutch members prior to lock-up thereof. It is thus seen that the friction drive element 95 serves a twofold purpose, namely: (1) to frictionally rotate the second plate relatively to the first plate to establish the second plate in operating position to increase engine speed as in the case of downshifting the gearbox GB, and (2) to brake the second plate to enable the first plate to rotate relatively thereto to establish the other operating position of the second plate to lower engine speed as when upshifting the gearbox GB, but in either circumstance, upon establishing the selected operating position of the second plate, the brake and drive element 95 accommodates release of the hub 47 to rotate relatively thereto until synchronism becomes effective between the driving and driven members 15, 49, respectively, of the clutch CL.

Figure 2:
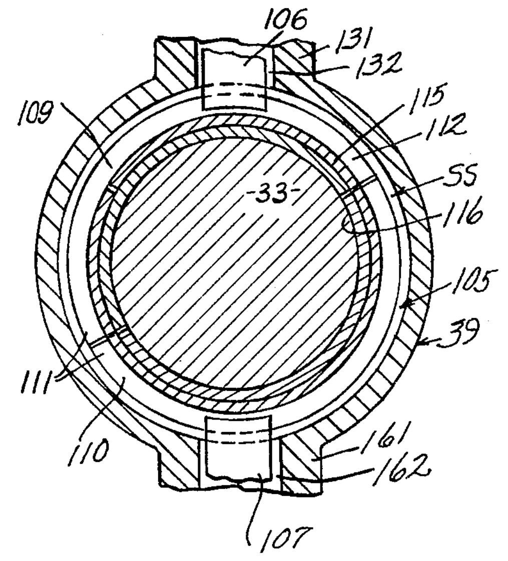
FIGURE 2 is a transverse section taken along the line 2—2 of FIGURE 1A showing details of the switch device controlled by said synchronizer.
Figure 3:
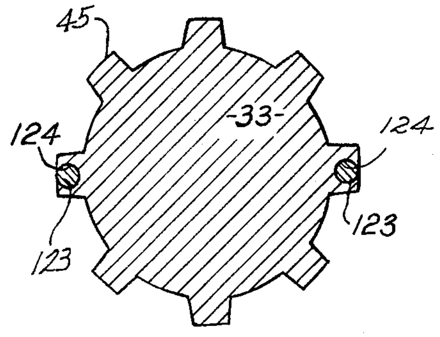
FIGURE 3 is another transverse section taken along the line 3—3 of FIGURE 1B to show the pair of diametrically positioned longitudinal grooves in the clutch output shaft, and the switch actuating rods slidable therein.
Figure 4:
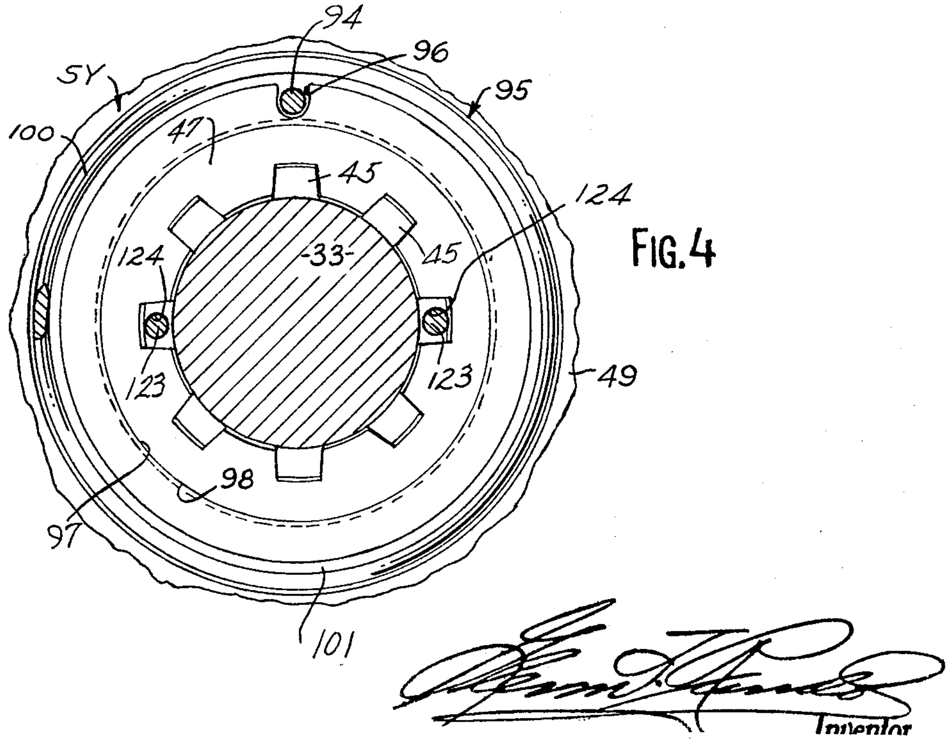
FIGURE 4 is another transverse section taken along the line 4—4 of FIGURE 1B showing the frictionally-mounted brake and cooperating drive element of the synchronizer.

The second plate $P^2$ is characterized by having its relative rotational movement with respect to the first plate $P^1$, converted simultaneously into axial movement to operate a control device herein disclosed as a double-throw switch generally designated "SS." This synchronizer switch SS comprises: a movable contact unit 105 and a pair of fixed contacts 106, 107 selectively cooperable therewith to selectively provide two operating (closed-contact) positions of control. The movable contact is operatively positioned in an annular space 108 formed in the driven shaft 33 in rearward spaced relationship with respect to the forward splined portion 35 on said shaft, said switch being housed in the forward portion of the bearing retainer flange 39 as shown. The movable contact is constructed of two semicircular sections 109, 110 which in assembled status in the space 108 form a ring-like element 111 composed of electrically conductive material, and the outer circular surface of this element is defined by spaced annular flanges 112, 113. A split contractible retaining ring 115 is received within said space between said flanges (see FIGURE 2) to maintain the assembled status of the two sections 109, 110 on the shaft 33 in intimate contact with the bottom 116 of the space 108, the thickness of said retaining ring being less than the normal depth of said space between said flanges 112, 113 whereby the outer cylindrical surface of said retaining ring defines the working depth of the space 108 as shown in FIGURES 1 and 2. The annular space 108 is of such width that additional space is provided between the right side of the switch unit 105 and the confronting annular shoulder 119 defining the right end of said annular space, with the annular shoulder 120 defining the forward (left) end of said annular space normally abutted by the left side of said switch unit 105. An annular resilient member (spring) 121, preferably composed of rubber, is incorporated in said additional space to axially bias the switch unit 105 into abutting relationship with the shoulder 120 as shown in FIGURE 1, said rubber member (band) being adapted to accommodate relative axial movement of the switch unit 105 with respect to said driven shaft 33, under influence of axial movement of the second plate $P^2$ to one of its switch operating positions corresponding to a downshift of the gearbox GB, axial movement of the second plate $P^2$ to its other switch operating position corresponding to an upshift of the gearbox GB is effected by the bias of said rubber band 121 to restore the relative disposition of the drive plates $P^1$ and $P^2$ to their respective normal relationship wherein the embossments 86 and recesses 89 are coaxially disposed. The aforesaid axial operating movements of the second plate $P^2$ are transmitted via a pair of diametrically opposed rods 123 to the movable contact unit 105 whereby the latter is axially displaced in opposition to the reaction from the resilient band (spring) 121, said rods being slidably supported in longitudinal bores or surface channels 124, as dictated by design, correspondingly formed in and radially offset from the axis of the clutch output shaft 33 to enable the rods and shaft to rotate as a unit best demonstrated in FIGURES 1, 3, 4 and 9.

The stationary switch contacts 106, 107 are preferably fabricated from electrically conductive metal strips having a springy characteristic, and which project inwardly toward the axis of the driven shaft 33 in preferably diametrically opposed relationship into the space between the flanges 112, 113, with the extremities thereof spaced from the retaining ring 115. The upper contact 106 is anchored at its outer end 126 by a headed terminal post 127 which projects through an insulative bushing 128 flanged at its inner end 129. This bushing is fitted into an opening 130 through the vertically disposed wall 131 of a hollow embossment 132 projecting forwardly from the upper side of the retainer flange 39 as shown in FIGURE 1. The terminal post 127 has a threaded end portion 133 opposite its head which receives an insulative washer 134 and a lock-nut 135 to impinge said washer and bushing between the post head and nut thereby fixing said post and attached outer end of said contact 106 to the inner side of the embossment wall 131. As the drawing shows, the outer end portion of the contact 106 is parallel to the inner face of the wall 131, and the inner end portion 137 extends normal to the axis of the driven shaft 33 into the space between the flanges 112, 113, with the extremity thereof spaced radially from the retaining ring 115 in normally spaced confronting relationship with respect to the inner faces of the contact flanges 112, 113 wherein the switch device SS is in open position to interrupt an electric circuit controlled thereby. Since the switch strip 106 is made of springy material, it is evident that when the cooperating contact 105 is displaced from its normal operating position shown in FIGURE 1 to its other operating position shown in FIGURE 6, the inner face of contact flange 112 is brought into engagement with the inner end portion 137 of the fixed contact 106 to close in part the electric circuit controlled thereby. The flexible characteristic of contact 106 enables the movable contact 105 to be displaced to a position at which the inner end portion 137 is placed under some tension out of its normal position to insure that its end connection with the inner face of the movable contact 112 is maintained despite relative rotation of the latter contact with respect to contact 106. Thus a "wiping" action ensues between the inner end portion of the contact 106 and contact 105 during closed status of the synchronizing switch SS in this operating position. The movable contact 105 in its assembled status in the annular space 108 under influence of the retainer ring 115 and rubber band 121 would rotate as a unit with the driven shaft 33 to produce the above noted relative rotation during closed-contact status of the contact 106, however, upon the contact 105 coming into engagement with either of the fixed contacts in the manner above described, this added frictional drag on the element 105 may tend to cause the latter to have some "slipping" relationship with respect to the driven shaft 33 which action would in no manner affect the normal operativeness of the switch device SS to either of its two closed conditions. Therefore, the invention contemplates that the movable contact 105 may be characterized by rotational movement as a unit with said driven shaft 33 or relative rotation with respect to said driven shaft 33, and in both cases relative axial displacement of said contact 105 is requisite to selectively close the switch device SS. It is therefore seen that the movable contact 105 serves as a collector ring characterized by low rotative velocity due to its extremely short radial distance from the axis of the driven shaft 33 which characteristic provides long service life by using minimal working surfaces between the cooperating contacts 106, 107 when engaged, said collector ring being grounded at 139 to the shaft 33.

The exposed threaded portion of the terminal post 127 is connected to a lead 140 by a terminal 141 clamped between the lock-nut 135 and a jam-nut 142. This lead is connected to one side of throttle-opening means generally designated "TO," and actuated by a solenoid "$S^a$" energizable to open the throttle-valve or plate "TP" of the conventional carburetor "CR" to speed-up the engine. At this point it should be importantly noted that the engine accelerates until speed of the clutch driving member (flywheel and pressure plate) slightly overlaps the speed of the driven clutch member 49 which relationship induces the synchronizer drive element 95 to lag with respect to the drive plate $P^1$ and thus actuates the connected drive plate $P^2$ to its normal operating position shown in FIGURE 1 thereby closing the engine-decelerating switch contacts 107, 113 and opening the engine-accelerating switch contacts 106, 112, closing of the former switch contacts completes in part the control circuit to modulate the carbureting function of the carburetor to decrease engine speed to that of the driven clutch member 49 prior to lock-up of the clutch members during upshifting operations.

While I have shown the switch contact 106 formed from a springy metallic strip such as copper or brass, it is to be understood, that commercial forms of spring-loaded brushes may be employed in lieu of such metallic strip, and that such brushes would engage the rotary contact 105 to have wiping engagement therewith to complete in part its branch of the associated electric circuit and, as stated above, the flexible characteristic of the contact 106 enables slight overrunning engagement with the rotary contact 105 to insure against fortuitous interruption of the engaged conducting areas therebetween.

Referring now to the lower fixed contact 107 disposed on the underside of the driven shaft 33, and which is anchored at its outer end 156 by a headed terminal post 157 which projects through an insulative bushing 158 flanged at its inner end 159. This bushing is fitted into an opening 160 through the vertically disposed end wall 161 of another hollow embossment 162 similar to the aforesaid embossment 132, and diametrically disposed opposite thereto, and projecting from the underside of the retainer flange 39 as shown. The terminal post 157 has a threaded end portion 163 opposite its head which receives an insulative washer 164 and a lock-nut 165 to impinge said washer and bushing between the post head and nut thereby rigidly anchoring said post and attached outer end of said contact 107 to the inner side of the embossment wall 161. As the drawing shows, the inner end portion 167 of the contact 107 which extends from its anchored end 156, is parallel to the inner face of the wall 161, and extends upwardly normal to the axis of the driven shaft 33 into the space between the contact flanges 112, 113, with the extremity thereof spaced from the retainer ring 115, and normally abutted by the inner face of the contact flange 113, wherein the synchronizer switch SS is in its other closed position to complete in part an electric circuit controlled thereby. Since the switch strip 107 is made of springy material same as contact 106, it is evident from an inspection of FIGURES 1 and 2, that when the cooperating flange 113 of the movable switch contact 105 is displaced forwardly to its said normal operating position shown in FIGURE 1, the inner face of the contact flange 113 is brought into engagement with the inner end portion 167 of contact 107 to close the electric circuit controlling the idling (engine-speed lowering) function of the carburetor CR. The flexible characteristic of the contact 107 enables the movable contact 105 to be displaced to a relative position wherein the inner end portion 167 is slightly displaced out of normal disposition thereby tensioning the contact 107 to insure its connection with the inner face of the contact flange 113 is not interrupted despite relative rotation of the latter with respect to said contact 107. This latter contact has a "wiping-action" similar to contact 106 with the movable contact 105 when engaged to close the associated electric circuit.

The exposed threaded portion of the terminal post 157 is connected to a lead 170 by a terminal 171 clamped between the lock-nut 165 and a jam-nut 172. This lead connects to one side of throttle closing means generally designated "TC" (see FIGURES 10–10B), or optionally to one side of a carburetion interrupter generally designated "CI" (see FIGURES 12–13) in operative association with the conventional carburetor CR, said interrupter being adapted when energized to control in part lowering of engine speed irrespective of the position of the throttle-valve (plate) in an engine-accelerating direction. In this connection it is important to note that the engine decelerates until the speed of the clutch driving member (flywheel and pressure plate) slightly overlaps the speed of the clutch driven member 49, the latter relationship being effective to induce the synchronizer drive ring 95 to rotate ahead of the drive plate $P^1$, and carry with it the drive plate $P^2$ to its other operating position wherein the engine-accelerating contacts 106, 112 are closed, and the engine-decelerating contacts 107, 113 open thus closing the contacts 106, 112 which completes in part the control circuit to the throttle-opening solenoid $S^a$ thereby adjusting the throttle-valve to increase the speed of the engine with resultant synchronization of the clutch members 15, 49 prior to lock-up drive during downshifting operations, while speed of the engine is decreased from an accelerating position of the throttle-valve during the interval in which engine speed exceeds that of the driven member 49 during upshifting operations until the aforesaid overlapping relationship occurs to actuate the drive plate $P^2$ to its down-shifting position thereby displacing the switch element 111 to engage contacts 106, 112 and thereby energizing the throttle-opening solenoid $S^a$ for engine speed increase. It is therefore seen that the switch device SS is provided with a downshift switch 106, 112, and an upshift switch 107, 113 to modulate engine speed into synchronism with the speed of the gearbox input shaft 33 and connected driven clutch member 49 prior to lock-up of the clutch friction members, and thereby producing smooth transition from one speed to another.

*Automatic throttle-valve control means*

The previously mentioned engine-throttle opening means TO illustrated in FIGURE 10 and 10A are substantially conventional in construction and operation, and therefore will only be described briefly to establish the operative relationship thereof with the downshifting phase of gearbox control, and synchronism of engine speed to produce smooth transition during said phase as a function of the synchronizer SY selectively activatable in response to asynchronous rotation of the clutch members 15, 49. The throttle-opening means comprise: the solenoid $S^a$ having a sleeve-like winding 180 contained in a metallic cup-shaped casing 181 which is closed at one end and open at the other, the open end being closed by a detachable cover 182 provided with a central circular embossment 183 having a reduced threaded portion 184 through which one end of a slidable armature 185 projects to the exterior, the inner portion of said armature projecting into a metallic sleeve 186 defining the core of said winding whereby energization of said winding produces a magnetic field effective to axially move said armature relatively to the winding in a protractile thrust-applying direction. The inner and outer terminating ends of the winding are connected, respectively, to terminal posts 187, 188 fixed on the cover 182 and suitably insulated therefrom. Connected in series with these terminal posts is the previously mentioned lead 140 as shown, and the other terminal post 188 is connected to a source of electrical energy whereby a circuit branch "DS" for downshifting synchronizing control by switch device SS is completed.

The solenoid assembly $S^a$ is suitably mounted, preferably at an angle as shown, by means of a bracket 191 having its lower horizontal segment 192 attached to the carburetor CR as shown, and an upstanding angular segment 193 provided with a hole at 194 to receive the reduced threaded portion 184. A clamp nut 195 is tightly threaded onto the exposed portion 184 to impinge the upper end of the bracket between the top of the embossment 183 and said nut to thereby mount the solenoid $S^a$ in operating position on the exterior of the carburetor CR as shown in FIGURE 10.

The outer end of the armature 185 is provided with an elongated slotted working head 196 which may be axially adjusted to have the correct working stroke in relationship to a double-arm lever "DA" actuated thereby. This double-arm lever is suitably fixed intermediately thereof to the exposed portion of one end of the throttle-plate shaft 197 for corotation therewith. This double-arm lever comprises: an upper angularly disposed arm 198 adapted for its free end to be engaged by the armature head 196 for rotation thereby, and a lower arm 199. A third arm 201 is loosely mounted on the shaft 197 in spaced juxtaposed relation with respect to the arm 199. A normally tensioned torsional spring 202 encircles the throttle shaft in the space between said arms 199, 201, with opposite legs of said spring reacting between the two last-mentioned arms, respectively, as shown to bias them into normal operating relationship as shown in FIGURES 10 and 10A wherein the arms 199, 201 coincide. Accordingly, the spring 202 serves as a yieldable force-transmitting connection between the double-arm lever and the third arm to enable the lever DA to have relative rotation with respect to the third arm in both a throttle-closing and a throttle-opening direction, said third arm being connected by a link 204 included in a linkage system "AL" the accelerator pedal as shown. Adjustable stop means for the arms 199, 201, are provided on the exterior of the carburetor body in the form of a lateral integral boss 205 provided with a threaded hole 206 to receive a manually adjustable screw 207 engageable by edge portions of arms 199 and 201 to limit the throttle-closing movement of the throttle-plate TP to a position wherein engine-idling control is effective as is understood.

In operation, it will be noted that the normal spring loaded status of the double-arm and third arm biases them into their normal working relationship as shown in FIGURES 10 and 10A to rotate as a unit for throttle-plate operation by the accelerator pedal (see FIGURE 14). Under normal accelerator control of the engine, the two arms DA and 201 rotate in unison due to the bias of the spring legs toward each other on opposite sides thereof, which yieldably holds said arms in such normal co-rotational relationship as shown in FIGURE 10. Thus, under normal engine operations, the throttle-plate TP is actuated under influence of the accelerator via the two arms DA and 201 rotating as a unit, but if a downshift of the gearbox GB is made, for example, a shift from direct to intermediate speed, engine speed would have to be increased to match the speed of the clutch driven member 49 rotating according to such newly establish speed for smooth transition between these two speeds. Under these circumstances, the synchronizer SY would automatically take up its downshifting position of control as shown in FIGURES 6 and 7 to close the contacts 106, 112 thereby completing in part the branch circuit DS which when completed the solenoid $S^a$ would be energized to protract its armature 185 against the upper end of arm 198 and thereby rotating the same in a counterclockwise direction relatively to the existent accelerator pedal established position of the third arm, such relative rotation being accommodated by yielding of the spring 202 which is of less strength than the accelerator return spring to prevent the accelerator from leaving the foot in its halted position when increased acceleration of the engine is required for synchronizing purposes. Upon engine speed slightly exceeding the speed of the clutch driven member 49, the branch circuit DS is completed in part by closure of the switch contacts 106, 112 but when engine speed slightly overlaps that of the driven member 49 in an underspeed relation thereto, the upshifting contacts 107, 113 are closed which breaks the branch circuit DS, enabling the spring 202 to restore the throttle-plate TP and connected arm DA to normal working relation with respect to the third arm 201 so that control of the engine is returned to the accelerator under supervision of the driver. When such overlap occurs in bringing engine speed into synchronism with that of the driven member 49, as stated above, the connection between contacts 106, 112 of the switch device SS is interrupted and connection between contacts 107, 113 established but despite closing of the latter two contacts, the circuit controlled by them remains open, additional controlling devices being required to complete this circuit.

An interrupter switch shown in FIGURE 11 and generally designated by the character "IS," is interposed in the circuit branch DS to prevent "shuttle-activation" of the throttle-opening means TO following circuit interruption when a downshifting operation has been completed and the synchronizer contacts 106, 112 disengaged and the upshifting operation conditioned in part by engagement of the contacts 107, 113 in the synchronizer switch SS. This interrupter switch is normally opened to break the circuit DS upon the movable head 62 of the clutch motor VM retracting to a position accommodating initial slipping engagement of the friction members 15, 49 of the clutch CL, but upon movement of the clutch motor wall 62 aforesaid to effect clutch disengagement, this switch automatically closes to complete in part the branch circuit DS for subsequent completion by closure of contacts 106, 112, such closing of the switch IS responding to the clutch friction members sufficiently separated to enable relative "slip" therebetween. The structure comprising this interrupter switch consists of a cup-shaped casing 211 having a hexagonal exterior, and provided with a reduced diameter axially bored extension 212 passing through one end of a support bracket 213 secured by a clamp nut 214 to fix the casing 211 to said bracket as shown. The other end of the bracket is clamped, as shown, to one of the motor support rods 61 for guiding the motor heads 60, 62, and thereby positioning the switch IS in operating position for actuation by the power head 62. An insulative cap 215 closes the open end of the switch casing. An actuatable element disclosed herein as a hollow plunger 216 is slidably disposed in the extension bore, the outer end of the plunger terminating in a semi-spherical end wall 217, and the inner open end thereof being adapted to engage the central underside of an insulative disc 218. This disc is normally biased toward the bottom of said casing by a normally compressed spring 219 which reacts between the inner side of said insulative cap 215 and said disc. The disc has a central upstanding pin 220 connected at one end thereto which pin carries at its other end, a circular contact armature 221. This armature is in the form of a disc and is provided with a pair of contacts 222, 223 which is adapted to bridge a pair of spaced contacts 224, 225, respectively, the latter contacts being carried by said insulative cap 215. The contact 224 is mounted upon an inturned inner end portion of an electrically conductive bracket 226 with the outer end of the latter attached to a terminal post 227 projecing through said insulative cap. In like manner, the contact 225 is mounted upon an inturned inner end portion of another electrically conductive bracket 228 with the outer end of the latter attached to a terminal post 229 extending to the exterior of said insulative cap 215. Attached to said terminal posts 227, 229 are their respective terminals for electrical connections to the lead 140 of the downshifting circuit DS as shown.

The operating stroke of the plunger 216, disc 217 and armature 221 which move as a unit, is defined by the normal position of the armature 221 in spaced relationship to the fixed contacts 224, 225 as shown in FIGURE 11. This space accommodates relative movement of the plunger 216 and connected armature 221 beyond that required to unbridge the fixed contacts 224, 225 to enable the movable power member (head) 62 of the motor VM to adjust rearwardly from its normal position corresponding to the installed thickness of the linings on the clutch driven member 49, but as these linings wear their thickness is reduced resulting in an increasing movement of the clutch pressure plate 15 toward its complemental friction surface 16 on the flywheel FW to effect lock-up of the clutch CL under influence of the clutch-engaging springs 28. Such changes in the point of clutch engagement react on the releasing levers 21 to proportionally move the throw-out bearing 29 and work element 64 to new positions to the right of the installed normal position shown in FIGURE 1. Accordingly, the plunger 216 of the switch IS must move a corresponding distance, such movement being provided by the spacing of the fixed contacts 224, 225 from the inner side of the insulative cap 215. Thus, the length of the brackets 226, 228 determines the amount of idle rearward movement the plunger 216 can move until excessively worn clutch linings need replacement. The function of this interrupter switch IS is to close upon the clutch members 15, 49 reaching a freely disengaged relation, that is, out of slipping contact, and while this point of closure will vary minutely as the clutch linings wear thinner as explained above, this condition will in no manner affect the operative sequence of this switch to close when the clutch CL is fully open (disengaged). In this manner, during "no-drag" disengagement of the clutch CL, the switch IS is closed to complete in part the downshifting circuit DS, closure of synchronizing contacts 106, 112 being required to energize this circuit; but in the event of an upshift while driving the vehicle, energization of the carburetion interrupter CI to automatically moduate engine speed into synchronism with that of the clutch driven member 49, effects closing of the downshift contacts 106, 112 upon completion of such upshift as a consequence of slight overlap of the speed of the driven member 49 with respect to the speed of the engine. This condition of energizing the throttle-opening means TO can only be momentary since the clutch CL is entering slipping phase of re-engagement at which point the interrupter switch IS opens to break the downshifting circuit DS notwithstanding the synchronizer contacts 106, 112 are closed under these circumstances. Thus, a fortuitous interval of "shuttle-activation" of the throttle-opening means TO is avoided, it being understood that synchronization of the clutch members 15, 49 is completed prior to slipping engagement of said members, and under which conditions it would be objectionable for the downshifting synchronizing control to come into action since such a phase of synchronization would serve no purpose whatsoever.

The throttle-valve closing means generally indicated by the reference character "TC" are also illustrated in FIGURES 10 and 10A and of substantially conventional construction and operation. The structure comprising the throttle-closing solenoid "$S^b$" is identical to that of the solenoid $S^a$ previously described in detail therefore reference may be made to such description for a clear understanding of the structural nature of solenoid $S^b$ which is mounted in a vertical position along side of the carburetor CR as shown. The upper reduced threaded portion through which the upper reduced portion of the armature 230 projects to the exterior, passes through a hole in a laterally extending horizontal flange 232 depending from the lower horizontal segment 192 of the mounting bracket 191. The reduced threaded portion is made fast to the flange 231 by a clamp nut 233 in the same manner as clamp nut 195 is employed to mount the solenoid $S^a$ on said bracket. The double-arm lever DA is fixed to the throttle-valve (plate) shaft 197 by means of a pin 234 pressed into registering holes in the normal body portion of a sheave 235 and said shaft. The sheave 235 is fixed to the intermediate portion of the double-arm lever, and is provided with a groove for reception of substantially a convolution of the upper end portion of a flexible cable 236 which is anchored at its extreme upper end in the sheave groove, and the lower end of the cable is fixed to the upper exposed end of the solenoid armature 230 as shown, whereby rotation of the throttle-valve shaft 197 in a counterclockwise direction as viewed in FIGURE 10 elevates the de-energized armature, that is, operation of the throttle-valve raises and lowers the armature to a corresponding position according to operation of the throttle-valve as is understood, but if the solenoid $S^b$ is energized to throttle the engine preceding an upshift which requires lowering engine speed under control of the synchronizer switch SS to bring the clutch members 15, 49 into substantial co-rotation before lock-up occurs, the de-energized armature will retract downwardly to impart a clockwise rotational movement to the sheave 235 therefore the throttle-valve toward engine-idling position of control notwithstanding the third arm 201 is stabilized in its position corresponding to the operating position of the accelerator pedal and connected linkage. Such movement of the double-arm lever DA relative to the third arm 201 under influence of the energized armature 230, is accommodated by yielding of the torsional spring 202.

Thus, the throttle-plate TP is operated normally by the accelerator pedal in the usual manner according to the engine speed and torque desired, but in the event of an upshift in the gearbox GB, for example, a shift from low speed drive to second (intermediate) speed drive, the speed of the engine would have to be lowered to match the speed of the gearbox input shaft 33 rotating in accordance with the newly established second speed drive, for smooth transition between these two speeds. Under these circumstances, the synchronizer SY would take up its upshifting position of control as shown in FIGURES 1 and 1B wherein the contacts 107, 113 are engaged as shown in FIGURE 1A, thereby completing in part the branch circuit US with resultant energization of the solenoid $S^b$ when said circuit is completed in a manner to be explained. Energization of solenoid $S^b$ retracts its armature and connected cable 236 to effect clockwise rotation of the sheave 235 thereby rotating the throttle-plate TP as a unit therewith toward engine-idling position of control thus modulating engine power for reduction in its speed from that defined by the position of the throttle-plate as established in response to accelerator pedal depression from normal idling position. This reduction of engine speed into synchronism with the speed of the gearbox input shaft 33, upon engine speed falling slightly below the speed of said input shaft, is effective prior to lock-up of the clutch CL to interrupt a branch circuit "US" therefore de-energizing the solenoid $S^b$. Upon such de-energization of the solenoid $S^b$, its armature 230 is released for movement according to the rotational status of the sheave 235 under influence of normal rotation as a unit with the third arm 201 interconnected by the torsional spring 202 to the double-arm lever DA, the normally preloaded (compressed) status of said spring being of such magnitude that when neither solenoid $S^a$ nor $S^b$ is energized, the double-arm lever and the third arm 201 rotate as a unit under operation-actuation of the accelerator pedal.

Accordingly, when the solenoid $S^b$ is de-energized upon completion of synchronization of the clutch members 15, 49 after effecting an upshift in the gearbox GB, the torsional spring 202 functions automatically to restore the throttle-valve TP to normal relationship with respect to the operating position of the accelerator pedal, and thereafter said throttle-valve rotates according to accelerator pedal movement until either an upshift or a downshift is required for proper control of the vehicle. During normal movement of the throttle-valve by the accelerator pedal and interconnecting linkage, the sheave 235 and cable connection 236 cooperate to raise and lower the solenoid armature 230 according to the direction of rotation of the sheave since the extreme upper end of the cable is anchored at such point in the sheave groove to have substantially a convolution of wrap in said groove when the throttle-valve TP is in engine-idling position as shown in FIGURE 10 and 10A.

*Engine-idling control means*

Referring now to the aforementioned engine-idling means CI which may be used as a substitute for the aforedescribed throttle-valve closing means TC since the function of both of these components is to momentarily interrupt engine operation to relieve torque on the gearing in the gearbox GB to facilitate upshifting sequence through the forward speeds thereof. This novel engine-idling control is illustrated in FIGURES 12, 12A and 13 wherein it will be observed that I have devised an entirely new and basic approach to the long existing problem of reducing engine speed automatically to facilitate speed changing without the need for returning the throttle-valve TP to idling position in opposition to a spring loaded accelerator and interconnecting linkage from any given engine-accelerating position thereof. This latter form of engine-idling control is shown in FIGURES 10 and 10A wherein solenoid $S^b$ is energized to retract its armature from any protractile position thereof induced by normal accelerator operation by the operator. Retraction of said armature is effective to impart clockwise rotation to the sheave 235 via said cable 236, to dispose the throttle-plate TP in the position shown in FIGURE 10 wherein the engine is operating at idle speed. The solenoid $S^b$ must be of sufficient working capacity to overcome reaction from spring 202 to effect such idle-speed setting of the throttle-plate. This torsional spring opposition to rotation of the throttle-plate back to its engine-idling position produces an undesirable time-delay where an extremely sensitized action is requisite for rapid upshifting of the gearbox GB, since it is the reduction of engine speed that adjusts the speed of rotation of the clutch driving member 15 co-rotational with said flywheel FW, to that of the clutch driven member 49 as in the case of an upshifting operation for smooth upshifting transition from one speed to another.

The art is known to be replete with various types of engine-idling devices associative with conventional carburetors such as illustrated herein at CR, such devices utilizing an energizable actuator such as a solenoid or vacuum-servo, to rotate the throttle-plate counter to normal rotation which produces engine acceleration, such counter-rotation being accommodated by yielding of a spring, such as spring 202, interposed in the accelerator linkage, said spring normally enabling the throttle-valve TP to move in both directions as a unit under accelerator-actuation until such time that idling or reduced speed of the engine is required, as when making an upshift speed-change, to prevent engine-racing, and to enable adjustment of engine speed to that of the transmission GB input shaft 33 for smooth upshifting transition and subsequent lock-up for driving the vehicle in the newly established drive. However, none of the workers in the art has produced an engine-idling control for conventional carburetors which operates independently of the throttle-plate and actuation of the latter by the accelerator pedal, to idle or reduce engine speed with a higher degree of sensitivity than obtainable from throttle-plate actuation for the purpose. Therefore, considerable simplification in the devices formerly devised to perform the function of lowering engine speed is achieved by my utilizing a novel solenoid-actuated needle valve to negate its normal function of supplying fuel-mixture for engine operation, to momentarily interrupt engine operation to reduce the speed thereof during upshifting speed-changes in the gearbox GB.

This novel idling control means CI as shown in FIGURE 12 comprises an energizable solenoid "$S^c$" having a sleeve-like winding 241 contained in a casing 242, closed at one end 243 and open at the other end 244 with an annular outstanding flange 245 defining the latter end. A metallic sleeve 246 forms the core of said winding and is flared at its extremities into circular recesses 247, 248 formed in longitudinally spaced annular insulative washers 249, 251, respectively, to thus produce a unitary assembly of the winding, insulative encasement therefor and sleeve as shown. The open end of the casing is closed by a detachable cover plate 252 provided with a central exteriorly extruded embossment 253 centrally apertured at 254, said aperture being provided with an annular bushing 255 formed with an external annular groove 256 adapted to receive the marginal portion defining said aperture. An opening 257 in the bushing is substantially the same diameter as the aperture 254, and which communicates with an annular chamber 258 disposed between the lower end of the solenoid winding and the cover plate. This chamber contains a normally compressed spring 259 which reacts between the lower flared end of the metallic sleeve 246 and an annular outstanding flange 261 carried on the solenoid armature 262 operably projecting at its lower end through the opening 257, and upwardly through the solenoid sleeve 246 and a coaxial bore 263 in a threaded adapter 264 formed with a hex-portion 265 and a reduced portion 266, the latter portion passing through a central opening 267 in the closed end of the casing 242 and made fast thereto as by welding or otherwise. This adapter is tightly threaded into an internally threaded counterbore 268 formed in the carburetor body to engage the upper face of the hex-portion tightly against the finished surface 269 defining the outer terminating end of the threads in said counterbore, thereby mounting the carburetion interrupter assembly CI in operating position on the carburetor CR.

The inner end of the threaded portion of the adapter 264 is normally spaced from the bottom 271 of said counterbore 268 to produce a needle valve chamber 272 therebetween, and which continuously communicates with a fuel passage 273 leading to the fuel chamber or bowl 274 of the carburetor CR.

The armature 262 is provided with an axial bore 275 coextensive therewith. The lower outer end portion of said axial bore being threaded at 276. A needle valve 277 projects through the said axial bore in threaded engagement therewith with its inner conical valvular portion 278 normally projecting in part into the entrance (valvular orifice) of the main jet passage 279 to meter the fuel drawn through said jet passage into the carburetor intake passage or venturi 281. The needle valve has the usual cross pin 282 through its lower outer end enlarged diameter portion for manual rotation thereof to effect adjustment of the quantity of fuel metered thereby into the jet passage, which adjustment is identical to that for any conventional carburetor. The enlarged portion of the needle valve which carries said cross pin is threaded at 284 for cooperation with the internal threads 276 in the axial bore aforesaid whereby rotation of the needle valve effects relative axial adjustments thereof with respect to the solenoid armature and with respect to the jet passage aforesaid. The lower exposed portion of the armature 262 is provided with a pair of diametrically opposed cross slots 285 to enable use of an open end wrench to stabilize the armature when adjusting the said needle valve. The exposed portion has a threaded terminating portion 286. Another pair of slots 287 is provided in the end of the threaded portion of the armature, which are positioned opposite each other. A lock-nut 288 provided with a closed end 289 having a central opening 291 of substantially the same diameter as the enlarged diameter portion of the said needle valve, enables this portion of the needle valve to pass therethrough to the exterior of the solenoid $S^c$. The inner marginal face portion 292 defining the opening 291 of the said lock-nut, is tapered radially inwardly to engage a complementally tapered face 293 defining the lower end of the armature 262 whereby tightening of the lock-nut on the threaded portion 286 forces the end slotted portions on the armature radially inwardly to clamp the threaded portion of the needle valve in its adjusted relative position with respect to the solenoid armature 262 in normally retracted position as shown in FIGURE 12.

Spaced from the upper end of the armature 262 is an annular groove 294 equipped with a flexible O-ring seal 295 adapted to isolate the fuel in the needle valve chamber from the interior of the solenoid $S^c$, and upwardly spaced from the O-ring is another annular external groove 296 in the armature which receives a split stop ring 297 which normally abuts the upper end face of the threaded adapter to define the normally retracted position of the armature and connected needle valve for engine operation. Such fully retracted position being effected by the spring 259 upon de-energization of the solenoid $S^c$.

The upper annular end face 298 of the armature 262 is normally spaced from the confronting face portion 299 defining the ingress end of the main jet passage 279 which begins centrally of the bottom wall 271 of the aforesaid counterbore that defines the upper end of the needle valve chamber 272. Under these conditions fuel from passage 273 is in communication with the main jet passage and needle valve via the needle valve chamber 272 for normal fuel supply, but upon energization of solenoid $S^c$, the armature 262 is protracted to bring the face 298 into abutment with the face portion 299 to block flow of fuel from the needle valve chamber 272 into the main jet passage 279 and thereby disabling the engine for speed reduction thereof. Accordingly, the armature end 298 and face portion 299 form what may be termed a "shutoff valve" generally designated "SV," to control flow of fuel from the needle valve chamber 272 between the main jet passage and conical end of the needle valve.

The inner and outer terminating ends 301, 302, respectively, of the solenoid winding pass through holes in the cover plate as shown and connect to terminal posts 303, 304 respectively, the latter being suitably insulated from the casing flange 245 and cover plate as shown, and serve the additional purpose of securing the cover plate to said flange 245. The terminal posts 303, 304 are connected in series with the lead 170 aforesaid in which the solenoid $S^c$ is interposed in the same manner as solenoid $S^b$ to perform the same function of idling (decelerating) the engine whereby the circuit branch US for upshifting synchronizing control by the switch device SS is completed in part.

It is obvious from the foregoing structural description of the FIGURE 12 modification that the solenoid armature 262 and needle valve 277 may be formed as an integrated element processed with the conical valvular portion 278, and that a manually-settable element separate from said integrated element may be utilized to effect at will normal adjustment thereof for engine operation, said manual element being located either coaxially with or offset from the axis of said integrated element whereby energization of the solenoid $S^c$ would be effective to move the latter element relatively to the manual element to block the aforesaid jet orifice to interrupt the carbureting function of said carburetor CR.

In operation, the needle valve 277 is in its normally retracted position as shown in FIGURES 12 and 12*a*, and the solenoid $S^c$ deenergized for normal engine operation. Thus, the throttle-plate TP is normally actuated by the accelerator in the usual manner according to the engine speed and torque desired, but in the event of an upshift of the gearbox GB, for example, a shift from low speed drive to second (intermediate) speed drive, the speed of the engine would require lowering to match the speed of the gearbox input shaft 33 rotating according to the newly established second speed drive for smooth transition between these two speeds. Under these circumstances, the synchronizer SY would take up its upshifting position of control as shown in FIGURES 1 and 2 wherein the contacts 107, 113 are engaged thereby completing in part the branch circuit US with resultant energization of the solenoid $S^c$ when said circuit is completed in a manner to be explained. Energization of solenoid $S^c$ protracts its armature 262 and needle valve 277 carried thereby to the position shown in FIGURE 13 wherein the inner end of the armature 262 abuts the confronting marginal face defining the ingress end of the main jet passage 279 and thereby blocking flow of fuel from the carburetor bowl into said passage past the conical end of the needle valve 277 for atomization as the fuel emits from the egress end of the main jet passage into the venturi passage. Under these conditions the carburetor CR is disabled to perform its normal carbureting function and therefore engine power is momentarily cut off causing rapid reduction in the speed of the engine from that defined by the operating position of the throttle-plate. This reduction in engine speed into synchronism with the speed of the gearbox input shaft 33, with engine speed falling slightly below the speed of the input shaft, is effective prior to lock-up of the clutch CL to interrupt the branch circuit US therefore de-enegizing the solenoid $S^c$. Upon such de-energization of the solenoid $S^c$ the spring 259 automatically retracts the armature 262 and needle valve 277 as a unit to normal position as shown in FIGURE 12 to reactivate the fuel-mixing function of the needle valve 277 and main jet passage for resumption of engine operation under control of the throttle-valve.

When the aforesaid speed overlap occurs, that is, when engine speed falls below the speed of the input shaft 33 during the synchronizing phase therebetween incident to an upshifting operation of the gearbox GB, the connection between the contacts 107, 113 of the synchronizing switch SS is interrupted and connection between contacts 106, 112 established, but notwithstanding the latter contacts have been closed, the circuit controlled thereby is still broken, such requiring for completion operation of an additional control device as will appear. Therefore, the downshifting control by the synchronizer SY is negated until an actual downshifting operation of the gearbox is effected.

The idling control of the engine E as above described, is momentarily effective in response to movement of the shift-lever SL from one speed position to another in an upshifting direction as well as in a downshifting direction. When a change in speed is desired, the engine E automatically reduces speed irrespective of the open position of the throttle plate TP beyond normal idling position to prevent racing, but upon the driving and driven members of the clutch CL becoming sufficiently separated to have relative slipping engagement, the synchronizing mechanism SY becomes operative to one or the other of its two operating positions of control depending on the direction in which the gearbox GB shifted, and thereby effective to reduce or raise engine speed as required before the friction members 15, 49 of the clutch CL re-engage to lock-up condition for normal driving of the associated vehicle. Under actual operating conditions of the gearbox GB, the driver may have a change of mind during clutch disengagement to downshift from a previously upshifted position of the gearbox, and therefore requiring engine speed reduction immediately followed by increase of engine speed to enable smooth transition in this type of shift. Thus, the synchronizer SY must sensitively respond to such changes in the speed of rotation of the input shaft 33 with respect to engine speed which may occur in an interval of a moment or two, to prevent lurching of the vehicle at the instant of clutch lock-up upon completion of the drive in which driving of the vehicle continues.

It follows from the foregoing description that the synchronizing mechanism SY which includes the switch SS, carburetion interrupter CI or throttle-closing means TC, and throttle-opening means TO, responds to any relative movement between the driving and driven members of the clutch, which prevents the brake element 95 rotating as a unit with the driven member 49, such relative movement causing the second drive plate $P^2$ to take up one or the other of its relative positions with respect to the first drive plate $P^1$ co-rotatable with the flywheel FW, and in turn the second plate $P^2$ selectively actuates the movable element 105 of the switch SS to corresponding closed-contact positions according to whether the speed of the driving member is greater than that of the driven member or vice versa.

The two relative positions of the drive plates $P^1$ and $P^2$ are so arranged that the switch SS is operated to complete in part the electric circuit to the carburetion interrupter CI whenever the speed of the driving member exceeds that of the driven member, and when the speed of the latter member exceeds that of driving member the switch SS is operated to complete in part the electric circuit to the throttle-opening means TO. Thus, when the speed of the driven member 49 increases above the speed of the engine (driving member), the plate $P^1$ is caused to lag in relation to plate $P^2$ thereby inducing relative rotation between the two plates to axially move the second plate $P^2$ to close the switch contacts 106, 112 and upon closure of the interrupter switch IS the downshifting circuit DS is complete and the solenoid $S^a$ energized to further open the engine throttle to speed up the engine, and upon completion of synchronization of the speeds between the engine and driven member a slight overlaps occurs causing the plate $P^2$ to lag in relation to the plate $P^1$, thus opening the contacts 106, 112 and closing the upshifting contacts 107, 113 to complete in part the circuit to the throttle-closing means TC or carburetion interrupter CI in readiness for reducing engine speed upon completion of this latter circuit by closing another interrupter switch responsive to shift-lever movements. The aforesaid "lag" of the plates $P^1$ and $P^2$ with respect to each other is induced by the braking action of the brake element 95 in frictional engagement with the driven member 49 to stabilize plate $P^2$ momentarily in relation to the speed of the latter member so that when the speed of the driving member exceeds that of the driven member, the plate $P^1$ rotates ahead of the plate $P^2$ to activate the latter plate to close switch contacts 106, 112, but when the speed of the driving member is less than that of the driven member, plate $P^2$ rotates ahead of plate $P^1$ to activate the plate $P^2$ to open switch contacts 106, 112 and close switch contacts 107, 113. That is to say, that when the driving member rotates relatively faster than the driven member or vice versa, the frictional braking effect of the drive element 95 on the hub 47 tends to rotate these two elements at the same speed to enable the two plates $P^1$ and $P^2$ to adjust relatively in accordance with difference in speeds of the driving and driven members 15, 49 of the clutch CL, so that if the driving member is rotating at less speed than the driven member, the drive plate $P^2$ rotates a limited degree with respect to the other plate $P^1$ whereupon slipping engagement ensues between the drive element 95 and driven member 49, but if the driving member is rotating faster than the driven member, then the drive plate $P^1$ is induced to rotate a limited degree relatively to the plate $P^2$ whereupon slipping engagement ensues between the brake-drive element 95 and driven member 49, it being noted that the braking action of the drive element 95 in either case, induces the "lag" between said plates to activate the switch SS to its corresponding positions of control to modulate engine speed to match that of the driven member 49.

*Electro-vacuum control system for the clutch and synchronizer therefor*

FIGURE 14 schematically illustrates an electro-vacuum control system which includes the control components for the clutch CL, gearbox GB and synchronizing mechanism SY, and which is generally designated by the reference character "EVS". Certain of the control components interposed in the vacuum and electric circuits are old and therefore well known in their respective arts, while others are characterized by either being the subject-matter of a patent issued to me or having patentable features of construction and operation, to produce novel and patentable interaction and features of construction and more efficient cooperation of such components.

The electric circuit system is shown de-energized and comprises: a source of electrical energy such as the symbolically illustrated storage battery "B" which has a grounded terminal "GT" and a feeder line (lead) "FL" connected to its other terminal as shown. A manually-operated master switch "MS" is interposed in the feeder line, and which may also serve as the ignition switch. An accelerator-governor controlled line "AGL" includes a governor switch "GS" and an accelerator-operated switch "AS" which interconnect the feeder line FL with one end of the energizing coil for a relay "RY", and a shift-lever controlled interrupter switch "$IS^1$" also connects the feeder line to said energizing coil of the relay RY and with the upshifting branch US of a synchronizing circuit generally designated "SC," the said relay being adapted to control a relay circuit "RC" having an interposed solenoid-operated shutoff valve "$SV^1$". And, as previously explained, the downshifting circuit DS of the synchronizing circuit SC is connected to the feeder line FL as shown in this figure, said circuit DS and synchronizing switch contacts 106, 112, including the throttle-opening solenoid $S^a$, interrupter switch IS and the upshifting circuit US include either the throttle-closing solenoid $S^b$ or the carburetion disabling solenoid $S^c$, interrupter switch $IS^1$ and synchronizing switch contacts 107, 113.

The solenoid-controlled valve $SV^1$ is shown de-energized in FIGURE 15 in its closed position and is adapted to interrupt vacuum communication between the vacuum accumulator (tank) and the clutch-servo VM for the clutch CL to be fully engaged under its spring-action. This valve comprises: a casing 311 bolted or otherwise secured to a fixed portion 312 of the motor vehicle through the intermediary of a bracket 313 integral with said casing as shown. A horizontal vacuum passage 314 is provided in the casing and which is connected by a conduit 315 to the engine inlet-manifold "IM" at a point subjacent to the carburetor butterfly valve TP, the inner end of the passage 314 is provided with an intersecting vertical passage 316 terminating at its lower end in an annular valve seat 317. The aforesaid vacuum tank and an associated controlling check-valve are interposed in series in the conduit 315 to provide substantially uniform vacuum conditions for operating the clutch-servo VM, irrespective of throttle-plate position, thus enabling speed changes in the gearbox GB during open throttle driving. An air-vacuum passage 318 is provided in the casing, preferably in parallelly spaced relationship to the passage 314, the exterior of the passage 318 being connected to the previously mentioned conduit 65 leading from the bellows encircled power-chamber 64 of the clutch-servo VM. Spaced below the valve seat 317 is another annular valve seat 321 defining the upper end of another vertical passage 322. This latter passage intersects a horizontal air passage 323 continuously communicating with an angular passage 324 connected to an air chamber 325 horizontally disposed in the casing and coaxially related to an air flow passage 326 leading to the exterior of said casing via an air filter device designated "AF," the latter device having a threaded portion 327 engaging a complementally internally threaded portion defining the outer portion of a counterbore 328. A tapered portion 329 interconnects the air chamber 325 with the air passage 326 as shown. A manually-adjustable needle valve 331 is provided with a conical inner end portion 332 which cooperates with the tapered portion 329 to regulate the amount of air flow from the air filter into the air passages aforesaid. The needle valve 331 has an outer enlarged threaded portion 334 which cooperates with an internally threaded bushing 335 provided with a flanged hex wrench portion 336. The normal diameter of said bushing being externally threaded 337 to engage internal threads defining the outer portion of the air chamber. A lock-nut 338 engages the exposed portion of the threads on the needle valve to lock the latter in its manually adjusted position by impinging the lock-nut against the hex flange on said bushing. The space between the valve seats 317, 321 defines an annular air-vacuum chamber 339 therebetween which continuously communicates with the inner end of the air-vacuum passage 318 as shown. A double-acting valve element 341, preferably composed of pliant material such as molded rubber, is positioned within the air-vacuum chamber 339, and adapted to selectively cooperate with the valve seats 317, 321 and thereby selectively placing the passages 316, 322 in communication with the interior of the clutch servo VM to energize and de-energize the same, respectively. The valve element 341 is mounted on the upper end of a reduced stem portion 342 integral with or otherwise connected to an armature 343 encircled by a sleeve-type winding 344 of a solenoid "$S^d$" whereby de-energization of the winding enables a normally compressed spring 345 to protract the armature and connected valve element as a unit to disengage the latter from the valve seat 321 and engage the valve seat 317 thereby disconnecting the vacuum passage 316 from the air-vacuum chamber 339 and connecting the latter with the passage 322 to de-energize the clutch servo VM. Energization of the solenoid winding 344 being effective to retract the armature downwardly to disengage the valve element 341 from the valve seat 317 and engage the valve seat 321 to isolate the air passage 322 from the air-vacuum chamber 339 and connect the vacuum passage 316 to said latter chamber to induce energization of the clutch servo VM and thereby effecting disengagement of the clutch CL as shown in dashed lines in FIGURE 1.

To enable assembly of the valve element 341 between the valve seats 317, 321, an inverted cup-shaped member 346 having an outstanding annular flange 347 defining its open end, is fitted into a bore 348 through the bottom wall 349 of the valve casing 311 and an annular recess 351 defining the lower end of said bore as shown. The aforesaid valve seat 321, and passages 322, 323 being incorporated in the member 346 as shown. A plurality of suitable fasteners such as the screws 352 project through the flange 347 into threaded connection with complementally threaded holes 353 in the valve casing 311 to hold the member 346 in position within the bore and recess aforesaid. The solenoid winding 344 is contained in a cup-shaped casing 354 having its bottom end closed and its upper open end flanged at 355, the central portion of the bottom end serving as an abutment for one end of the spring 345, the upper end portion of said spring extending into a blind axial bore 356 in the lower portion of the solenoid armature, into engagement with the bottom of said bore whereby reaction from said spring is effective to protract the armature toward its normally valve-closed position upon de-energization of the solenoid $S^d$ wherein the clutch-servo VM is vented to atmosphere via passages 322, 323, 324, chamber 325, pasage 326 and the air filter AF.

One end of the solenoid winding is grounded at 357, and the other end is connected to a terminal post 358 which in turn is connected to the relay circuit RC in which the relay RY is interposed as shown.

The accelerator-controlled switch AS is the subject-matter of U.S. Patent 2,716,678 issued to me August 30, 1955, and therefore reference may be had to this patent for a detailed consideration of its structure and operation. As shown in FIGURES 16 and 17, this patented switch is pivotally mounted at 361 on a suitable portion 362 of the vehicle or engine E. The pivot shaft 363 projects from the side of an elongated axially bored casing 364 to which is attached the closed end 365 of a cup-shaped housing 366 containing the operating parts as shown. The mating end 367 of the elongated casing is counterbored at 368 to receive the outturned annular flange 369 defining a circular opening 371 through the closed end of the housing 366, said opening being of the same diameter as the axial bore in the elongated casing and coaxial therewith. The open end of said housing terminates in an annular outstanding flange 372 to which is attached, as by rivets or otherwise, a cover plate 373 suitably insulated from a pair of terminal posts 374, 375 carried thereby, and projecting interiorly thereof into contacts 376, 377, respectively, with the exterior portions thereof connected in series to conductor (line) 378, by terminals 381, 382, respectively, as shown. The central portion of said cover plate being annularly flanged at 383 to provide a circular opening 384 therethrough of less diameter than the axial bore in said elongated casing and coaxial therewith. Reciprocably projecting through said axial bore, and openings 371, 384 is an actuating rod 385 provided with an annular shoulder at 386 formed by diminishing the normal diameter, and which is slidable in said axial bore and opening 371, the diminished portion 387 projecting through the housing and opening 384, the latter serving as a bearing support for said rod, to the exterior of the housing for connection to the aforementioned accelerator-operated linkage system AL.

The movable contact assembly 388 includes a pair of nonmetallic cylindrical members 390, 391 having complemental flanged portions 392, 393, respectively, interconnected by a metallic contact member 394 as shown. The member 390 is cup-shaped to provide a cylindrical chamber 395 closed at one end by an integral wall 396 and the other open end being closed by the member 391. A reduced diameter portion 397 is provided on the closed end of said member 390 to produce an annular external shoulder 398, and a normally compressed spring 399 reacts between said shoulder and the closed end of the housing 366, to bias the contact assembly 388 into normal bridging relation with the fixed contacts 376, 377 to close switch AS. The members 390, 391 are coaxially bored to receive therethrough the diminished portion of the actuating rod 385. That portion of the actuating rod passing through and actuatable in said chamber 395 defines with the outer wall of said chamber, an annular space 401 and operatively disposed in said space is a contractible split sleeve 402 encircling said diminished portion of the rod 385, frictionally engaging the same as shown. The length of the sleeve is less than the length of said space to provide limited lost-motion between the ends of the sleeve and said space, and therefore the movable contact assembly 388. The end of the reduced portion 397 on the member 390 is normally spaced at 403 from the closed end of said housing 366 when the contact 394 is in engagement with the fixed contacts 376. 377 as shown in FIGURE 16 wherein the switch AS is closed, and the right end of the friction sleeve 402 spaced from the confronting end of the annular space 401 with the opposite end of said sleeve abutting the confronting face portion on the member 391 to thereby establish the movable contact assembly 388 in circuit closing position. When the accelerator pedal is fully released in engine-idling positoin as shown in solid lines in FIGURE 14, the annular shoulder 386 on the actuating rod 385 is engaging the confronting end of the reduced portion 397 on the member 390 and in cooperation with reaction from spring 399, moved the contact assembly 388 to the position of FIGURE 16, retraction of said accelerator pedal being under influence of a normally compressed return spring shown by way of example at 404 which reacts between the toe board and underside of the accelerator pedal.

In operation, with the accelerator pedal in normally released position as shown in FIGURE 14, slight depressing of the pedal to the first dashed line position shown in this figure is effective to actuate the movable contact assembly 388 to the position shown in FIGURE 17, and thereby opens the switch AS as shown to break the circuit controlled in part thereby. Actuation of the contact assembly 388 to the FIGURE 17 position being effected by the right end of the friction sleeve 402 being brought into abutment with the confronting end of the annular space 401 which negates the lost-motion 403 and transfers such lost-motion to the opposite end of said friction sleeve as shown. The frictional coefficient obtaining between the friction sleeve 402 and actuating rod 385 is of such magnitude as to overcome the bias of spring 399 and thus displaces the contact assembly 388 into the operating position shown in FIGURE 17 to interrupt the connected circuit. It is important to also note that the shoulder 386 is correspondingly spaced from the assembly 388. The purpose of the last-mentioned space and transferral of space 403 to the opposite end of the friction sleeve 402, is to introduce into the operating relationship between the actuating rod 385 and assembly 388 a limited amount of lost-motion to avoid over-sensitivity which could result from fortuitous reciprocation of the accelerator pedal without intending to operate the switch AS. Thus, fortuitous shuttle opening and closing of switch AS is prevented which, if permitted, would tend to produce erratic operation of the solenoid-operated shutoff valve $SV^1$, and therefore the clutch-servo VM, the primary function of this switch being to translate minute reciprocable movements of the accelerator pedal along its full operating stroke into corresponding movements of the power member 62 of the clutch-servo VM to regulate the clutch CL into smooth engagement simulating pedal control of clutch engagement under supervision of an expert driver. As the structure clearly shows, upon the movable contact assembly 388 being disposed in either of its two operating positions as shown in FIGURES 16 and 17, respectively, the accelerator pedal may be moved beyond or released from such positions in the normal control of the engine E, without disturbing the existent condition of the switch AS so long as the pedal is moved in the same direction that produced the existent condition. That is to say, the clutch-engaged status will continue so long as the accelerator is operated in an engine-accelerating direction or so halted in such position, and that the clutch-disengaged status will obtain so long as the accelerator is moved in a releasing direction or so held in any such position. Thus, this simple switch mechanism provides the driver with an efficient means for regulating the clutch CL into engagement to start the vehicle smoothly in response to minutely reciprocating (feathering) his foot on the accelerator pedal rather than the conventional clutch pedal CP. In starting the vehicle, the driver would depress the accelerator pedal gradually to produce the required engine torque but if accelerator movement in an engine-accelerating direction is slowed tending to stall the engine, the driver becomes instantly aware of the need for giving more throttle or relaxing his foot from the accelerator pedal to prevent stalling the engine simulating the same reaction that would occur were the clutch pedal employed to re-engage the clutch CL. The engine is thus freed of overload at any position of the accelerator pedal by the driver merely relaxing foot pressure, and a new re-engaging cycle may be inaugurated at any such relaxed position by merely applying pressure on the pedal in an engine-accelerating direction. Accordingly, it is seen that this novel and patented accelerator switch AS enables the driver to have complete supervision over the re-engaging action of the clutch CL as in starting the vehicle with the advantage of the utilization of the clutch-servo VM to effect disengagement and control re-engagement of said clutch.

The governor switch GS is of conventional construction and operation, and arranged for drive from the tailshaft 411 of the conventional change-speed gearbox GB, at speeds proportional thereto. The governor body 412 is cup-shaped with its upper open end closed by a cap 413 made of insulating material such as molded rubber. A riser 414 is acted on by a pair of centrifuges (not shown) which are mounted on an upper flanged end of the drive shaft 415 to rotate therewith and have relative pivotal movement toward and away from the axis of said drive shaft as a function of its speed of rotation, and thereby impart reciprocating movement to the riser 414. A fixed contact 416 is carried on the underside of the cap 413, and a movable contact member 417 is pivotally attached at a point 418 on the underside of said contact opposite the fixed cap with the intermediate portion 419 on the underside engaged with the upper end of the riser 414 as shown, and the free end 420 is provided with a contact normally engaging the fixed contact as shown to complete in part the circuit controlled thereby. A depending spring-loaded plunger 421 slidably operates in a bore 422 through the cap into engagement with the upper intermediate portion of the movable contact member in coaxial relationship with respect to said riser. A normally compressed coil spring 423 is positioned in said bore above the plunger 421 and reacts between the latter and an adjustable threaded plug 424 to bias the movable contact and connected riser and centrifuges (not shown) to their respective normal positions shown in FIGURE 14 wherein the contacts aforesaid are engaged. Rotation of the centrifuges (not shown) throws them outwardly from the axis of said drive shaft to impart upward movement to the riser and thereby lifting the contact end of the movable contact away from the fixed contact to break the circuit controlled thereby, in opposition to the spring 423 reacting through the plunger 421. The pivoted end of the movable contact is mounted in a bracket 425 which has a stem portion 426 projecting through the cab 413 to the exterior thereof to provide a terminal post 427 to which is connected the terminal of the aforesaid conductor 378, and the upper end of the fixed contact also has a stem portion 429 projecting through the cap 413 to the exterior to provide a terminal post 431 to which is connected another terminal of the aforesaid conductor 378 of the governor switch GS as shown in FIGURE 14 to thereby interpose the governor switch GS in series with the accelerator switch AS to complete the control circuit AGL, the latter circuit being effective to control the relay circuit RC to operate the shutoff valve SV[1] to open position for servo-clutch operation to disengage the clutch CL.

In operation, the governor switch GS is adapted to close at speeds of the vehicle approximating 5–7 m.p.h. or below to complete in part the circuit AGL to enable the accelerator switch AS to control the shutoff valve SV[1] for the clutch-servo VM, and thereby the clutch CL. At vehicular speeds at or above 5–7 m.p.h., the governor switch open and thereby disables the control circuit AGL to prohibit accelerator-actuation from activating the shutoff valve SV[1] and therefore prevents fortuitous operation of the clutch CL until such operation is desired as when bringing the vehicle to a stop or to restart the same.

The shift-lever controlled interrupter switch "IS[1]" is of conventional construction and operation, and will therefore be described only briefly to insure a clear understanding of its relation with other components of the control system illustrated in FIGURE 14. Reference is now made to FIGURES 19 and 19A where the switch IS[1] is shown in section in operative association with shift-lever controlled structure of new and novel construction and operation, and which is adapted to operate said switch in coordination with shifting movements of the shiftable gears in the gearbox GB.

The shift-lever structure as shown in FIGURE 14 is associated with fragmentary portions of the steering column 441 on which the rockable and axially movable tubular shaft 442 is mounted parallelly thereto. A portion of the steering wheel is shown at 443 with which is associated the shift-lever "SL" which is pivotally mounted at 445 in a tubular member 446 extending laterally from the upper end of the shaft 442 whereby the shaft is rotatable and also movable up and down by lowering and lifting up, respectively, the free (hand) end of the shift-lever which operation is well known in the art in the control of manually-shifted synchromesh transmissions. A support bracket 447 is mounted on the lower end portion of the steering column. This bracket has an arcuate base segment 448 slightly wider at its medial portion and formed to fit a portion of the upper curvature of the steering column as shown. The lower (left) end of the segment 448 has an upstanding segment 449 normal thereto, and the upper (right) end is provided with a higher upstanding segment 451 parallel to segment 448, the segment 451 terminating in an outturned portion 452 parallel to the base segment, and which serves as a mounting lease for the interrupter switch IS[1] as shown in FIGURE 14. Coaxial circular apertures 453, 454 are provided through the segments 449, 451, respectively, in parallelly spaced relation to the axis of the steering column. An upper clamping member 455 overlies the central wider portion of the base segment 448 and substantially half of the full diameter of the steering column. A complemental clamping member 456 is disposed on the underside of the steering column in circular alignment with the upper clamping member, said clamping members being drawn toward each other by a pair of cap screws 457 projecting through diametrically opposed holes in a pair of similarly positioned bosses terminating the ends of said member 456, into threaded engagement with holes in complemental bosses on the upper clamping member as shown, and thereby clamping the bracket 447 on the steering column. The upper side of the clamp member 455 is formed with an upstanding embossment 458 having a longitudinal bore 459 coextensive therewith and a cylindrical extension 460 projecting from the central portion of the curved bottom into aligned holes in the base segment and steering column as shown to stabilize the bracket and embossment on the steering column, said bore is coaxial with the holes 453, 454 in the upstanding segments 449, 451, respectively, and the hole in the segment 449 may be smaller than the longitudinal bore in the embossment as shown, while the hole in the segment 451 is the same size as said bore 459 to receive the lower end portion of shaft 442 to serve as a bearing support therefor. Positioned between the upper (right) end of the embossment aforesaid and the confronting side of the segment 451, is a pair of hollow hubs 461, 462 integral with one end of lateral shift arms 463, 464, respectively, the free ends of said shift arms being connected to operate the shiftable gears in the gearbox GB by links 465, 466, respectively. The lower (left) end portion of the shaft 442 passes through the hole 454 in segment 451 thence through the hollows in the hubs 461, 462 into the bore 459 with the end of said shaft normally flush with the lower end of said bore as shown in FIGURE 18. Thus, the lower end portion of shaft 442 is rotatably supported on the segment 451 and clamping member 455 as shown in FIGURES 14 and 18.

The hubs 461, 462 are cross slotted at 468, 469, respectively, with the open confronting ends of the opposing slots normally in alignment as shown in FIGURES 14 and 18 with the smooth cylindrical surface of the hubs through which the slots are incorporated, enclosed by a sleeve 470 provided with a filler plug 471 through which lubricant can be introduced to the working surfaces, and also enables installation of a cross pin as will appear. A short shaft 472 having its outer end flanged at 473 to provide an annular shoulder 474 with the diminished portion of said shaft, and which projects through the hole 453 in segment 449 and the diminished portion extends into the lower end portion of shaft 442 best shown in FIGURE 18. A cross pin 477 is inserted through the filler plug opening to interconnect the upper diminished end portion of the short shaft with the telescoped end of the shaft 442 to rotate as a unit. The cross pin is of sufficient length to engage the cross slots on opposite sides of each of the hubs aforesaid, and normally lies in circular alignment with the abutting ends of said hubs in partial engagement with the confronting cross slots in both hubs. The sleeve 470 serves to prevent fortuitous displacement of the cross pin from its normal working relation with the hub slots. This latter position of the cross slots and cross pin as shown in FIGURE 18, defines the normal "neutral" position of the shift-lever SL and therefore the gearing in the gearbox GB. If the free end of the shift-lever is raised, the shaft 442 is lowered to disengage the cross pin from the cross slots 469 and engage the same with the cross slots 468, whereupon rotation of the shift-lever while in its upper plane of movement will impart corresponding rotative movements to the shift arm 463 to selectively engage low and reverse speeds, while by returning the shift-lever to "neutral" position and then lowering the same to disengage the cross pin from the cross slots 468 into engagement with the cross slots 469 and subsequent rotation of the shift-lever while occupying its lower plane of movement will selectively activate intermediate (second) and high (direct-drive) in the gearbox GB.

A normally compressed spring 478 encircles the diminished portion of the short shaft 472 that spans the space between the lower segment 449 and the lower (left) confronting end of the embossment 458 as shown in FIGURE 18. This spring is adapted to react between a pair of spaced thrust washers 479, 480 normally abutting the shoulder 474, and which normally lies flush with the inner marginal face portion defining the hole 453, and the lower end of shaft 442, respectively, said shaft end normally lying flush with the marginal face portion defining the left end of the longitudinal bore 459 in said embossment 458, whereby with the washers 479, 480 in their normal relative positions shown in FIGURE 18 under influence of spring 478, the shaft 442 and connected shift-lever SL are disposed in their respective normal "neutral" positions. A tubular member 481 encloses the two washers and spring 478 to retain lubricant introduced to the working parts through the filler cap opening in sleeve 470. The spring 478 and said two pairs of cooperating abutment-engaging elements 453, 479 and 458, 480 coact with the shoulder 474 and lower end of shaft 442, respectively, to produce what may be termed a "yieldable centralizing mechanism" generally designated "CM".

When the shaft 442 is moved downwardly to place the cross pin 477 in cross slots 468, the lower end of shaft 442 moves the thrust washer 480 as a unit therewith away from the lower (left) end of the embossment 458 to additionally compress the spring 478 against the other thrust washer 479 stabilized against the inner face of the upstanding segment 449 with the shoulder 474 on the short shaft 472 correspondingly disengaged from the latter thrust washer as shown in FIGURE 21. These conditions obtain while the shift-lever is in its upper plane of movement. When the shaft 442 is pulled upwardly to raise the cross pin 477 into the cross slots 479, the lower end of shaft 442 is moved upwardly from the side of the thrust washer 480, and the shoulder 474 on the short shaft 472 correspondingly moves the thrust washer 479 away from the inner face on the lower upstanding segment 449 to additionally compress the spring 478 against the thrust washer 480 stabilized against the lower (left) end of the embossment 458 as shown in FIGURE 22. These conditions obtain while the shift-lever occupies its lower plane of rotational movement, said two planes of rotational movement being connected by an intermediate cross path of movement to define the conventional H-pattern of shifting movements shown in FIGURE 19 wherein the "neutral" position lies intermediate the cross path of movement.

It is important to note that when the biasing action of spring 478 is effective upon manual release of the shift-lever while occupying any of its four positions terminating the H-legs, the cross pin 477 engages the end of the inactive confronting hub to maintain the shift-lever and connected parts in them selected positions, after the hand has been removed or relaxed from said shift-lever, it being necessary to return the rotated shift arm back to its neutral position wherein the opposed cross slots in both hubs are again aligned to enable the selected shift arm to be engaged by the cross pin 477 for rotation thereby.

The interrupter switch $IS^1$ (see FIGURE 19A) and actuating structure therefor will now be described. This switch is the conventional hollow hex-body type mounted on the outturned portion 452 of the upstanding bracket segment 451 as shown in FIGURES 14 and 18. This outturned portion overlies a sector-shaped actuating plate 491 which is mounted for co-rotation with the shift shaft 442 as by a cap screw 492 or other means. The upper end of the plate is outturned to provide an arcuate flange 493 concentric to the axis of the shift shaft, and is provided with five holes corresponding to the four operating and intermediate neutral positions defining the H-pattern of shift-lever movements. These five holes are identified by the indicia "N," "L," "I," "H," and "R" (see FIGURE 20) corresponding to "Neutral," "Low," "Intermediate," "High," and "Reverse" conditions, respectively, of the gearing in the gearbox GB. The semi-spherical end 494 of a switch actuating element 495 is adapted to partially engage selectively in said five holes and thereby accommodate lowering of the switch actuating element under influence of a normally compressed spring 497, to unbridge a pair of contacts 498, 499 carried in the insulative cap 501 which closes the upper open end of said switch body. These two fixed contacts are provided with terminal posts 502, 503, respectively, which connect to the terminals of conductors 504, 505, respectively, of the upshifting branch US of the synchronizing circuit SC. Movement of the shift-lever SL from any of its five positions forces the switch actuating element upwardly and onto the lands interconnecting said holes to thereby close the switch $IS^1$ and maintain it closed until the selected hole is presented in alignment with the semi-spherical end of the switch actuating element to enable the latter and connected movable contact to be lowered under influence of spring 497 to break the connection between said fixed contacts 498, 499 and thereby open the switch $IS^1$. Accordingly, the path of movement described by the semi-spherical end of the switch actuating element in contact with the lands between said holes defines a configuration corresponding to the capital letter H, which path of movement is coordinated with and effected by movements of the shift-lever in controlling the gearbox GB.

In operation, sufficient lost-motion is introduced into the linkage connections between the shift arms 468, 469 and the shifting mechanism (not shown) associated with the gearbox GB, to enable limited initial relative movement of the shift-lever with respect to the shiftable gears from any of its control positions aforesaid to first actuate the switch $IS^1$ to closed position, and then activate the selected speed in the gearbox GB. Closure of switch $IS^1$ in this manner, energizes the relay RY and therefore closes the relay circuit RC to the solenoid-operated shutoff valve $SV^1$ to open the latter to place the source of vacuum (inlet-manifold IM) in communication with the clutch-servo VM to effect disengagement of the clutch CL, and at the same time, the two branches DS and US of the synchronizing circuit SC are conditioned for energization in accordance with the shifting sequence, that is, whether up or down, to activate the throttle-closing means TC or the carburetion interrupter CI to lower engine speed, or the throttle-opening means TO to raise engine speed, respectively, during free disengagement of the friction members comprising the clutch CL. In the case of an upshift, the engine would be automatically disabled momentarily during such upshifting transition from the active speed to the newly selected speed, and upon completion of such selected shift, the switch $IS^1$ automatically opens to break the circuits to the solenoid-operated shutoff valve $SV^1$ and the carburetion interrupter CI if used in lieu of throttle-closing means TC to enable these two components to return to normal closed and fuel-mixing positions, respectively, so that the vehicle drive is resumed in the newly established speed in the gearbox GB as is understood. As explained before, the opening of the switch $IS^1$ is effected by the semi-spherical end of the switch actuating element dropping partially into the hole in the arcuate sector of the switch actuating plate movable as a unit with the shift shaft 442, but while a gear-change is in progress, this end of the actuating element rides the land between the holes corresponding to the active speed and the newly selected speed to be activated, and therefore maintains the switch $IS^1$ closed to hold the clutch CL disengaged and the synchronizer switch 107, 113 effective to bring about substantially synchronous speeds between the driving and driven members of the clutch CL as the latter reaches initial slipping engagement during the re-engaging cycle thereof. It is therefore seen that the gears in the gearbox GB cannot clash due to fortuitous reengagement of the clutch CL while a speed-change is in progress since the clutch is maintained fully disengaged by the clutch-servo VM during the full shifting movement of the shift-lever SL from one speed to another in both upshifting and downshifting sequences.

In the event a downshift is required, for example, with the vehicle operating in high (direct-drive) to intermediate (second) gear, such may be effected by driver movement of the shift-lever SL from "H" position to "I" position, and during such movement, the upshifting branch US is completed in part by closure of the switch $IS^1$. Under these conditions, if engine speed raises, that is, the engine tends to race, above that of the clutch driven member 49 as the engine is released by disengagement of clutch CL and direct-drive, the upshift contacts 107, 113 of the switch SS will close if not already closed prior to lock-up of the clutch CL before drive was resumed in direct-drive, and thereby energizing the carburetion interrupter CI or TC to idle the engine momentarily while the newly selected intermediate gear is being established whereupon engine speed will be less than that of the clutch driven member 49 requiring that the speed of the engine be raised until substantially synchronous with the speed of said member 49 for smooth reengagement of the clutch CL and application of power to drive the vehicle in the newly engaged gear. Under these latter circumstances, the upshift contacts 107, 113 would automatically disengage and the downshifting contacts 106, 112 close to energize the throttle-opening means TO, and therefore, cause the engine to accelerate into substantial synchronism with the speed of the clutch driven member 49 prior to the clutch members 15, 49 reaching initial slipping engagement which operation would tend to brake engine speed before lock-up is completed, and therefore reactivate the switch SS to close the upshift contacts aforesaid as a function of slight overlap of the clutch driven member speed with respect to the speed of the engine E, but since the interrupter switch $IS^1$ is open, the carburetion interrupter CI or TC cannot be energized to idle the engine, therefore drive of the vehicle is continued in the newly activated intermediate gear under normal control of the accelerator until the vehicle is brought to a full stop or another change in speed is required while driving the vehicle.

The relay RY is symbolically displayed in FIGURE 14 as typical of a commercial form and comprises: a casing 509 provided with an electromagnet having an energizing coil 511 encircling a soft iron core 512, one end of said coil terminating in an insulated terminal post 513 extending to the exterior of said casing and connected to the circuit AGL, and the other end is grounded to the casing or a portion of the vehicle structure at 514. The core is fixed at one end to the inner side of the casing and its other end extends slightly beyond the corresponding end of the coil 511 in predeterminately spaced relation to an intermediate underside portion of a pivotally mounted armature 515 adapted to attract the latter when the coil is energized, and thereby engaging the contact 516 mounted on the end of the armature opposite its pivoted end, the latter being anchored to the inside of the casing by an insulated terminal post 517 extending to the exterior of said casing, with an insulated contact 518 fixed on the casing by a terminal post 519 also leading to the exterior of said casing to complete the relay circuit RC as shown. A normally preloaded spring 521 is adapted to withdraw the armature from said electromagnet when the latter is de-energized, into engagement with a stop element 522 fixed to the inner side of the casing, to establish the normal disposition of the armature corresponding to separated status of the contacts 516, 518 to interrupt the relay circuit as shown in FIGURE 14.

In operation, closure of the switch $IS^1$, or when both of the switches AS and GS are closed, the coil 511 is energized to draw the armature 515 toward the core 512 as shown by dashed lines, and thus engages the contacts 516, 518 to complete the relay circuit RC with resultant energization of the solenoid-operated shut-off valve $SV^1$ and operation of the clutch servo VM to disengage the clutch CL. Upon opening of the interrupter switch $IS^1$, or either of the switches AS or GS, the coil 511 is de-energized which releases the armature 515 to return to normal position under influence of spring 521, thus disengaging contacts 516, 518 to open the relay circuit RC as is understood, to accommodate reengagement of the clutch CL by its engaging springs 28 under control of the accelerator-operated switch AS over which the driver has supervisory control.

*Operational summary*

Although the manner in which my invention achieves its objectives should be manifest from the foregoing description augmented by an inspection of the drawing in conjunction therewith, a brief restatement is deemed apropos to insure a clear understanding of the novel coaction of the various components as follows:

Assuming the clutch CL is fully engaged as demonstrated in FIGURE 1, and the associated clutch synchronizer SY in its normal disposition as shown in this figure wherein the first and second synchronizing drive plates $P^1$ and $P^2$, respectively, have adjusted the synchronizing switch SS to take up its upshifting position of control to complete in part the synchronizing circuit branch US which includes the carburetion interrupter CI or throttle closing means TC, in response to closed-status of the contacts 107, 113. Under these circumstances, the downshifting position of control is disabled due to contacts 106, 112 being separated and therefore the synchronizing circuit branch DS which includes the throttle-opening means TO, is broken at this point and also at another point by the open interrupter switch IS corresponding to full clutch engagement as shown in FIGURE 1. The normal disposition aforesaid of the clutch synchronizing mechanism SY results from activation in part of the synchronizing circuit branch US since normal starting, driving and stopping of the vehicle primarily involve upshifting sequences rather than the occasional downshift for power and/or acceleration as when passing another vehicle or when negotiating rough terrain. For example, in starting the vehicle, engine speed is greater than that of the clutch driven member 49 due to clutch CL being open, and the driven shaft 33 idle. Therefore, as low starting speed becomes engaged, a momentary cessation of power from the engine results as the shift-lever SL is moved from "N" to "L" position with normal idling speed being resumed by the engine upon the shift-lever reaching low speed engaged position. Under these conditions of the vehicle, the throttle-plate closing means TC or the carburetion interrupter CI is momentarily energized due to the upshift contacts 107, 113 being closed, an operating status resulting from the relative higher speed of the engine reacting through the synchronizing plates $P^1$ and $P^2$, with respect to the stopped driven member 49. In the case of bringing the vehicle to a standstill momentarily at a traffic light or to park the same, it will be appreciated that engine speed will be greater than that of the clutch driven member 49 prior to turning the ignition switch MS off which, in effect, will establish the synchronizing mechanism SY and switch SS operated thereby, in positions corresponding to idling control of the engine to reduce speed thereof upon completion of the synchronizing circuit branch US in response to upshifting movement of the shift-lever SL. Accordingly, it is evident, that irrespective of which control position the synchronizing mechanism SY takes up prior to lock-up of the clutch CL for normal driving of the vehicle, that upon disengagement of said clutch to facilitate a speed change, said mechanism SY will automatically take up the position of control in accordance with the relative speed condition obtaining between the clutch driven member 49 and the driving member 15. That is to say, if engine speed exceeds that of the driven member 49, the upshifting control is conditioned to be effective upon moving the shift-lever in the selected upshifting direction, and conversely, if the speed of the driven member 49 exceeds that of the engine E, the downshifting control is activated immediately following a momentary activation of the idling control CI or TC to prevent engine racing between speed changes, in accordance with the relative speed condition existing between the clutch driving member (flywheel and pressure plate 15) and driven member 49 as defined by the new active gear ratio established by moving the shift-lever in the selected downshifting direction. It is thus seen that the synchronizing mechanism SY and switch SS actuated thereby are effective to automatically reduce engine speed to substantially match that of the driven member 49 during upshifting sequence, and to raise engine speed to substantially match that of the driven member 49 during downshifting sequence, such engine idling-speed control being rendered effective through energization of the carburetion interrupter CI or throttle-closing means TC to reduce speed, and by the throttle-opening means TO to increase engine speed, said idling and accelerating means being characterized by non-interference with normal carburetor control by the accelerator upon full torque-transmitting efficiency (lock-up) of the clutch CL becoming effective to drive the vehicle in the active speed established in the gearing of the gearbox GB as is understood.

Therefore, prior to starting the engine E, the various components comprising the present invention are in their normal operating positions shown in FIGURES 1 and 14 as follows:

(a) Clutch CL fully engaged.

(b) Gearbox GB in neutral.

(c) Shift-lever controlled switch $IS^1$ open, lever in "N" position.

(d) Governor switch GS closed.

(e) Accelerator-operated switch AS closed.

(f) Synchronizing mechanism SY and switch SS operated to upshifting positions of control.

(g) Carburetion interrupter CI or throttle-closing means TC de-energized with the needle valve that controls the supply of fuel to the main jet passage in normal engine-operating position, or solenoid $S^b$ de-energized depending on which type of idling control employed.

(h) Throttle-opening means TO de-energized.

(i) Interrupter switch IS open.

Considering now the three phases of starting, driving and stopping a motor vehicle which define a cycle of normal vehicular operation with the components (a) through (i) in their normal positions as indicated, the driver now closes the ignition switch MS which energizes the circuits shown in solid lines in FIGURE 14A, and then presses the starter switch (not shown) to energize the engine starter (not shown) and thereby starting the engine, whereupon vacuum (negative pressure) produced in the engine inlet-manifold IM is placed in communication with the power chamber 64 of the clutch servo VM to controllably evacuate the air from said chamber thereby rendering differential pressures across the movable head 62 effective to activate the same with resultant disengagement of the clutch members 15, 49. Closure of the ignition switch MS also connects the battery B to the feeder line FL and thus energizes the relay RY due to the governor switch GS and accelerator switch AS also being in their normal closed positions. Energization of the relay RY displaces the armature 515 from its full line position to the dashed line position shown in FIGURE 14 to close contacts 516, 518 in opposition to the expansion spring 521 and thereby completes the relay circuit RC to the solenoid shutoff valve $SV^1$ to operatively energize the same to open condition as shown in FIGURE 15, thus energizing the clutch servo VM to effect clutch disengagement as shown by dashed lines in FIGURE 1.

With the clutch CL now disengaged, selection of the starting gear (low speed) is made by lifting up on the shift-lever SL and then rotating the same clockwise from the driver's viewpoint to "L" position. Initial movement of the shift-lever from the middle ("N") position of its cross path of movement, momentarily energizes the carburetion interrupter CI or throttle closing means TC to idle the engine due to the upshifting contacts 107, 113 of switch SS being closed by the relative disposition of the drive plates $P^1$ and $P^2$, but notwithstanding the throttle-plate closing solenoid $S^b$ or the carburetion interrupter solenoid $S^c$ is thus energized and will continue so until the interrupter switch $IS^1$ is opened upon the shift-lever being positioned at "L." However, the downshifting control of the synchronizer SY can overrule such upshifting control should engine speed drop below that of the driven member 49, thereby activating the throttle-opening solenoid $S^a$ to increase engine speed into synchronism with that of said driven member prior to lock-up of the clutch CL. These conditions also hold true while effecting a downshifting operation, and notwithstanding the carburetion interrupter CI or TC is momentarily energized to prevent engine racing, due to engine speed exceeding that of the driven member 49 during movement of the shift-lever SL to its selected downshift position, the upshifting control of the synchronizer SY can overrule the effective downshifting control to effect such momentary idling of the engine which becomes inactivated upon the shift-lever reaching its downshift selected position by opening of the interrupter switch $IS^1$ but, even before such disabling of the upshifting control occurs the downshifting contacts 106, 112 of the switch SS may be closed to inactivate the upshifting control and reactivate the throttle-opening solenoid $S^a$ to increase engine speed into synchronism with that of the driven member 49 before the clutch members 15, 49 reach maximum torque-transmitting efficiency (lock-up). Thus, the synchronizing mechanism SY is operative to modulate engine speed into synchronism with that of the driven member 49, while the clutch members 15, 49 are disengaged despite idling control of the engine being effective to prevent engine racing at the instant the clutch members are separated in response to initial shift-lever movement from any of its five (5) control positions for the gearbox GB. Stated differently, the upshifting control may be overruled by the downshifting control and vice versa, despite the shift-lever controlled switch $IS^1$ is closed, to effect adjustments in engine speed into synchronism with that of the clutch driven member 49 prior to the clutch CL reaching slipping engagement.

Under the aforesaid conditions, the vehicle may be started in response to the driver pressing on the accelerator pedal to open the throttle-plate TP of the carburetor CR. Initial movement of the accelerator from engine idling released position shown in solid lines in FIGURE 14 to the dashed line position indicated in this figure, operates the switch AS to open position as shown in FIGURE 17 to break the circuit AGL and therefore the relay circuit RC which energizes the solenoid shutoff valve $SV^1$ is interrupted enabling the latter to close, that is, block communication of vacuum to said clutch-servo VM and vent air itno the latter to enable the clutch CL to re-engage under influence of springs 28. If over-engagement occurs as the accelerator pedal is depressed, the driver reacts to halt application of additional pressure on the pedal, and, in fact, the reflex would be to relax the foot with attendant slight withdrawal from the accelerator pedal, or give the accelerator pedal a firm depressing movement to increase engine power. In the former instance, switch AS would be instantly closed to the position of FIGURE 16 to re-energize the shutoff valve $SV^1$ thus placing the clutch servo VM in communication with the inlet-manifold IM to separate the friction members 15, 49 of the clutch CL to free the engine to avoid possible stalling which would necessitate a restarting cycle. Such disengagement of the clutch CL being effected at any engine-accelerating position of the accelerator pedal, and thus complete release of the accelerator to engine-idling position, which requires a longer interval of driver reaction, is unnecessary to recover the clutch CL to fully disengaged status, and then a new start of the vehicle can be inaugurated from such existent idling position of the accelerator as commonly done when the accelerator is released to conventional idling position on vehicles equipped with prior art power-operated clutches fed in to engagement by depressing movement of the accelerator.

Since the switch AS is interposed in the same circuit AGL with the governor switch GS, it follows that the above described clutch engaging and disengaging control is provided by switch AS with the vehicle standing or until vehicular speeds reach approximately 5–7 m.p.h. at which the governor switch GS opens to disable the circuit AGL. Also it should be noted that the electromagnetic control of the relay RY is interposed in this circuit, thus when the switch AS or governor switch GS is open or both, the relay RY operates to release its contact armature 515 to open the contacts 516, 518 interposed in the relay circuit RC thereby de-energizing the shutoff valve $SV^1$ for the clutch-servo VM to release the pressure plate 15 so that the clutch-engaging springs 28 can effect re-engagement of the clutch CL.

After the vehicle is underway, accelerator operation in either direction will have no effect on the clutch CL, after vehicular speed has reached 5–7 m.p.h. or above as it will be recalled that at such speeds the governor switch GS automatically opens to render closing and opening of switch AS ineffective in the normal manipulation of the accelerator in controlling the engine throttle-plate TP. Thus, the clutch CL remains engaged to transmit drive torque to the ground wheels of the vehicle at the effective gear ratio established in the gearbox GB as is understood. As previously pointed out, the friction sleeve 402 of the switch AS enables the switch actuating rod 385 to move relatively to the closed or open disposition of the movable contact assembly 388 depicted in FIGURES 16 and 17, respectively, so that normal control of the engine is not affected, yet the clamping action of said sleeve on said rod is sufficient to sensitively move the contact assembly to either of its two operating positions as a unit with the rod and sleeve in response to virtually a pulsating reaction from the driver's foot on the accelerator pedal. If the engine starts to stall due to overload or other reason, the driver is instantly made aware of the need to either depress the accelerator pedal from its existing position, or slightly release the same from such position, to prevent engine stall. Thus, in this manner, the switch AS produces a highly efficient means for regulating a spring-engagable friction clutch into engagement to simulate foot-control of a skilled driver in engaging such a clutch to start the vehicle. Furthermore, this patented switch AS provides simple contact means for replacing the more complicated and hard to keep adjusted follow-up linkage systems employed by prior workers in this art, none of which has proven commercially successful due to the complex systems of links and interconnecting levers required to connect the accelerator mechanism to the control components, and then, too, the exterior plumbing as well as the maze of links, etc., mounted on the engine for the clutch disengaging motor and control valve therefor, rendered the engine proper inaccessible for servicing. Switch AS may be mounted on the engine block, firewall or toe board of the vehicle body for control by a single link interconnected with a portion of the conventional accelerator-operated linkage AL as shown in FIGURE 14, to produce a simple and highly efficient clutch disengaging and engaging control means, which brings to power-controlled friction clutches by the accelerator pedal the same driver reaction employed to re-engage a foot-operated clutch in operative association with a manually-shifted change speed gearbox or transmission, fragmentarily disclosed herein at GB.

The clutch-engaged status will prevail so long as the accelerator pedal is sufficiently depressed to maintain the switch AS open while vehicular speed is at or below 5–7 m.p.h. That is to say, slight release due to vehicular vibration and similar fortuitous possible activating movement not intentionally effected by the driver, will not disturb the clutch-engaged status quo, because of the lost-motion arrangement aforesaid between the friction sleeve 402 and movable contact assembly 388, deliberate reaction from the driver being necessary to change the operating condition of said switch. Thus, this switch provides a patented and effective mechanism for intermittently opening and closing the circuit leading to the clutch energizing shutoff valve $SV^1$ with the accelerator pedal in an approximately intermediate, or at substantially any position along its full operating stroke defined by its two extremes, to produce in effect, an operating follow-up control simulating foot-controlled engagement of a spring-engageable friction clutch. This completes the starting phase of the vehicle.

The driving phase of vehicle operation is carried out in normal manner, with possible interruptions of up- and downshifts for power and/or acceleration and compression braking effect from the engine to safely control the vehicle. The energized condition of the upshifting and associated electric circuits is shown by solid lines in FIGURE 14B, and the energized condition of the downshifting and associated electric circuits is shown by solid lines in FIGURE 14C, it being recalled that all of the electric circuits are depicted in FIGURE 14 as de-energized by dashed lines. In the event a downshift is required between high and intermediate drives for acceleration to pass another vehicle, the driver would move the shift-lever from "H" to "I" position without removing his foot from the existent driving position of the accelerator pedal. Initial movement of the shift-lever SL from "H" position would close the interrupter switch $IS^1$ to complete in part the circuit branch US which includes either the solenoid $S^b$ or $S^c$, and also the relay circuit RC would be completed by energization of the relay RY to thus energize the solenoid-operated shutoff valve SV[1] for clutch-servo operation to disengage the clutch CL. Upon the shift-lever reaching its "I" position, the actuating element of the switch IS[1] would engage the corresponding hole in the actuating plate 491 to enable the switch to open under influence of its spring 497, thus breaking the circuit to the relay RY and to the upshift synchronizing contacts 107, 113 to de-energize the throttle-closing means TC or carburetion interrupter CI, whichever is used, but at this critical point synchronism of engine speed to the rotating speed of the clutch driven member 49 is required to prevent lurching of the vehicle as the clutch re-engages to lock-up drive so that driving may be resumed in the newly established intermediate speed. Therefore, at the instant the upshift control of the synchronizer SY is disabled, the downshift control is made effective by closure of the contacts 106, 112 resulting in energization of the throttle-opening solenoid S[a] and speed up of the engine into synchronism with that of the clutch output shaft 33 before the clutch members 15, 49 have reached slipping engagement, it being recalled that during clutch disengaged status the interrupter switch IS is closed, thus when the downshift contacts 106, 112 of the switch SS are closed, the downshifting circuit branch DS is completed and remains so until synchronism between the engine and output shaft 33 becomes substantially effective, whereat the speed of the engine slightly overlaps the speed of the shaft 33 and connected driven member 49 to open the downshift contacts 106, 112 and close the upshift contacts 107, 113 of switch SS, but since the shift-lever operated switch IS[1] has opened in the selected intermediate gear position "I," the upshift circuit branch US is not completed notwithstanding the upshift contacts 106, 112 of the switch SS were closed in the manner above described. Accordingly, the throttle-closing means TC or carburetion interrupter CI is de-energized for normal fuel-mixing control by the needle valve controlled thereby.

When the switch IS[1] opened in the manner just described above, the relay RY was de-energized and the relay circuit RC broken to enable the solenoid-operated shutoff valve SV[1] to block vacuum communication to the clutch-servo VM and to vent the latter to atmosphere so that the clutch-engaging springs 28 can re-engage the clutch members 15, 49, but, this re-engaging action is controlled by the needle valve 331 which is manually adjustable to regulate the rate of ingress of air into the power chamber 64 of the clutch-servo VM and therefore the rate at which the clutch members 15, 49 are biased toward each other under influence of the springs 28. This delayed re-engaging action of the clutch CL enables the downshift switch 106, 112 to bring the clutch members into substantial synchronism before full engagement thereof occurs, which also holds true where an upshifting operation is being effected. That is to say, the clutch CL is rapidly disengaged and slowly re-engaged under control of the shutoff valve SV[1], which retarded rate of re-engagement produces smooth torque application without noticeable bumping as clutch lock-up becomes effective after a new drive in the gearbox GB has been established whether an upshift or a downshift. During this slowed re-engagement of the clutch CL, it is important to note that engine racing does not occur between shifts since either the upshifting switch 107, 113 or the downshifting switch 106, 112, is effective to adjust engine speed to that of the clutch driven member 49 before lock-up occurs.

When up or downshifts are made during driving of the vehicle, upon separation of the clutch members the engine will normally speed up, that is, race momentarily which relative speed relationship of the engine to the driven member 49 would activate the upshifting switch 107, 113 to energize the throttle-closing means TC or carburetion interrupter CI therefore idle the engine, but before clutch re-engagement occurs, the relative speed relationship of the engine to the driven member 49 will determine which one of the sets of contacts 106, 112 or 107, 113 is ultimately activated before the clutch CL is restored to fully engaged status as shown in FIGURE 1.

Further to the slowed re-engagement of the clutch CL provided by the solenoid-operated shutoff valve SV[1], when the relay circuit RC is interrupted upon opening of the shift-lever switch IS[1] in the manner previously described, actuation of the shutoff valve SV[1] to either fully open or closed positions of control with respect to admitting vacuum to and blocking the same from the clutch-servo chamber 64, produces the proper action of the clutch CL, that is, the clutch CL is opened rapidly, and fed in slowly by control of ingress of air through the air filter AF thence via the tapered passage 333 controlled by the conical inner end portion 332 of the needle valve 331, setting of the needle valve point in relation to this tapered passage is capable of producing a rapid or retarded rate of clutch member engagement as is understood, so that the clutch members 15, 49 will not be "dumped" into engagement with resultant lurching and erratic movement of the vehicle as torque is applied to the driving wheels of the latter, but to the contrary the speed of the engine will always be substantially in synchronism with that of the clutch driven member 49 as the clutch members 15, 49 approach slipping engagement to enable smooth lock-up therebetween and application of drive torque to the vehicle drive line in accordance with the drive established in the gearbox GB. Accordingly, while the vehicle is driving at or above speeds of 5–7 m.p.h., the driver may operate the shift-lever SL at will with minimal effort between any of the drive positions and neutral, and particularly all driver coordination of shifting movement to foot operations of the clutch CL and accelerator pedal, is eliminated so that safety of car operation is greatly enhanced by reducing such to two simple operations of gear shifting and engine control by the accelerator pedal without any driver coordination therebetween being required.

Thus, the present invention provides driver supervised operation of a motor vehicle with respect to selection of the drive in which it is desired to operate the vehicle, without sacrificing the advantages provided by the so-called automatic drives of freedom from foot and hand coordination. It is this latter disadvantage of manually-operated gearboxes with foot-operated master clutches which has influenced the development of the several commercial types of hydraulic automatic drives which are complicated, costly and require factory-trained maintenance rather than servicing on the car dealer level, independent garages, etc., as in the case of the conventional synchromesh gearing whether power-shifted or not.

The upshifting phase in the cycle of normal operation of a motor vehicle functions in the same manner as previously described when starting the vehicle and shifting through the three forward speeds to high gear (direct-drive), therefore, the description just concluded completes the driving phase.

The vehicle is brought to a stop in conventional manner by merely lifting the foot from the accelerator pedal, applying the service brake and returning the shift-lever SL to "N" position upon parking the vehicle, or optionally the driver may leave the shift-lever in either of the gear active positions after stopping the engine so that the compressive braking effect of the latter can supplement the normal braking effect of the parking brake, particularly in the event the driver fails to apply the parking brake, which is often done, on leaving the vehicle.

Assuming the vehicle was operating in high gear (direct-drive) prior to bringing the vehicle to a stop, the following sequence of operations occurs:

Removing foot-pressure from the accelerator pedal enables the accelerator switch AS to be operated under joint influence of the springs 399 and 404 and frictional engagement of the sleeve 402 with the actuating rod 385 to retract the movable assembly 388 to the position of FIGURE 16 wherein the fixed contacts 376, 377 are bridged thus completing in part the circuit AGL whereupon, reduction of vehicular speed to subtsantially 5–7 m.p.h. operates the governor switch GS into closed position to complete the energizing circuit AGL to the relay RY and therefore the relay circuit RC is completed to the solenoid-operated shutoff valve $SV^1$ to energize the same to operate the clutch-servo VM to effect disengagement of the clutch CL. Upon bringing the vehicle to a full stop, the driver turns off the ignition switch MS to stop the engine, and may optionally leave the gearbox GB in the drive active when stopping the vehicle or may set the shift-lever SL in "N" position to inactivate the gearing of the gearbox GB. When the ignition switch MS was turned "off," all circuits shown in FIGURE 14 were interrupted and therefore the solenoid-operated shutoff valve $SV^1$ returned to closed position wherein the power chamber 64 of the clutch-servo VM is vented to atmosphere enabling the clutch-engaging springs 28 to re-engage the clutch CL, so that, if the shift-lever SL is left in a gear-active position, compression braking of the engine will serve to stabilize the vehicle in its stopped or parked position even if the parking brake is left "off." Under these conditions, the synchronizer plates $P^1$ and $P^2$ and connected switch SS would take up the position corresponding to upshifting control to reduce (idle) engine speed wherein the switch contacts 107, 113 would be engaged to complete in part the upshifting circuit branch US, the latter being completed upon operating the switch $IS^1$ to closed position as a function of the shift-lever SL being established in a selected gear-engaged position in which the vehicle is to be started, for example. Upon pressing the accelerator pedal to get the vehicle underway, the upshifting sequence occurs as previously explained, from low to intermediate to high (direct-drive), and with each initial movement of the shift-lever from an active gear or "neutral" position to a newly selected gear in such upshifting sequence, the synchronizing mechanism SY functions to bring about substantially synchronous speeds between the engine and clutch driven member 49 prior to lock-up between the clutch members 15, 49 as is understood. Such engine-speed modulation being effected by energizing the carburetion control (solenoid $S^b$ or $S^c$) or the throttle-opening means TO (solenoid $S^a$) depending on whether the relative speed of the enigne is greater or less, respectively, than the speed of the clutch driven member 49.

The present invention is primarily adapted for use with spring-engageable friction clutches, however, it may be operatively associated with other types of clutches such as those requiring fluid pressure to effect engagement in opposition to spring disengaging means. Therefore, I desire to make it manifestly clear that my novel synchronizing mechanism SY may readily be adapted to control a pair of elements relatively rotatable asynchronously when disengaged into substantially synchronous speeds prior to co-rotation thereof, and that the solenoids $S^a$ and $S^b$ including other known forms of actuators may be operatively activated by one or the other or both of said relative rotatable elements to effect such synchronism thereof as a function of said synchronizing switch SS activating control means for such actuators. Therefore, the control device disclosed herein as switch SS may be adapted to energize electric operating means such as the soleonids $S^a$ and $S^b$ or optionally $S^c$ associated with the carburetor CR to modulate engine speed as described, or to energize control means which in turn control an actuator directly effective on one or the other or both of the said relative rotatable elements to effective synchronism thereof prior to co-rotation thereof.

Further considering the operational behavior of the patented accelerator-controlled switch AS, to produce its advantageous results in controlling the friction clutch CL, and assuming the engine E is operating, low-speed drive engaged, and therefore the vehicle conditioned for starting by the simple operator-action of depressing the accelerator pedal from its normal idling position of control. Initial depression of the accelerator pedal displaces the movable contact assembly 388 to the position of FIGURE 17 wherein the energizing circuit AGL to the relay RY is broken notwithstanding the governor switch GS is closed, to cause interruption of the relay circuit RC to the solenoid shutoff valve $SV^1$ with resultant de-energization of the clutch-servo VM, said shutoff valve being effective to slowly vent the power chamber 64 of the clutch-servo to atmosphere via the air filter AF for controlling retraction of the servo work element 67 from the release bearing 29 with which the free end of the releasing levers 21 are engaged, to smoothly re-engage the clutch members 15, 49 under influence of the clutch-engaging springs 28. As accelerator depression progresses in an engine-accelerating direction, should the clutch members 15, 49 be feeding in too fast and therefore overloading the engine tending to stall the same, the driver reacts normally as would be the case with a clutch-pedal controlled clutch, to either increase the throttle opening or relax pressure from the accelerator pedal, the latter reaction enabling the switch AS to close without fully releasing the accelerator to idling position, to instantly re-energize the solenoid $S^d$ of the shutoff valve $SV^1$ to control the clutch-servo VM to withdraw the pressure plate 15 from the driven member 49 and thereby releasing the engine of such excessive load tending to stall the same. With the engine again running free, another cycle of clutch re-engagement may now be inaugurated by merely depressing the accelerator pedal from its existent operating position causing the switch as to be closed again, to feed in the clutch members 15, 49 toward engaging relationship. And, since the driver is now aware of the load to be imposed on the engine, he would more rapidly and deliberately operate the accelerator to insure the engine is sufficiently powered to pick up the load necessary to get the vehicle underway.

It is thus seen that with vehicular speeds at or below 5–6 m.p.h. which maintains the governor switch GS closed, this patented switch AS (see Patent 2,716,678) enables the driver to have supervisory control over the disengaging and re-engaging action of the clutch CL at substantially any position of the accelerator along its full operating stroke from engine-idling to wide-open throttle control, in response to minute reciprocable movements of the driver's foot. In this manner, the engaging control for the clutch CL is placed under supervision of the driver to simulate foot-action on the conventional clutch-pedal CP were such employed as the sole means of clutch control. Expertness in pedal-controlled clutch engagement is attained by the driver sensing the degree of clutch slippage in relation to accelerator position for the required torque to be transmitted to start the vehicle without overloading the engine with the possibility of stalling it unless quick recovery of the clutch to disengaged-status can be effected. My novel accelerator-controlled switch AS provides such quick recovery at any depressed position of the accelerator pedal by merely relaxing foot pressure thus avoiding the time delay of releasing the accelerator pedal back to engine-idling position which reaction interval is usually responsible for stalling the engine under excessive load for a given throttle open position. The driver may press on the accelerator pedal to start the vehicle, but if engine speed starts to drop, a regulating foot reciprocable movement of minute extent on the accelerator will smoothly engage the clutch CL without overloading the engine E in getting the vehicle underway from a standing start.

Further considering the function of the friction brake and drive ring 95 which has continuous frictional engagement with the hub 47 of the clutch driven member 49, it is important to note that this element serves a twofold purpose, namely; (1) to drive the connected actuatable member $P^2$ of the synchronizing mechanism SY to one of its relative operating positions with respect to the other actuable member $P^1$, in response to the speed of the driven member 49 exceeding that of the driving member 15 connected to the engine E, and upon establishment of the synchronizer SY in such position, slipping engagement ensues between said friction ring 95 and driven member 49 to accommodate a degree of speed overlap of the latter member with respect to the drive member 15 to insure synchronism between said clutch friction members, and (2) to momentarily serve as a brake for said actuatable member $P^2$ connected to said friction ring 95 when the speed of the driven member 49 is less than that of the drive member 15 to establish the other operating position relatively with respect to the other actuatable member $P^1$, and upon establishment of the synchronizer SY in such position, slipping engagement ensues between said friction ring 95 and driven member 49 to accommodate a degree of speed overlap of the drive member with respect to the driven member to insure synchronism of the clutch friction members 15, 49. Accordingly, it is seen that the friction ring plays an important role in the operation of the synchronizer device SY to its two operating positions of control defined by the associated switch SS, and thereby energizes the throttle closing means TC or optionally the carburetion interrupter CI, and throttle-opening means TO to modulate engine speed, by introducing an overlap of engine speed reduction or increase with respect to the speed of the cltuch driven member 49 to bring about synchronous speeds of the engine and driven member 49 prior to lock-up of said clutch friction members, such momentary overlapping of the engine speed being effective to change the operating position of the switch SS from its existent activating position to the other and vice versa without energizing the carbureting modulating devices TC–IC and TO activatable at said positions, such depending on which device was previously active to induce synchronization, since under such circumstances either the clutch CL is fully engaged or the shift-lever is in an activated position to open the interrupter switches IS or $IS^1$, respectively, to prevent fortuitous energization of said devices when such overlap in speed following synchronism occurs.

The interaction of the components shown in FIGURE 14 produces a novel and patentable arrangement and features of construction and operation of the cooperating elements comprising these components and more efficient cooperation of such elements during the upshifting and downshifting phases involved in the operational cycle of a motor vehicle and the like, to enable the novel synchronizing means SY to sensitively induce modulation of engine speed to be synchronous with that of the clutch driven member 49 in response to shift-lever movement irrespective of accelerator operating position from normal engine-idling position. Accordingly, the present synchronizing mechanism functions automatically upon disengagement of the clutch members 15, 49 in response to initial movement of said shift-lever from any of its five (5) positions, to idle the engine and then enables establishment of synchronous speeds of the engine E and clutch driven member 49 prior to corotational relation of the said clutch members.

The foregoing description is believed to set forth clearly the achieving of the various stated objectives of my invention, and to describe the advantageous results to be derived therefrom.

Considering the terminology used in the foregoing description and in the appended claims, the identifying expressions and/or terms employed are intended to convey meanings which include the range of reasonable equivalents in the patent sense. For example, the expressions "synchronizer," "synchronizing mechanism," "synchronism," "drive plates, elements or members" are intended to include the illustrated synchronizing mechanism SY structurally incorporated in the clutch mechanism as shown with the switch device SS actuated thereby, the latter being integrated with or separate from said mechanism, or other control means serving the same purpose. The terms "front," "rear," "top," "bottom," "forward," "rearward," "right," "left" and other directional words or characters except those referring to the direction of vehicular motion, are intended to have only relative connotation for convenience in describing the structure as illustrated on the drawing, and are not intended to be interpreted as requiring any particular orientation with respect to environmental structure with which the present invention may be associated for its novel advantages to be realized to advance the art.

The preferred embodiments of the invention herein disclosed are believed well calculated to fulfill the objects above stated, however, it will be appreciated that I do not wish such to be limited to the exact construction and/or arrangement of parts shown, since it is evident that modifications, variations and substitutions may be made therein by persons skilled in the art without departing from the proper scope or fair meaning of the subjoined claims.

Having thus described my invention, I claim:

1. In synchronizing mechanism adapted for use in cooperation with two frictionally-engageable relatively rotatable elements, comprising: a pair of normally co-rotatable actuatable members operatively disposed between said friction elements, with one of said members connected for co-rotation with one of said friction elements; a ring-like brake and drive element having continuous frictional engagement with a complemental frictional surface on the other of said two friction elements; a mechanical connection between said ring-like element and the other of said pair of actuatable members to effect co-rotational movement thereof; a lost-motion mechanical connection between said pair of actuatable members to provide relative rotational movement between two predetermined limits; camming means operatively incorporated between said pair of actuatable members and adapted to convert said relative rotational movement therebetween into axial operating movement of the other actuatable member; spring means including a normally compressed spring reacting between said ring-like element and the one friction element for maintaining said ring-like element in frictional engagement with the other of said friction elements whereby relative overspeed of the other friction element with respect to the one friction element rotates the other actuatable member to effect one of its axial operating positions defined by one of said predetermined limits, and relative underspeed of said other friction element with respect to the one friction element rotates the other actuatable member to effect its other axial operating position defined by the other of said predetermined limits; torque-producing means connected to said one friction element to rotate as a unit therewith; control means for regulating the speed defining the torque output of said torque-producing means; and a control device operable to two operating positions of control in response to the two axial operating positions, respectively, of said other actuatable member for selectively controlling the said control means to effect regulation of the speed of said torque-producing means into synchronism with the overspeed or underspeed of said other friction element prior to establishment of co-rotational movement of the two friction elements aforesaid.

2. In synchronizing mechanism adapted for use in cooperation with two frictionally-engageable relatively rotatable elements, comprising: a pair of normally co-rotatable actuable members operatively disposed between said friction elements, one of said members being connected for co-rotation with one of said friction elements; a ring-like brake and drive element having continuous frictional engagement with a complemental frictional surface on the other of said friction elements; a mechanical connection between said ring-like element and the other actuable member to effect co-rotational movement thereof; a lost-motion mechanical connection between said actuatable members to provide relative rotational movement between two predetermined limits; camming means operatively incorporated between said actuatable members and adapted to convert said relative rotational movement between said actuatable members into axial operating movement of the other actuatable member; spring means including a normally compressed spring reacting between said ring-like element and the one friction element for maintaining said ring-like element in frictional engagement with the other of said friction elements whereby relative overspeed of the other friction element with respect to the one friction element rotates the other actuatable member to effect one of its axial operating positions defined by one of said predetermined limits, and relative underspeed of said other friction element with respect to the one friction element rotates the other actuatable member to its other axial operating position defined by the other of said predetermined limits; torque-producing means connected to said one friction element to rotate as a unit therewith; control means for regulating the speed defining the torque output of said torque-producing means; and a control device operable to an activating and an inactivating position of control in response to the releative overspeed and underspeed, respectively, of said other actuatable member for controlling said control means to effect regulation of the speed of said torque-producing means into synchronism with the overspeed only of the other friction element prior to establishment of co-rotational movement of the two friction elements aforesaid.

3. In synchronizing mechanism adapted for use in cooperation with two frictionally-engageable relatively rotatable elements, comprising: a pair of normally co-rotatable actuable members operatively disposed between said friction elements, one of said members being connected for co-rotation with one of said friction elements; a ring-like brake and drive element having continuous frictional engagement with a complemental frictional surface on the other friction element; a mechanical connection between said ring-like element and the other actuatable member to effect co-rotational movement thereof; a lost-motion mechanical connection between said actuatable member to provide relative rotational movement between two predetermined limits; camming means operatively incorporated between said actuatable members and adapted to convert said relative rotational movement between said actuatable members into axial operating movement of the other actuatable member; spring means including a normally compressed spring reacting between said ring-like element and the one friction element for maintaining said ring-like element in frictional engagement with the other friction element whereby relative overspeed of the other friction element with respect to the one friction element rotates the other actuatable member to effect one of its axial operating positions defined by one of said predetermined limits, and relative underspeed of said other friction element with respect to the one friction element is effective to rotate the other actuatable member to effect its other axial operating position defined by the other of said predetermined limits; torque-producing means connected to said one friction element to rotate as a unit therewith; control means for regulating the speed defining the torque output of said torque-producing means; and a control device operable to an activating and an inactivating position of control in response to the relative underspeed and overspeed, respectively, of said other actuatable member for controlling said control means to effect regulation of the speed of said torque-producing means into synchronism with the underspeed only of the other friction element prior to establishment of co-rotational movement of the two friction elements aforesaid.

4. In synchronizing mechanism adapted for use in cooperation with two frictionally-engageable relatively rotatable elements to synchronize the same prior to engagement thereof, comprising: a pair of operatively connected actuatable members, one of said members being co-rotatable with one of said friction elements; a drive and brake element having frictional engagement with a complemental friction surface on the other friction element; a mechanical connection between said brake and drive element and other actuatable member to effect co-rotational movement thereof and accommodate relative axial movement therebetween; a lost-motion mechanical connection between said actuatable members to provide relative rotational movement between two predetermined limits; a pair of cooperating camming portions defining the operative connection aforesaid between said actuatable members, said portions being mounted on said actuatable members, respectively, and effectively to simultaneously convert said limited relative rotational movement therebetween into axial movement of the other actuatable member; spring means including a normally compressed spring reacting between said brake and drive element and the one friction element for maintaining said brake and drive element in frictional engagement with the other friction element whereby relative overspeed of the other friction element with respect to the one friction element is effective to rotate the other actuatable member to effect one of its axial operating positions defined by one of said predetermined limits, and relative underspeed of said other friction element with respect to the one friction element is effective to rotate the other actuatable member to effect its other axial operating position defined by the other of said predetermined limits; torque-producing means co-rotatable with the one friction element; control means for regulating the speed defining the torque output of said torque-producing means; and a control device operable to two operating positions in response to the two axial operating positions, respectively, of said other actuatable member for selectively controlling the said control means to effect regulation of the speed of said torque-producing means into synchronism with the overspeed and underspeed of said other friction element prior to the establishment of co-rotational movement of the two friction elements aforesaid.

5. In synchronizing mechanism adapted for use in cooperation with frictionally-engageable drive and driven members of a friction clutch interposed in the drive line of an automotive vehicle powered by an internal-combustion engine provided with a carburetor having a main jet fuel-supplying passage intersecting a fuel-mixing venturi passage in which a throttle-plate is actuatable to control the speed of the engine, the improvement which comprises: a pair of normally co-rotatable actuatable elements operatively connected to said friction members, respectively; a ring-like element having continuous frictional engagement with a complemental friction surface on said driven friction member; a mechanical connection between said ring-like element and one of said actuatable elements to effect co-rotational movement thereof and accommodate relative axial movement therebetween; a lost-motion mechanical connection between said actuatable elements adapted to provide relative rotational movement two predetermined limits; means interconnecting the drive friction member with the other of said actuatable elements to rotate as a unit; camming means operatively incorporated between said actuatable elements to simultaneously convert said relative rotational movement between said actuatable elements into axial movement of said one actuatable element; spring means including a normally compressed spring reacting between said ring-like element and the drive friction member for maintaining said ring-like element in frictional engagement with the driven friction member whereby relative overspeed of the drive friction member with respect to the driven friction member rotates the one actuatable element to effect one of its axial operating positions defined by one of said predetermined limits, and relative underspeed of said drive friction member with respect to said driven friction member rotates the one actuatable element to effect its other axial operating position defined by the other of said predetermined limits; engine-idling means including a manually-adjustable needle valve for varying the quantity of fuel metered into said jet passage; an energizable solenoid adapted to axially move said needle valve from its normally adjusted fuel-metering relationship with respect to said jet passage for normal engine operation, to a position wherein fuel is blocked from entering said last-named passage to preclude fuel-mixing in said venturi passage therefore disabling the engine with resultant reduction in the speed thereof; throttle-opening means including an energizable solenoid having a movable armature; one-way spring-loaded connection between the throttle-plate and one end of said armature to enable the latter to actuate said throttle-plate in opposition to the spring load in said connection in a throttle opening direction to speed-up the engine; a synchronizig switch selectively operable to two closed positions in response to the establishment of said two axial operating positions, respectively, of said one actuatable element for controlling said engine-idling and throttle-opening means, respectively, to effect modulation of the speed of the engine into synchronism with that of the driven friction member prior to the establishment of co-rotational movement of the clutch drive and driven members aforesaid; electric circuit means having two branches connected to their respective solenoids aforesaid via said synchronizing switch to selectively energize the same; a source of electrical energy; and a personally-operable switch for connecting said source to said branches.

6. A synchronizing mechanism constructed in accordance with claim 5 including a pressure differential operated servomotor adapted to disengage and accommodate re-engagement of said clutch drive and driven members; spring means for effecting re-engagement of said clutch members upon de-energization of said servomotor; a solenoid-controlled shutoff valve adapted to control operative energization of said servomotor, when energized to open position; a third branch in said electric circuit means; a speed-sensitive switch interposed in said third branch; an accelerator-controlled switch interposed in said third branch in series with said speed-sensitive switch; an energizable relay interposed in said third branch in series with said two last-mentioned switches; a relay circuit to said shutoff valve controlled by said relay when energized; an interrupter switch interposed in said third branch to energize said relay and in the branch aforesaid for energizing the first-mentioned solenoid to idle the engine; and shift-lever means adapted to selectively operate said interrupter switch to open and closed positions corresponding to an H-pattern shifting movement.

7. In a vehicular power drive system including an internal-combustion engine, accelerator mechanism operable between released engine-idling position and depressed engine-accelerating positions for actuating the throttle-valve of the carburetor to control engine speed, a friction clutch having engageable drive and driven members for transferring engine torque when engaged to a change-speed transmission having a drive shaft connected for co-rotation with said clutch driven member, and a tail-shaft, a plurality of gear trains for connecting said shafts in variant relative driving speed relations and disconnecting the same to establish neutral non-driving relation, including means for selectively effecting said connecting of said gear trains to vary the driving speeds, and energizable servo-mechanism for disengaging and controlling re-engagement of said clutch friction members to facilitate connecting and disconnecting said gear trains, the improvement which comprises: electric circuit means having energizable upshifting and downshifting branches and an energizing branch for a relay and including a source of electrical energy; a master switch operable to closed position for connecting said source and circuit means; a relay circuit controlled by said relay when energized to energize a solenoid-controlled device to open position, and when de-energized accommodating closure thereof, for controlling said servo-mechanism to operatively disengage and accommodate automatic re-engagement, respectively, of said friction clutch members; an accelerator-controlled switch and a governor switch connected in series in said energizing branch for said relay, said governor switch being responsive to the speed of the transmission tailshaft, to operate to open position at or above a predetremined speed factor thereof, and the accelerator-controlled switch being responsive to minute reciprocable actuating movements of said accelerator mechanism, to open and closed positions at closely spaced stations along the full operating stroke of said accelerator mechanism whereby said relay is energized and de-energized to selectively open and close the relay circuit to de-energize and re-energize, respectively, the solenoid-controlled device to operatively control said servo-mechanism to effect clutch re-engagement and disengagement, respectively; an interrupter switch operable from open to closed position, to complete in part said upshifting branch in response to a manually-operated member forming part of the means for selectively effecting said connections in said gear trains, said interrupter switch being also effective when closed to energize the energizing branch for said relay to close said relay circuit and thereby energizing the solenoid-controlled device to operate said servo-mechanism to disengage said friction clutch members during movement of said manual member between driving positions and neutral, and wherein initial movement of said manual member is effective to close said interrupter switch and maintain the same closed until a newly selected position has been established whereupon said interrupter switch opens automatically to de-energize said relay and thereby de-energizing the solenoid-controlled device to accommodate re-engagement of said clutch members; a synchronizing switch selectively operable to upshift and downshift positions provided with a common ground connection; carburetion interrupting means including a solenoid-controlled needle valve operable from normal carbureting position to a position whereat the carbureting function of the carburetor is disabled to idle the engine, said last-named solenoid being interposed in said upshifting branch which is connected to the upshift position of said synchronizing switch; throttle-opening means including an energizable solenoid operable to actuate said throttle-valve to engine-accelerating positions above the existent position normally established by the throttle-valve under influence of normal operator accelerator-actuation to increase engine speed, said last-named solenoid being interposed in the downshifting branch which is connected to the down-shift position of said synchronizing switch; another interrupter switch interposed in said downshifting branch to interrupt said latter branch upon operation of said servo-mechanism to normally released position wherein the clutch members are fully engaged for maximum torque-transmitting efficiency; a pair of synchronizing members operatively incorporated between and connected, respectively, to said clutch friction members, one of said friction members being co-rotatable with one of said synchronizing members, and the other synchronizing member having frictional engagement with the other clutch member under influence of a normally compressed spring; and operating means operably associated with said synchronizing members to impart relative operating movement to the other synchronizing member in response to limited relative rotation of said synchronizing members as a function of the clutch drive member exceeding or being less than that of the clutch driven member to thereby operate said synchronizing switch to its upshift and downshift positions, respectively, to selectively complete in part the upshifting and downshifting branches to selectively energize said carburetion interrupting and throttle-opening means, respectively, to modulate engine speed into synchronism substantially with that of the clutch driven member prior to co-rotation of said clutch drive and driven members.

8. In a vehicular power drive system including an internal-combustion engine having an inlet-manifold, accelerator mechanism operable between released engine-idling position and depressed engine-accelerating positions for actuating the throttle-valve of the carburetor to control the speed of said engine, a friction clutch having spring-engageable drive and driven members for transferring engine torque when engaged to a change-speed transmission having a drive shaft connected for co-rotation with said driven member of the clutch, and a tailshaft, a plurality of gear trains for connecting said shafts in variant relative driving speed relations and disconnecting the same to establish neutral non-driving relation, including means for selectively effecting said connections of said gear trains to vary the driving speeds and energizable fluid pressure operated servo-mechanism connectible to said inlet-manifold for disengaging and controlling re-engagement of said clutch friction members to facilitate connecting said gear trains and disconnecting the same, the improvement which comprises: electric circuit means having energizable up-shifting and downshifting branches and an energizing branch for a relay, and including a source of electrical energy; a master switch operable to closed position for connecting said source and circuit means; a relay circuit controlled by said relay when energized to energize a solenoid-controlled valve to open position, and when de-energized accommodating closure thereof, for connecting said servo-mechanism to said inlet-manifold to operatively energize the same when connected, and when disconnected accommodating automatic re-engagement of said friction clutch members under control of said spring-engaging action; an accelerator-controlled switch and a governor switch connected in series in said energizing branch for said relay, said governor switch being responsive to the speed of the transmission tailshaft to operate to open position at or above a predetermined speed factor, and the accelerator-controlled switch being responsive to reciprocable actuating movements of said accelerator mechanism at closely spaced stations along the full operating stroke of said accelerator mechanism whereby said relay is energized and de-energized to selectively open and close the relay circuit to de-energize and re-energize, respectively, the solenoid-controlled valve to operatively control said servo-mechanism to effect clutch re-engagement and disengagement, respectively; an interrupter switch operable from open to closed positions to complete in part when closed said upshifting branch in response to a manually-operated member forming part of the means for selectively effecting said connections of said gear trains, said interrupter switch being also effective when closed to energize said relay to close said relay circuit and thereby energizing said solenoid-controlled valve to operate said servo-mechanism to disengage said clutch friction members during movement of said manual member between two driving positions of control, and wherein initial movement of said manual member is effective to close said interrupter switch and maintain the same closed until a newly selected position has been established whereupon said interrupter switch opens automatically to de-energize the relay and thereby de-energizing said solenoid-controlled valve to accommodate re-engagement of said clutch friction members under influence of said spring-engaging action; a synchronizing switch selectively operable to upshift and downshift positions provided with a common ground connection; carburetion interrupting means including a solenoid-controlled needle valve operable from normal carbureting position to a position whereat the carbureting function of the carburetor is disabled to idle the engine, said last-named solenoid being interposed in said upshifting branch which is connected to the upshift position of said synchronizing switch, throttle-opening means including an energizable solenoid operable to actuate said throttle-valve to engine-accelerating positions beyond the existent position established by the throttle-valve under influence of normal operator accelerator-actuation to increase engine speed, said last-named solenoid being interposed in the downshifting branch in series with the downshift position of said synchronizing switch; and interrupter switch interposed in said downshifting branch in series with said synchronizing switch and throttle-opening means to open said latter branch upon operation of said servo-mechanism to normally released position wherein said clutch friction members are fully engaged for maximum torque-transmitting efficiency; a pair of synchronizing members operatively incorporated between and connected, respectively, to said clutch friction members, one of said friction members being corotatable with one of said synchronizing members, and the other of said synchronizing members having frictional engagement with the other clutch friction member under influence of a normally compressed spring; and operating means incorporated between said synchronizing members and effective to impart relative operating movement to the other of said synchronizing members in response to relative rotation of said synchronizing members as a function of the speed of the clutch drive member exceeding or being less than that of the ctutch driven member to thereby operate said synchronizing switch to its upshift and downshift position, respectively, to selectively complete in part the upshifting and downshifting branches to selectively energize said carburetion interrupting and throttle-opening means to modulate engine speed into synchronism substantially with that of the clutch driven member prior to co-rotation of said clutch drive and driven members.

9. In synchronizing mechanism adapted for use in cooperation with a pair of coaxial frictionally-engageable elements relatively rotatable when disengaged, the improvement which comprises: a pair of coaxial actuatable members disposed between said friction elements in coaxial relationship therewith, with one of said members corotatable with one of said friction elements, and the other member having a lost-motion connection with the one member to provide relative rotational movement in opposite directions between two predetermined limits; an actuating friction ring having continuous frictional engagement with a complemental frictional surface on the other friction element; a mechanical connection between said friction ring and the other friction element to effect co-rotational movement thereof and accommodate relative axial movement therebetween; a plurality of cooperating camming portions carried, respectively, by said actuatable members to simultaneously convert said relative rotational movements thereof into axial movements of the other actuatable member; spring means including a normally compressed spring reacting between said friction ring and a portion of one of said friction elements for maintaining said friction ring in frictional engagement with the other friction element irrespective of relative axial adjustments between said actuatable members; a pair of spaced fixed electric contacts; a movable grounded electric contact selectively engageable with said fixed contacts in response to said opposite relative rotational movements of said actuatable members converted by said camming portions into axial movements, respectively, of the other actuatable member, said relative rotational movement between said members being a function of relative overspeed of the other friction element with respect to the one friction element induced by momentary drive effect of said friction ring reacting on said other actuatable member to move said movable contact into engagement with one of said fixed contacts, the opposite relative movement between said actuatable members being a function of relative underspeed of said other friction element with respect to the one friction element induced by momentary braking effect of said friction ring reacting on said other actuatable member to move said movable contact into engagement with the other fixed contact; and electric circuit means including a source of electrical energy and two branches connected, respectively, to said pair of fixed contacts.

10. A synchronizing mechanism constructed in accordance with claim 9 plus energizable means associated with the carburetor of an internal-combustion engine, the latter being adapted to rotate said one friction element in unison therewith, to reduce the speed of the latter into synchronism with that of the other friction element when one of the circuit branches is completed by engagement of said movable contact with one of said fixed contacts corresponding to relative overspeed actuation of said actuatable members.

11. A synchronizing mechanism constructed in accordance with claim 9 plus energizable means associated with the carburetor of an internal-combustion engine, the latter being adapted to rotate the one friction element in unison therewith, to increase engine speed into synchronism with that of the other friction element when the other circuit branch is completed by engagement of the said movable contact with the other of said fixed contacts corresponding to relative underspeed actuation of said actuatable members.

12. In synchronizing mechanism adapted for use in cooperation with a pair of coaxial frictionally-engageable elements relatively rotatable when disengaged, the improvement which comprises: a pair of coaxial actuatable members disposed between said friction elements in coaxial relationship therewith, with one of said members co-rotatable with one of said friction elements, and the other member having a lost-motion connection with the one member to provide relative rotational movements in opposite directions between two predetermined limits; a pair of fixed electric contacts; a grounded electric contact operatively associated with the other actuatable member, and adapted to selectively engage said pair of fixed contacts; a spring-loaded brake and drive ring having continuous frictional engagement with a complemental coaxial frictional surface on said other friction element; a mechanical connection between said other friction element and said other actuatable member to effect co-rotational movement thereof and accommodate relative axial movement therebetween; and a plurality of camming portions carried, respectively, on said pair of actuatable members to simultaneously convert said opposite relative rotational movements thereof into axial movements, respectively, of the other actuatable member to selectively engage the grounded contact with said fixed contacts, as a function of relative overspeed and underspeed, respectively, of said other friction element with respect to said one friction element prior to engagement of said friction elements.

13. In synchronizing mechanism adapted for use in cooperation with a pair of coaxial frictionally-engageable elements relatively rotatable when disengaged, the improvement which comprises: a pair of coaxial actuatable members disposed between said friction elements in coaxial relationship therewith; a brake and drive element having continuous frictional engagement with one of said friction elements under influence of a spring load; a lost-motion connection between said actuatable members to provide relative rotational movement between two predetermined limits; a mechanical connection between said brake and drive element and said one friction element to effect co-rotational movement thereof and accommodate relative axial movement therebetween; a pair of fixed electric contacts; electric circuit means including a source of electrical energy and a pair of branches connected, respectively, to said fixed contacts; and a grounded electric contact carried by one of said actuatable members for selective engagement with said fixed contacts to complete in part said branch circuits, in response to opposite relative rotational movements between said actuatable members effected by relative overspeed and underspeed, respectively, of said one friction element with respect to the other friction element prior to engagement of said friction elements.

14. In synchronizing mechanism adapted for use in cooperation with a pair of frictionally-engageable elements relatively rotatable when disengaged, the improvement which comprises: a pair of coaxial actuatable members disposed between said friction elements in coaxial relationship therewith, one of said members being co-rotatable with one of said friction elements; a clutch element co-rotatable having continuous frictional engagement with the other friction element to be frictionally driven by the latter element and to accommodate slipping engagement therebetween; means limiting the relative rotational movement between said actuatable members; means interconnecting the clutch element with the other actuatable member to rotate as a unit; switch mechanism operatively associated with said actuatable members and adapted to operate to "on" and "off" positions of control in response to relative rotational speeds between said friction elements when disengaged in accordance with which one of the friction elements is rotating faster than the other, respectively.

15. In synchronizing mechanism adapted for use in cooperation with a pair of coaxial frictionally-engageable elements relatively rotatable when disengaged, the improvement which comprises: a pair of coaxial actuatable members disposed between said friction elements in coaxial relationship therewith, one of said member being co-rotatable with one of said friction elements; a clutch element having continuous frictional engagement with the other friction element and adapted to accommodate slipping engagement therebetween; means limiting relative rotational movement between said actuatable members; means interconnecting the clutch element with the other actuatable member to rotate as a unit; switch mechanism operatively associated with said actuatable members and adapted to operate to two "on" positions of control in response to relative rotational speeds between said friction elements when disengaged in accordance with which one of the friction elements is rotating faster than the other, respectively.

16. In synchronizing mechanism adapted for use in cooperation with a pair of coaxial frictionally-engageable elements relatively rotatable when disengaged, the improvement which comprises: a pair of coaxial actuatable members disposed between said friction elements, one of said members being co-rotatable with one of said friction elements; a clutch element having continuous frictional engagement with the other friction element, and adapted to rotate therewith momentarily as a unit to produce a braking effect upon the other actuatable member; means limiting relative rotational movement of said actuatable members; means interconnecting the clutch element with the other actuatable member to transmit the said braking effect thereto; switch mechanism operatively associated with said actuatable members and adapted to selectively operate from one operating position to another operating position of control in response to relative rotational speeds of the one friction element exceeding that of the other friction element when said friction elements are disengaged.

17. In synchronizing mechanism adapted for use in cooperation with a pair of coaxial frictionally-engageable elements relatively rotatable when disengaged, the improvement which comprises: a pair of coaxial actuatable members disposed between said frictional elements, one of said members being co-rotatable with one of said friction elements; a clutch element having continuous frictional engagement with the other friction element, and adapted to rotate therewith momentarily as a unit to produce a braking effect on the other actuatable member; means limiting relative rotational movement of said actuatable members; means interconnecting the clutch element with the other actuatable member to transmit the said braking effect thereto; switch mechanism operatively associated with said actuatable members and adapted to selectively operate from one operating position to another operating position of control in response to relative rotational speeds of the one friction element being less than that of the other friction element when said friction elements are disengaged.

References Cited by the Examiner

UNITED STATES PATENTS

| | | | |
|---|---|---|---|
| 1,940,251 | 12/1933 | Hammond | 261—49 |
| 2,084,306 | 6/1937 | Ball et al. | 261—34 |
| 2,568,958 | 9/1951 | Hey et al. | 192—.08 |
| 2,644,559 | 7/1953 | Randol | 192—.073 |
| 2,720,295 | 10/1955 | Bradbury | 192—.08 |
| 2,794,877 | 6/1957 | Morrill | 200—61.39 |
| 2,816,187 | 12/1957 | Smith | 200—61.39 |

DAVID J. WILLIAMOWSKY, *Primary Examiner.*

DON A. WAITE, *Examiner.*

H. S. LAYTON, *Assistant Examiner.*